United States Patent
Iwasaki

(10) Patent No.: US 7,614,775 B2
(45) Date of Patent: Nov. 10, 2009

(54) LIGHT GUIDE MEMBER, PLANAR LIGHTING DEVICE USING THE SAME, AND ROD-TYPE LIGHTING DEVICE

(75) Inventor: Osamu Iwasaki, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 252 days.

(21) Appl. No.: 11/910,291

(22) PCT Filed: Mar. 29, 2006

(86) PCT No.: PCT/JP2006/306505
§ 371 (c)(1), (2), (4) Date: Oct. 1, 2007

(87) PCT Pub. No.: WO2006/104203
PCT Pub. Date: Oct. 5, 2006

(65) Prior Publication Data
US 2009/0147537 A1    Jun. 11, 2009

(30) Foreign Application Priority Data
Mar. 29, 2005 (JP) ............... 2005-093997
Aug. 2, 2005 (JP) ............... 2005-224314

(51) Int. Cl.
F21V 7/04 (2006.01)
G02B 6/10 (2006.01)

(52) U.S. Cl. .............. 362/616; 362/628; 362/629; 362/610; 385/129

(58) Field of Classification Search ........... 362/620, 362/610, 615, 616, 612, 628, 629, 551, 555, 362/561; 385/129, 130, 901
See application file for complete search history.

(56) References Cited

U.S. PATENT DOCUMENTS 5,542,017 A * 7/1996 Koike ............... 385/123

(Continued)

FOREIGN PATENT DOCUMENTS

CN    1504772 A    6/2004

(Continued)

OTHER PUBLICATIONS

First Office Action issued Oct. 10, 2008, by the SIPO of the PRC in corresponding CN application No. 200680010892.7, 8 pages in English and Chinese.

*Primary Examiner*—Bao Q Truong
(74) *Attorney, Agent, or Firm*—Sughrue Mion, PLLC

(57) ABSTRACT

A transparent light guide member comprising a first light guide unit in the form of a transparent plate having a rectangular light emitting plane and a parallel groove formed on a rear surface located opposite from the rectangular light emitting plane and parallel to one side of the rectangular light emitting plane; and a second light guide unit, which is transparent, having a columnar external shape to be accommodated in the parallel groove and containing light-scattering particles. Let $\Phi$ be the scattering cross section of the particles, $L_G$ the length of the light guide unit 32 in the direction in which light propagates, $N_p$ the particle density, and $K_C$ a compensation coefficient, then a value $\Phi \cdot L_G \cdot N_p \cdot K_C$ the light guide member assumes is not smaller than 1.1 and not greater than 8.2, and the compensation coefficient $K_C$ is not smaller than 0.005 and not greater than 0.1.

27 Claims, 31 Drawing Sheets

U.S. PATENT DOCUMENTS

| | | |
|---|---|---|
| 6,334,691 B1 | 1/2002 | Suzuki et al. |
| 6,883,950 B2 * | 4/2005 | Adachi et al. ............... 362/555 |
| 6,966,685 B2 * | 11/2005 | Li et al. ...................... 362/616 |
| 2001/0017773 A1 | 8/2001 | Suzuki et al. |
| 2002/0008969 A1 | 1/2002 | Mabuchi et al. |
| 2002/0024803 A1 | 2/2002 | Adachi et al. |
| 2003/0202363 A1 | 10/2003 | Adachi et al. |
| 2004/0047579 A1 * | 3/2004 | Iwasaki et al. ............. 385/129 |
| 2004/0165370 A1 | 8/2004 | Kano et al. |
| 2005/0162863 A1 * | 7/2005 | Iwasaki ...................... 362/551 |
| 2007/0165422 A1 * | 7/2007 | Iwasaki ...................... 362/615 |

FOREIGN PATENT DOCUMENTS

| | | |
|---|---|---|
| CN | 1504806 A | 6/2004 |
| JP | 05-4133 U | 1/1993 |
| JP | 09-259623 A | 10/1997 |
| JP | 09-304623 A | 11/1997 |
| JP | 10-133027 A | 5/1998 |
| JP | 11-231320 | 8/1999 |
| JP | 2000-268622 A | 9/2000 |
| JP | 2001-042327 A | 2/2001 |
| JP | 2001-110223 A | 4/2001 |
| JP | 2001-210122 A | 8/2001 |
| JP | 2001-222906 A | 8/2001 |
| JP | 2001-266626 A | 9/2001 |
| JP | 2002-022966 A | 1/2002 |
| JP | 2002-075036 A | 3/2002 |
| JP | 2002-098838 A | 4/2002 |

* cited by examiner

LIGHT GUIDE MEMBER, PLANAR LIGHTING DEVICE USING THE SAME, AND ROD-TYPE LIGHTING DEVICE

TECHNICAL FIELD

The present invention relates to a light guide member used in a lighting device such as a backlight unit, a planar lighting device using the same, and a rod-type lighting device.

BACKGROUND ART

A liquid crystal display device uses a backlight unit to illuminate its liquid crystal panel (LCD) by radiating light from the rear side of the liquid crystal panel.

The backlight unit is configured using such parts as a light source for illumination, a light guide plate for dispersing light emitted from the light source to irradiate the liquid crystal display panel therewith, and a prism sheet and a diffusion sheet for rendering the light radiated from the light guide plate uniform.

Currently, large liquid crystal televisions predominantly use a backlight unit of a type called a direct illumination type (see JP 05-4133 U, for example). A backlight unit of that type has cold cathode tubes provided as light sources on the rear side of the liquid crystal display panel, the inside providing a white reflective surface, to ensure a uniform light amount distribution and necessary brightness. To achieve a uniform light amount distribution with this type of backlight unit, however, the liquid crystal display panel needs to have a thickness of about 30 mm in a direction perpendicular to the panel as dictated by the principle.

Recent years have been seeing demands for thinner, less power consuming, or larger liquid crystal display devices. However, the backlight unit of direct illumination type mentioned above presented a limit to how thin the thickness could be made because of unevenness in light amount distribution that occurred when the thickness of the light guide plate was reduced to 10 mm or less. Thus, light guide plates of various configurations have been proposed to achieve thinner design, reduced power consumption, and larger dimensions (see JP 09-304623 A, JP 10-133027 A, and JP 2001-42327 A).

For example, JP 09-304623 A discloses a planar light source device (backlight unit) formed such that fluorescent lamps are embedded in the parallel grooves formed in a light guide plate having a substantially rectangular shape, reflective sheets are disposed on the rear surface of the light guide plate, and a transmitted light amount correction sheet, a light diffusion plate, and a prism sheet are laid on one another on the light emitting plane of the light guide plate.

JP 10-133027 A describes a light guide unit (light guide plate) comprising a recess having a parabolic shape in cross section parallel to a widthwise direction of the recess for accommodating a light source, the major axis of the parabolic shape lying in the direction of depth of the recess, in order to obtain a backlight unit that, with a high light use efficiency and, hence, high brightness, makes it possible to provide a liquid crystal display device having a thinned frame and a reduced thickness.

The light guide plates described in JP 09-304623 A and JP 10-133027 A aim to achieve some of a thinner design, a reduction in size and weight, less power consumption, and reduced manufacturing costs for liquid crystal display devices. In both of these references, the light guide plate has one or more grooves formed near the center thereof to accommodate a rod-type light source therein, and the thickness of the plate preferably decreases gradually from the groove toward the end surfaces to achieve a thinner design.

JP 2001-42327 A achieves a large, high-brightness, high-uniformity rear surface illumination using light guide plates arranged in juxtaposition and a given number of linear light sources provided between the light guide plates to improve a liquid crystal backlight unit so it provides a large liquid crystal display surface for wall-mounted televisions.

The liquid crystal display devices disclosed in JP 05-4133 U, JP 09-304623 A, JP 10-133027 A, and JP 2001-42327 A use cold cathode tubes as light sources for the backlights. In recent years, a backlight using LEDs (light emitting diodes) in place of cold cathode tubes has been proposed. JP 09-259623 A, for example, discloses an invention related to an LED light source module wherein at least one side of a light guide plate in the form of a plate is adapted to serve as light source mounting side, a proper number of light admitting portions in the form of recesses are provided on the light source mounting side, and LED lamps are respectively disposed opposite the light admitting portions. In Patent Document 5, the light admitting portions are formed into recesses on the light source mounting side such that each of the inner sides, i.e., the adjacent sides of the recesses forming a pair is formed by cutting into the light source mounting side at an angle closer to normal and each of the outer sides of the recesses forming the pair is formed by cutting into the light source mounting side at an angle closer to parallel. Between the pair of the light admitting portions is provided a reflective surface having a concave surface.

JP 2001-110223 A discloses an electrooptical device comprising a first light guide unit in the form of a plate disposed opposite the front side of an electrooptical panel, a second light guide plate extending along a lateral end surface of the first light guide unit, point light sources for causing light to enter the second light guide unit through the ends portions thereof, and incidence area limiting means for preventing light from entering the second light guide unit through the end portions of the second light guide unit. The second light guide unit used therein is a columnar (prismatic) translucent resin mold, adjacent both ends of which point light sources are provided. Light from the point light sources is led into the second light guide unit and emitted through the side walls of the light guide unit.

JP 2000-268622 A discloses a planar lighting device using a light source configured by a light guide unit made of a translucent material and a point light source provided adjacent at least one end of the light guide unit. The light guide unit has a rectangular or circular cross section that decreases with the increasing distance from the point light source and is disposed adjacent a lateral end surface of a rectangular light guide plate.

Patent Document 1: JP 05-4133 U

Patent Document 2: JP 09-304623 A

Patent Document 3: JP 10-133027 A

Patent Document 4: JP 2001-42327 A

Patent Document 5: JP 09-259623 A

Patent Document 6: JP 2001-110223 A

Patent Document 7: JP 2000-268622 A

DISCLOSURE OF THE INVENTION

Problems to be Solved by the Invention

The lighting devices disclosed in J 09-259623 A, J 2001-110223 A, and J 2000-268622 A, use a side light method whereby light from a light emitting diode is admitted into a rectangular light guide plate through one lateral surface thereof, which method presents problems with controlling the light amount or distribution in use of light from the light source.

With the light guide plates of a type housing a cold cathode tube in the groove formed in the light guide plate as disclosed in J 09-304623 A, J 10-133027 A, and J 2001-42327 A, there is a limit to how thin the light guide plate can be made because thinning the light guide plate results in increased brightness just above the cold cathode tube disposed in the groove, hence, in significant unevenness in brightness.

The present invention has been made in view of the above circumstances and has an object to provide a light guide member that is thinner than light guide plates using a cold cathode tube and permits efficient use of light emitted by a point light source, in particular a light emitting diode, and a planar lighting device using the light guide member, as well as a rod-type lighting device used in the planar lighting device.

Another object of the present invention is to provide a light guide member in which the structure of a rod-type light source is simplified by kneading or dispersing light-scattering particles into the light guide member, and which, therefore, can be manufactured at low costs, and a planar lighting device using the light guide member, as well as a rod-type lighting device used in the planar lighting device.

Another object of the present invention is to provide a light guide member capable of emitting a high-brightness illumination light that is uniform and of reduced unevenness, and a planar lighting device using the light guide member, as well as a rod-type lighting device used in the planar lighting device.

Still another object of the present invention is to provide a rod-type lighting device capable of a high color reproducibility optimum for use in thin light guide plates.

Means to Solve the Problems

To achieve the above objects, a first aspect of the present invention provides a transparent light guide member comprising:

a first light guide unit in a form of a transparent plate having a rectangular light emitting plane and a parallel groove formed on a rear surface located opposite from the rectangular light emitting plane and parallel to one side of the rectangular light emitting plane; and a second light guide unit, which is transparent, having a columnar external shape to be accommodated in the parallel groove and containing light-scattering particles; wherein $\Phi \cdot L_G \cdot N_p \cdot K_C$ has a value not smaller than 1.1 and not greater than 8.2, and $K_C$, a compensation coefficient, is not smaller than 0.005 and not greater than 0.1, where $\Phi$ is a scattering cross section of the particles, $L_G$ a length of the second light guide unit in a direction in which light propagates, $N_p$ a particle density, and $K_C$ the compensation coefficient.

Preferably, the second light guide unit according to the first aspect of the present invention has substantially a same sectional shape as the parallel groove and is configured by placing a pair of light guide units each having a shape with a diameter that decreases from one end surface toward an opposite end surface such that end surfaces of the light guide units having a smaller diameter are in close contact with each other.

Preferably, the rear surface of the first light guide unit is formed either by a single structure comprising a pair of inclined rear surfaces that are symmetrical with respect to a plane containing a central axis of the parallel groove and perpendicular to the rectangular light emitting plane and which are inclined with respect to the rectangular light emitting plane such that a thickness decreases from a portion near the central axis in a direction perpendicular to the one side toward end portions, or by a plurality of such structures connected at the thin portions.

In the inventive light guide member, it is preferable that an exposed surface of the second light guide unit not covered by the parallel groove is preferably inclined with respect to the rectangular light emitting plane, and that a prism array is preferably formed on the exposed surface of the second light guide unit.

Preferably, the second light guide unit of the inventive light guide member has a shape in cross section perpendicular to a lengthwise direction of the second light guide unit representing a triangle, a circle, a partially cut-off ellipse, or part of a parabola.

Preferably, the second light guide unit admits light through both of its lengthwise end surfaces and has a groove that grows wider and deeper from both of the end surfaces centerwardly. Alternatively, the second light guide unit preferably admits light through one of its lengthwise end surfaces and has a groove that grows wider and deeper from one of the end surfaces through which light is admitted toward an opposite end surface. In either case, the groove of the second light guide unit is preferably a V-shaped or a U-shaped groove.

A second aspect of the present invention provides a planar lighting device comprising the light guide member according to the first aspect of the present invention and point light sources, wherein light from the point light sources is admitted through both end surfaces of the second light guide unit.

In the inventive planar lighting device, the point light sources are preferably disposed adjacent both end surfaces of the second light guide unit.

Preferably, the inventive planar lighting device further comprises light guides for leading light from the point light sources to the end surfaces of the second light guide unit.

In the inventive planar lighting device, the point light sources are preferably LEDs, and the LEDs are more preferably pseudo-white LEDs or RGB-LEDS.

A third aspect of the present invention provides a rod-type lighting device, comprising:

a point light source; and a light guide unit having a columnar external shape with an outer diameter decreasing from both end surfaces thereof centerwardly and containing light-scattering particles;

wherein $\Phi \cdot L_G \cdot N_p \cdot K_C$ is not smaller than 1.1 and not greater than 8.2, and $K_C$, a compensation coefficient, is not smaller than and not greater than 0.1, where $\Phi$ is a scattering cross section of the particles, $L_G$ a length of the second light guide unit in a direction in which light propagates, $N_p$ a particle density, and $K_C$ the compensation coefficient.

In the rod-type lighting device according to the third aspect of the present invention, the light guide unit is configured by placing a pair of light guide units each having a shape with a diameter that decreases from one end surface toward an opposite end surface such that end surfaces of the light guide units having a smaller diameter are in close contact with each other.

A fourth aspect of the present invention provides a rod-type lighting device comprising:

a point light source; and a light guide unit having a columnar external shape with an outer diameter increasing from both end surfaces thereof centerwardly and containing light-scattering particles;

wherein $\Phi \cdot L_G \cdot N_p \cdot K_C$ is not smaller than 1.1 and not greater than 8.2, and $K_C$, a compensation coefficient, is not smaller than 0.005 and not greater than 0.1, where $\Phi$ is a scattering cross section of the particles, $L_G$ a length of the second light guide unit in a direction in which light propagates, $N_p$ a particle density, and $K_C$ the compensation coefficient.

In the rod-type lighting device according to the fourth aspect of the present invention, the light guide unit is configured by placing a pair of light guide units each having a shape with a diameter that increases from one end surface toward an opposite end surface such that end surfaces of the light guide units having a larger diameter are in close contact with each other.

Preferably, the rod-type lighting device according to the third and fourth aspects of the present invention is used in a planar lighting device comprising a transparent light guide plate having a rectangular light emitting plane and a parallel groove parallel to one side of the rectangular light emitting plane in a central portion of a rear surface located opposite from the rectangular light emitting plane, wherein the light guide unit has substantially a same external shape as the parallel groove of the light guide plate and is accommodated in the parallel groove.

The light guide unit has other lateral surfaces than those facing side walls defining the parallel groove of the light guide plate. These other lateral surfaces may be formed into flat surfaces or curved surfaces to reflect light, and a prism array is preferably formed on these other lateral surfaces.

The light guide unit preferably has a shape in cross section perpendicular to an axis of the light guide unit representing a triangle or a circle, a partially cut-off ellipse, or part of a parabola.

Further, a light guide for leading light emitted by the point light source to an end surface of the light guide unit is preferably provided. The point light source is preferably an LED and, more preferably, a pseudo-white LED or consists of RGB-LEDs. Preferably, the RGB-LEDs are pulse-lighted sequentially.

A fifth aspect of the present invention provides a planar lighting device, comprising:

rod-type lighting devices according to the third or fourth aspect of the present invention; and transparent light guide plates each having a rectangular light emitting plane and an inclined rear surface inclined with respect to the rectangular light emitting plane such that a thickness decreases from one side of the rectangular light emitting plane in a direction toward an opposite side opposite the one side;

wherein the light guide plates are arranged such that the rectangular light emitting planes define an identical plane and that a lateral surface containing the one side is each in contact with a lateral surface containing the opposite side; and wherein the light guide units of the rod-type lighting devices are disposed in spaces each defined by the inclined rear surface and the lateral surface containing the one side.

Effects of the Invention

The light guide member according to the first aspect of the present invention is capable of admitting light inside through the second light guide unit and emitting light through the light emitting plane of the first light guide member, permitting use of a point light source such as a light emitting diode (LED) in place of a cold cathode tube and, hence, a thinner design.

Because, furthermore, the external shape of the second light guide unit can be machined to match the shape of a parallel groove of the first light guide unit, the generation of unevenness in brightness can be reduced and a thin light guide member can be obtained by forming the parallel groove of the first light guide unit into a shape that will limit unevenness in brightness while machining the external shape of the second light guide unit into a matching shape. To be brief, the shape of the parallel groove of the first light guide unit and the external shape of the second light guide unit can be freely designed in order to limit bright lines occurring on the light emitting plane of the first light guide unit. Further, since the second light guide unit contains light-scattering particles of a given property, sufficient light can be emitted through the light emitting plane without depending on a complicated structure, thus enhancing the light use efficiency. Thus, a rod-type light source with such simplified structure makes low-cost manufacturing possible. The light guide member thus configured is optimum for use in backlight units of liquid crystal display panels.

Further, the planar lighting device according to the second aspect of the present invention, using point light sources as illumination light sources such as light emitting diodes having an adjustable light source wavelength instead of cold cathode tubes, is capable of high color reproducibility and, hence, allows expansion of the color reproduction range and improvement on saturation to be achieved.

The rod-type lighting device according to the third aspect of the present invention has an outer diameter growing progressively smaller from both end surfaces of the columnar light guide unit toward the center whereas the rod-type lighting device according to the fourth aspect of the present invention has an outer diameter growing progressively larger from both end surfaces of the columnar light guide unit toward the center. Thus, the rod-type lighting device according to either of these aspects is capable of admitting light from the point light sources such as LEDs through both end surfaces of the light guide unit and emitting the admitted light through the side walls of the light guide unit. Further, since the light guide unit contains light-scattering particles of a given property, sufficient light can be emitted through the light emitting plane without depending on a complicated structure, thus enhancing the light use efficiency. Further still, since pseudo white LEDs or RGB-LEDs can be used as point light sources, a high color reproducibility can be obtained and, hence, expansion of the color reproduction range and improvement on saturation can be achieved.

The planar lighting device according to the fifth aspect of the present invention uses tandem-type light guide plates as light guide plates and employs, as illumination light sources, not the cold cathode tubes but the rod-type lighting devices according to the third or the fourth aspect of the present invention capable of admitting light from the point light sources such as LEDs through both end surfaces of each columnar light guide unit and emitting the admitted light through the side walls. Thus, a high color reproducibility can be obtained and, hence, expansion of the color reproduction range and improvement on saturation can be achieved.

Figure 1A:
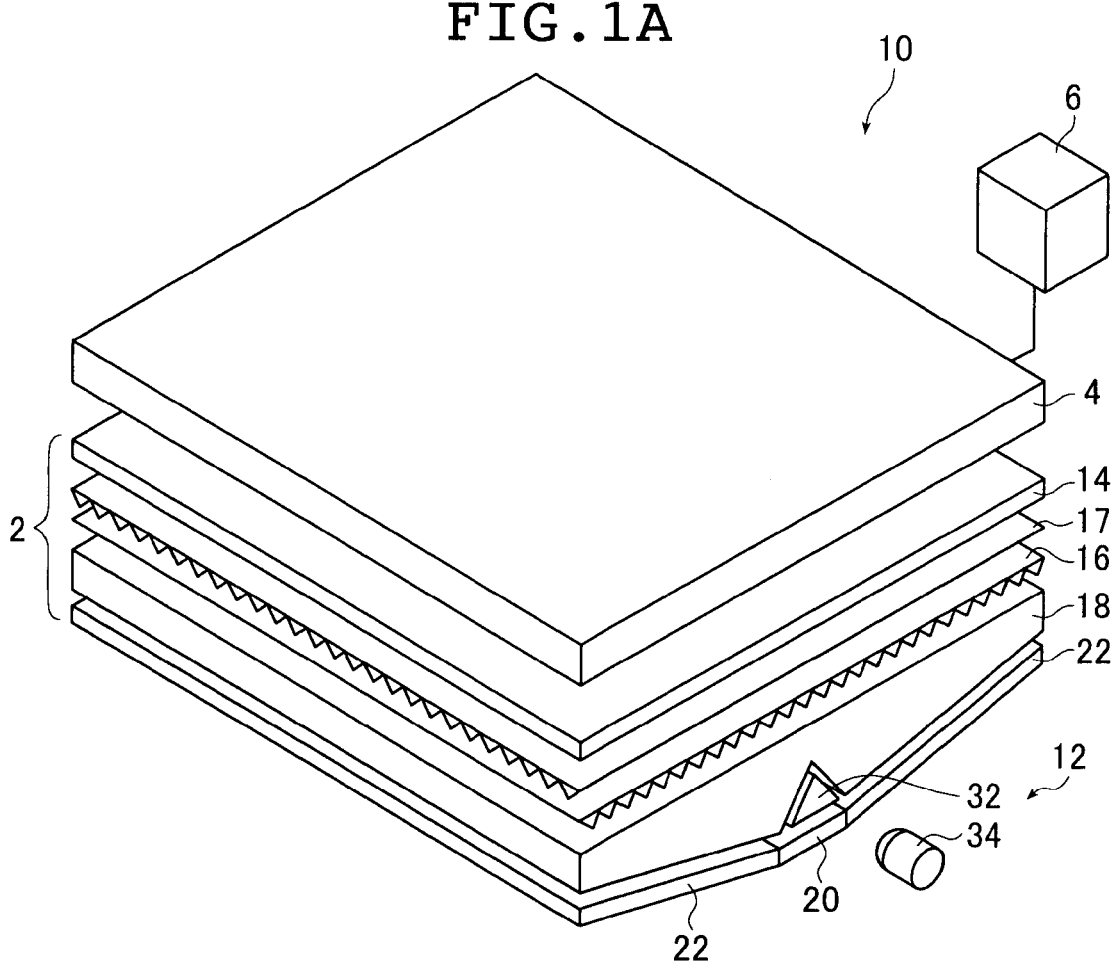
FIG. 1A is a schematic perspective view of a liquid crystal display device using the inventive planar lighting device.

LEGEND 2 planar lighting device (backlight unit)
4 liquid crystal display panel
6 drive unit
10 liquid crystal display device
12 rod-type lighting device
14 diffuser sheet
16, 17 and 19 prism sheets
18, 50, 60, 70, 80, 90, 102, 104, 120, 150, and 160 light guide plates (first light guide units)
18a light emitting plane
18b thick portion
18c thin end portion
18d inclined rear surface
18e inclined rear portion
18f parallel groove
20 reflector
22 reflective sheet
24 reflective plate
32, 52, 62, 72, 74, 76, 78, 86, 94, 96, 98, 99, 130, 140, 332 light guide units (second light guide units)
33A, 33B, 53A, 53B, 63A, 63B transparent units
33a, 33c end surfaces
33b underside surface
34A, 34B LEDs
36 prisms
38 light guides
54a, 54b arcs
56 intersection
64a, 64b parabolas
73a, 73b, 82a, 82b, 84a, 84b curves
88, 132 optical fibers
92 halftone dot pattern
122, 129 rod-type lighting devices

BEST MODE FOR CARRYING OUT THE INVENTION

Now, detailed description will be given of the inventive light guide member, the planar lighting device using the same, and the rod-type lighting device, based upon the embodiments illustrated in the attached drawings.

First Embodiment

FIG. 1A is a schematic perspective view of a liquid crystal display device using the inventive planar lighting device (also referred to as "backlight unit" below).

A liquid crystal display device 10 basically comprises a planar lighting device 2, a liquid crystal display panel 4 disposed on the light emission side of the planar light device 2, and a drive unit 6 for driving them.

The liquid crystal display panel 4 displays characters, figures, images, etc., on the liquid crystal display panel by using the changes in refractive index caused in the liquid crystal cells as electric field is partially applied to liquid crystal molecules arranged beforehand in a given direction to change the orientation of the molecules.

The planar lighting device 2 is a device to irradiate the entire surface of the liquid crystal display panel 4 with a uniform light from behind the liquid crystal display panel 4 and has a light emitting plane with substantially same dimensions as an image display plane of the liquid crystal display panel 4.

The drive unit 6 applies a voltage to transparent electrodes in the liquid crystal display panel to control the transmittance of light passing through the liquid crystal display panel by changing the orientation of liquid crystal molecules, and also applies a voltage to a light source in the planar lighting device 2 to cause the light source to emit light.

Now, the inventive planar lighting device will be described in detail. The planar lighting device 2 comprises a rod-type lighting device 12, a light guide plate 18, a diffuser sheet 14, prism sheets 16 and 17, a reflective sheets 22, and a reflector 20.

Figure 1B:
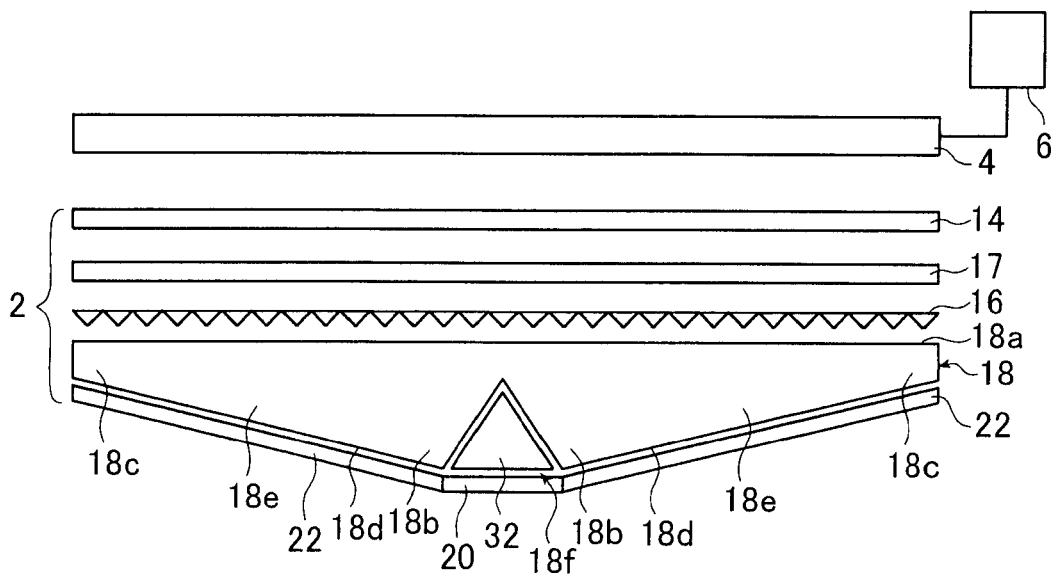
FIG. 1B is a schematic cross-sectional view thereof.
Figure 2A:
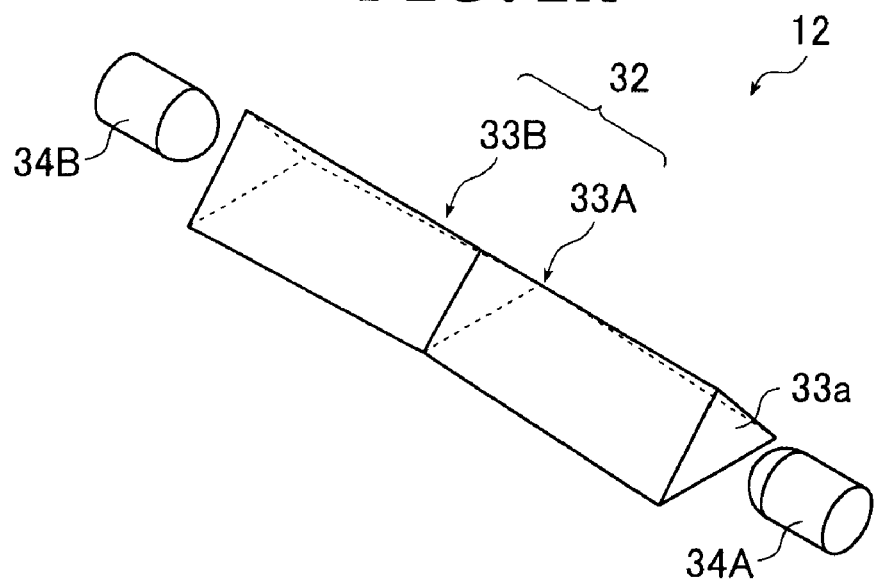
FIGS. 2A and 2B are a schematic perspective view and a schematic side elevation, respectively, of the rod-type lighting device according to the present invention.
Figure 2B:
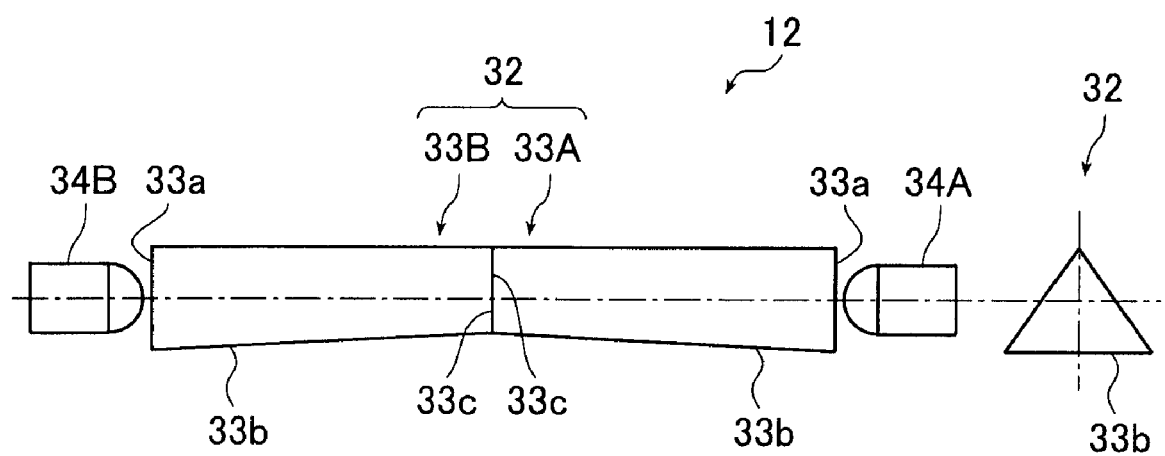

First, the inventive rod-type lighting device 12 used in the planar lighting device 2 illustrated in FIG. 1 will be described. FIGS. 2A and 2B are a schematic perspective view and a schematic side elevation of the inventive rod-type lighting device 12, respectively.

As illustrated in FIG. 2A, the rod-type lighting device 12 essentially comprises a light guide unit 32 and a pair of light emitting diodes (LEDs) 34A and 34B, or point light sources, as its major components. The rod-type lighting device 12 illustrated in FIG. 2 is used in the light guide plate 18 having a parallel groove 18f with a triangular cross section as illustrated in FIG. 1. The light guide plate 18 illustrated in FIG. 1 corresponds to a first light guide unit of the inventive light guide member, and the light guide unit 32 accommodated in the parallel groove of the light guide plate corresponds to a second light guide unit of the inventive light guide member.

Each light guide unit 32 has an external shape of a triangular prism that can be accommodated in the parallel groove 18f of the light guide plate 18. To be more specific, the light guide unit 32 used in the rod-type lighting device 12 has a triangular shape in cross section perpendicular to its lengthwise direction that is substantially the same as or similar to the sectional shape of the parallel groove 18f of the light guide plate 18.

Each light guide unit 32 has a cross section decreasing progressively from both end surfaces 33a toward the center of the light guide unit 32. In the example shown, the light guide unit 32 is configured by inclining only the plane of the light guide unit 32 facing away from the light guide plate 18 when placed in the parallel groove 18f of the light guide plate 18, i.e., an underside surface 33b of the light guide unit 32. In the illustrated example, the light guide unit 32 is configured by using a pair of transparent units 33A and 33B. The transparent units 33A and 33B each have a triangular cross section decreasing progressively from one end surface 33a toward the other end surface 33b. The transparent units 33A and 33B are coaxially connected such that their end surfaces 33b having the smaller sectional area closely fit each other to form the light guide plate 32.

In the rod-type lighting device 12, the LEDs 34A and 34B are provided adjacent both ends 33a of the light guide unit 32 as illustrated in FIG. 2. The LEDs 34A and 34B are connected to the drive unit 6. Light from the LEDs 34A and 34B is admitted into the inside through the end surfaces 33a of the light guide units 32A and 32B, respectively. Since the underside surfaces 33b of the light guide unit 32 are inclined as described above, part of light admitted through both end surfaces 33a of the light guide unit 32 is reflected by the underside surfaces 33b to travel upward in FIG. 2B whereas light refracted by other lateral surfaces than the underside surfaces 33b is emitted to the outside through side wall surfaces of the light guide unit 32.

The rod-type lighting device serves as linear light source such that light from point light sources typically exemplified by LEDs is admitted through the end surfaces of the light guide unit having a shape as illustrated in FIG. 2, and the light thus admitted is emitted to the outside through the side wall surfaces of the light guide unit 32. Thus, a point light source is converted into a linear light source by using a rod-type light guide unit in the rod-type lighting device, which can therefore be used as a substitute light source for a CCFL (cold cathode fluorescent lamp) that is used as a linear light source for a liquid crystal backlight unit.

In cases where one LED light source suffices to provide a light amount required, an LED light source may be provided only on one end surface of the light guide unit 32 to admit light from the LED light source only through that end surface.

The light guide unit 32 is formed by mixing small particles for scattering light in a transparent resin. Let $\Phi$ be the scattering cross section of the small particles, $L_G$ the length of the light guide unit 32 in the direction in which light propagates (axial direction), $N_p$ the particle density, and $K_C$ a compensation coefficient, then there is between the light guide unit 32 and the small particles a relation that $\Phi \cdot L_G \cdot N_p \cdot K_C$ is not smaller than 1.1 and not greater than 8.2, and that the compensation coefficient $K_C$ is not smaller than 0.005 and not greater than 0.1. The relation, found by the inventor of the present application, will be described in detail later on.

Kneading such particles into the light guide unit 32 or dispersing the particles therein makes it possible to emit sufficient light from the light emitting plane without depending on a complicated structure. Thus, the efficiency with which light is emitted through the side walls can be further enhanced.

Transparent materials that may be used to form the light guide unit 32 include acrylic resins such as polycarbonate and PMMA (polymethyl methacrylate), PET (polyethylene terephthalate), PP (polypropylene), PC (polycarbonate), PMMA (polymethyl methacrylate), benzyl methacrylate and MS resins, and other acrylic resins or COP (cycloolefin polymer).

Small particles kneaded into the light guide unit 32 or dispersed therein may be formed, for example, of TOSPEARL (trademark), silicone, silica, zirconia, and derivative polymers.

The light guide unit 32 may be produced using, for example, a method of forming a heated resin feed by extrusion or injection molding.

Now, the relation between the light guide unit 32 and small particles will be described.

A transmittance T of the luminous flux admitted into an anisotropic medium is expressed according to the Lambert-Beer law by the following formula (1):

$$T = I/I_O = \exp(-\rho \cdot x) \qquad \text{formula (1)}$$

where x is the distance, $I_O$ the incident light intensity, I the emitted light intensity, and $\rho$ the attenuation constant.

The attenuation constant $\rho$ is expressed using the scattering cross section $\Phi$ of particles and the number of particles $N_p$ contained in a unit area of the medium by the following formula (2). The scattering cross section $\Phi$ will be explained later on in detail.

$$\rho = \Phi \cdot N_p \qquad \text{formula (2)}$$

Accordingly, let $L_G$ be the length of the light guide unit in the direction of the optical axis, then the light extraction efficiency $E_{out}$ is expressed by the following formula (3). As regards the light guide unit 31 illustrated in FIG. 2, for example, the length of the light guide unit $L_G$ in the direction of the optical axis is the distance from the end surface 33a to the end surface 33c of the light guide unit 32. The light extraction efficiency means the ratio of the light reaching a position spaced by the length of $L_G$ from a light admitting part of the light guide unit in the direction of the optical axis to the incident light. In the case of the light guide unit 31 illustrated in FIG. 2, for example, it is the ratio of the light reaching the end surface 33c to the light incident on the end surface 33a.

$$E_{out} \propto \exp(-\Phi \cdot N_p \cdot L_G) \qquad \text{formula (3)}$$

Since the formula (3) applies in a space having limited dimensions, the compensation coefficient $K_C$ for compensating the relation with the formula (1) is introduced. Accordingly, the light extraction efficiency $E_{out}$ is expressed by the following formula (4), where the compensation coefficient $K_C$, obtained by computer simulation, is a dimensionless compensation coefficient that applies to light propagating through an optical medium having limited dimensions.

$$E_{out} = \exp(-\Phi \cdot N_p \cdot L_G \cdot K_C) \qquad \text{formula (4)}$$

According to the formula (4), when $\Phi \cdot N_p \cdot L_G \cdot K_C$ is 3.5, the light extraction efficiency $E_{out}$ is 3%; when $\Phi \cdot N_p \cdot L_G \cdot K_C$ is 4.7, the light extraction efficiency $E_{out}$ is 1%. This shows that the value $\Phi \cdot N_p \cdot L_G \cdot K_C$ increases with the decreasing light extraction efficiency $E_{out}$. The possible reason for this may be that light scatters around increasingly as light travels in the direction of the optical axis of the optical medium, thus lowering the light extraction efficiency $E_{out}$.

Accordingly, the greater the value $\Phi \cdot N_p \cdot L_G \cdot K_C$ is, the more preferable it is for the light guide plate. It follows therefore that light emitted through the plane (end surface 33b) opposite the plane of incidence (end surface 33a) can be reduced and, hence, light emitted from the light emitting plane can be increased, by increasing the value $\Phi \cdot N_p \cdot L_G \cdot K_C$. In other words, the ratio of light emitted through the light emitting plane to the light incident on the plane of incidence (also referred to as "light use efficiency" below) can be enhanced by increasing the value $\Phi \cdot N_p \cdot L_G \cdot K_C$. Specifically, the light use efficiency can be enhanced to 50% or more by setting the value $\Phi \cdot N_p \cdot L_G \cdot K_C$ to 1.1 or greater.

Note that as the value $\Phi \cdot N_p \cdot L_G \cdot K_C$ increases, unevenness in illuminance of light emitted through the light emitting plane 18a of the light guide plate 18 becomes more conspicuous. However, the unevenness in illuminance can be held to below a certain level (within an allowable range) by setting the value $\Phi \cdot N_p \cdot L_G \cdot K_C$ to 8.2 or less. Note that illuminance and brightness may be treated substantially equally. Thus, it is assumed in the present invention that illuminance and brightness possess similar tendencies.

Accordingly, the value $\Phi \cdot N_p \cdot L_G \cdot K_C$ preferably satisfies the relation that it is not smaller than 1.1 and not greater than 8.2, and more preferably not smaller than 2.0 and not greater than 8.0. Still more preferably, the value $\Phi \cdot N_p \cdot L_G \cdot K_C$ is not smaller than 3.0 and, most preferably, not smaller than 4.7.

The compensation coefficient $K_C$ is preferably not smaller than 0.005 and not greater than 0.1.

A computer simulation was conducted to obtain light use efficiencies for different light guide units having different values of $\Phi \cdot N_p \cdot L_G \cdot K_C$ by varying the scattering cross section $\Phi$, the particle density $N_p$, the length $L_G$ of the light guide unit along the optical axis, and the compensation coefficient $K_C$. Further, unevenness in illuminance was evaluated. Table 1 shows the results of calculations. The unevenness in illuminance (%) was defined as $[(I_{Max} - I_{Min})/I_{Ave}] \times 100$, where $I_{Max}$ is a maximum illuminance of light emitted through the side walls of the light guide unit, $I_{Min}$ a minimum illuminance, and $I_{Ave}$ a mean illuminance. The measurement results are shown in Table 1. In Table 1, judgments "O" indicate cases where the light use efficiency is 50% or more and the unevenness in illuminance is 150% or less whereas judgments "X" indicate cases where the light use efficiency is less than 50% or the unevenness in illuminance is more than 150%.

Figure 6:
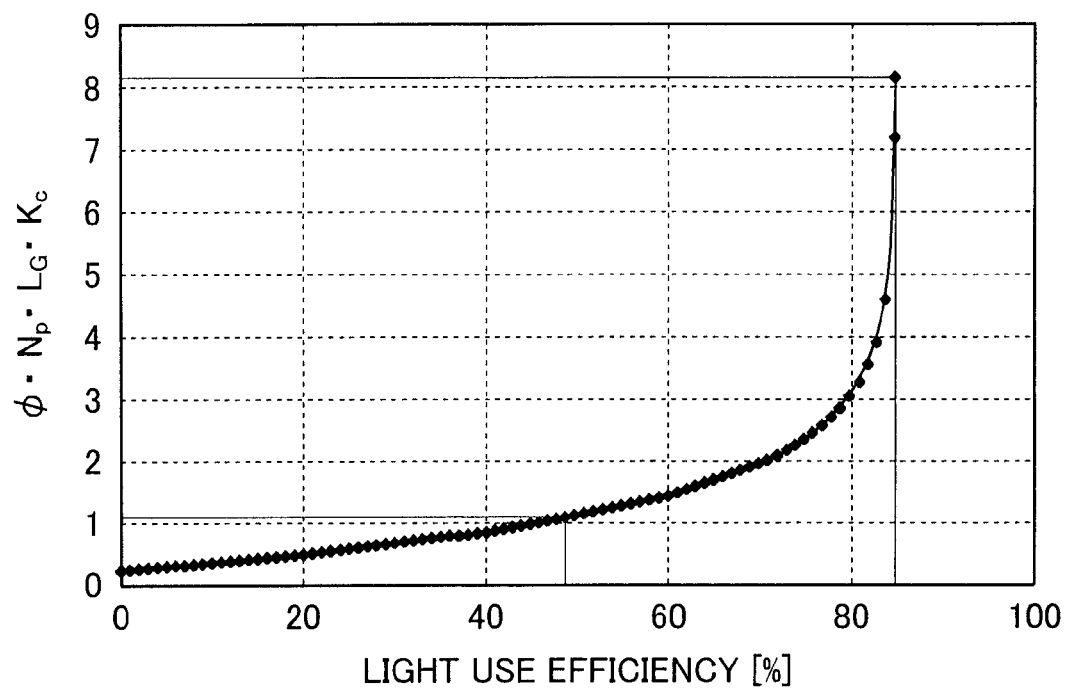
FIG. 6 illustrates results of measurements representing a relation between $\Phi \cdot N_p \cdot L_G \cdot K_C$ and light use efficiency.

FIG. 6 shows results obtained by measuring the relation between the value $\Phi \cdot N_p \cdot L_G \cdot K_C$ and the light use efficiency [the ratio of light emitted through the side wall surfaces (light emitting planes) to the light incident on the end surface 33a].

through the side walls of the light guide unit, $I_{Min}$ is a minimum illuminance, and $I_{Ave}$ is a mean illuminance.

Figure 8:
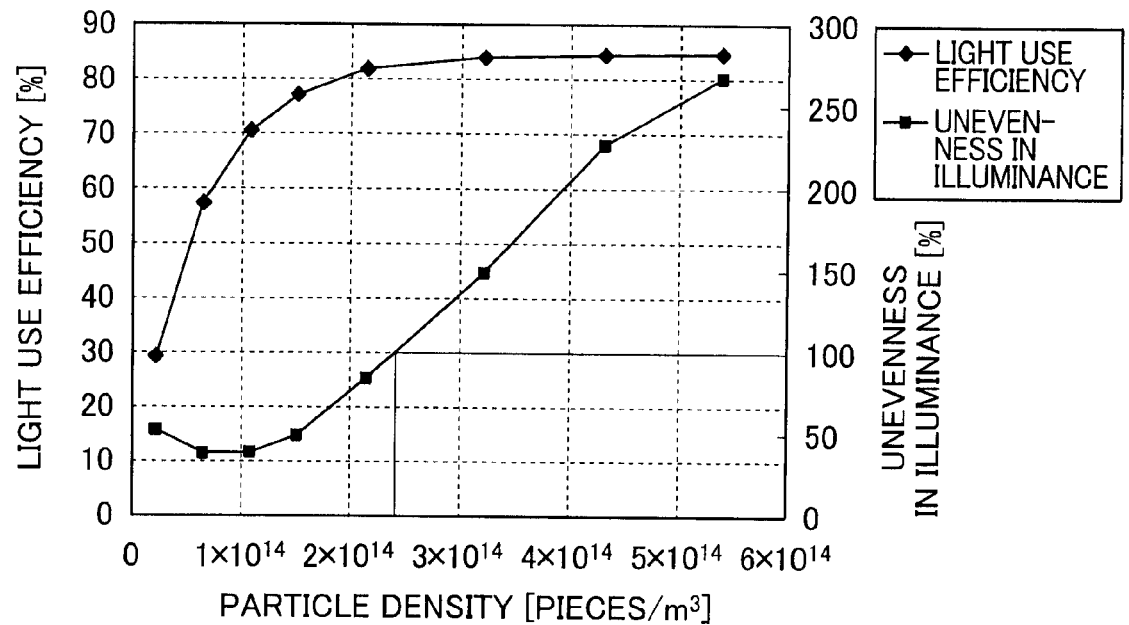
FIG. 8 illustrates a relation between light use efficiency and unevenness in illuminance on the one hand and particle density on the other.

FIG. 8 shows the relation between the calculated unevenness in illuminance and particle density. FIG. 8 shows the unevenness in illuminance [%] on the vertical axis and the particle density [pieces/m³] on the horizontal axis. Also shown in FIG. 8 is the relation between light use efficiency and particle density, the particle density being likewise indicated on the horizontal axis and the light use efficiency [%] on the vertical axis.

TABLE 1

|  | $\Phi$ [m²] | $N_p$ [pcs/m³] | $L_G$ [m] | $K_C$ | $\Phi N_p L_G K_C$ | Light use efficiency [%] | Unevenness in illuminance [%] | Judgment |
|---|---|---|---|---|---|---|---|---|
| Example 1 | $2.0 \times 10^{-12}$ | $2.2 \times 10^{14}$ | 0.3 | 0.03 | 3.51 | 81.6 | 84 | O |
| Example 2 | $2.0 \times 10^{-12}$ | $4.3 \times 10^{14}$ | 0.3 | 0.02 | 6.21 | 84.7 | 149 | O |
| Example 3 | $2.0 \times 10^{-12}$ | $8.6 \times 10^{14}$ | 0.1 | 0.02 | 3.86 | 82.8 | 82 | O |
| Example 4 | $1.1 \times 10^{-10}$ | $1.5 \times 10^{13}$ | 0.3 | 0.008 | 3.91 | 83.0 | 105 | O |
| Example 5 | $1.1 \times 10^{-10}$ | $2.0 \times 10^{13}$ | 0.3 | 0.007 | 4.98 | 84.3 | 142 | O |
| Example 6 | $1.1 \times 10^{-10}$ | $3.5 \times 10^{13}$ | 0.1 | 0.007 | 2.86 | 79.2 | 47 | O |
| Control 1 | $2.0 \times 10^{-12}$ | $2.2 \times 10^{13}$ | 0.3 | 0.05 | 0.66 | 29.1 | 51 | X |
| Control 2 | $1.1 \times 10^{-12}$ | $2.5 \times 10^{12}$ | 0.3 | 0.01 | 0.99 | 43.4 | 59 | X |
| Control 3 | $4.8 \times 10^{-18}$ | $8.6 \times 10^{17}$ | 0.1 | 15.2 | 6.26 | 84.8 | 201 | X |
| Control 4 | $4.8 \times 10^{-18}$ | $1.7 \times 10^{18}$ | 0.1 | 13.9 | 11.5 | 84.9 | 225 | X |

As shown in Table 1 and FIG. 6, it will be understood that with $\Phi \cdot N_p \cdot L_G \cdot K_C$ set to 1.1 or more, a high light use efficiency, specifically 50% or more, can be obtained whereas with $\Phi \cdot N_p \cdot L_G \cdot K_C$ set to 8.2 or less, the unevenness in illuminance can be held to 50% or less.

Further, with $K_c$ set to 0.005 or more, the light use efficiency can be enhanced; with $K_c$ set to 0.1 or less, the unevenness in illuminance of light emitted from the light guide unit can be reduced.

Next, light guide units that vary in particle density $N_p$ of the small particles kneaded or dispersed therein were made to measure brightness distributions of light emitted at different positions in each of the light guide units. In these examples, the conditions other than the particle density $N_p$, i.e., scattering cross section $\Phi$, length $L_G$ of the light guide unit in the direction of its optical axis, compensation coefficient $K_C$, and shape of the light guide unit were each set to fixed values as the measurements were made. Accordingly, the value $\Phi \cdot N_p \cdot L_G \cdot K_C$ changes in proportion as the particle density $N_p$ changes.

In these examples, measurements were made of light emitted through the side walls of each light guide unit composed of two light guide units connected.

Figure 7:
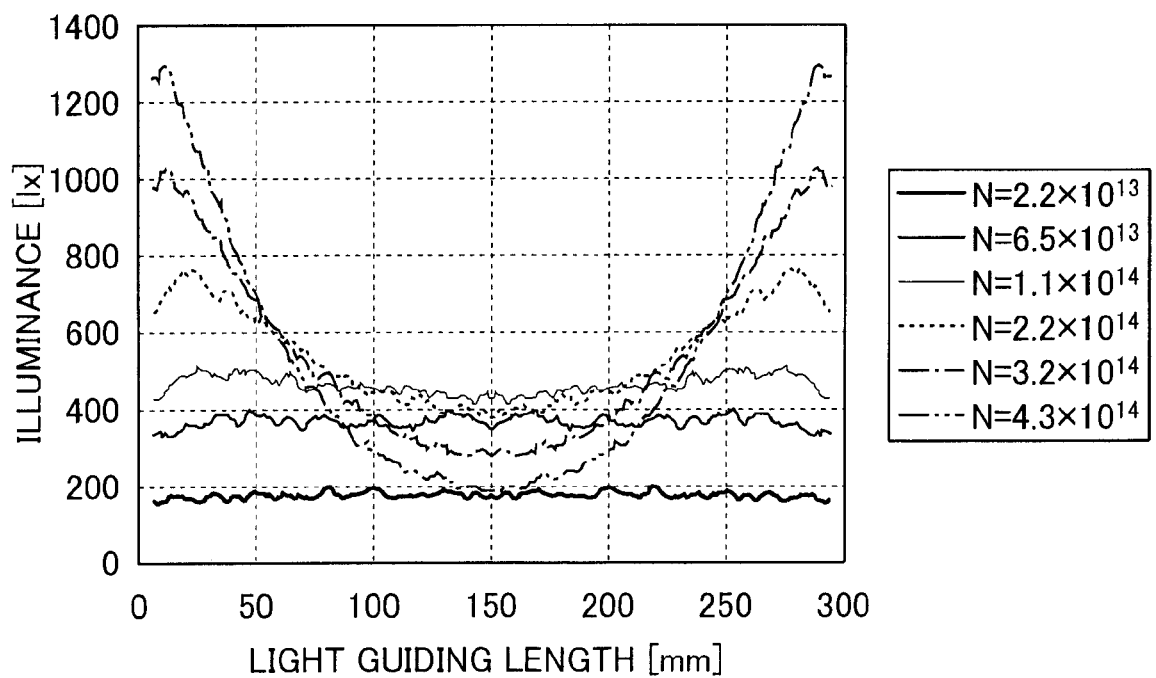
FIG. 7 illustrates results of measurements of illuminance of light emitted from light guide units having different particle densities.

FIG. 7 shows the measurement results, in which the illuminance [lx] is plotted on the vertical axis against the distance from one end surface of the light guide unit on the horizontal axis (light guiding length) [mm].

Unevenness in illuminance was calculated from $[(I_{Max} - I_{Min})/I_{Ave}] \times 100[\%]$, where $I_{Max}$ is a maximum illuminance in the measured brightness distribution of the light emitted As shown in FIGS. 7 and 8, increasing the particle density or, consequently, increasing $\Phi \cdot N_p \cdot L_G \cdot K_C$ results in enhanced light use efficiency but then unevenness in illuminance also increases. It is also shown that reducing the particle density or, consequently, reducing $\Phi \cdot N_p \cdot L_G \cdot K_C$ results in lowered light use efficiency but then unevenness in illuminance decreases.

When $\Phi \cdot N_p \cdot L_G \cdot K_C$ is set to not smaller than 1.1 and not greater than 8.2, a light use efficiency of 50% or more and unevenness in illuminance of 150% or less can be achieved. Thus, unevenness in illuminance, reduced to 150% or less, is inconspicuous.

Accordingly, it will be seen that when $\Phi \cdot N_p \cdot L_G \cdot K_C$ is set to not greater than 8.2, light use efficiency can be maintained at or above a certain level, and unevenness in illuminance can be reduced.

Thus, the advantageous effects of the present invention are obvious from the above.

Parameters generally needed to design a light guide unit are a volume V of the optical medium, a number of mixed particles $N_{PT}$, and a particle diameter $D_p$. The relation between these parameters and the parameters of the above formulae will be now considered.

First, the number of particles $N_p$ contained in a unit volume of the medium, the volume V of the optical medium, and the number of mixed particles $N_{PT}$ have a relation expressed in the following formula (5).

$$N_P = N_{PT}/V \quad \text{formula (5)}$$

The particle diameter $D_p$ and the scattering cross section $\Phi$ are correlated as follows.

Next, the above-mentioned scattering cross section will be described. Concept of the scattering cross section is widely used not only in Mie scattering theory and in the field of visible light, but also in the radiation range including γ ray and X ray, and in the long-wavelength range including infrared ray and microwaves.

Where the wavelength is in the Rayleigh range, the scattering cross section Φ is expressed by the following formula (6).

$$\Phi = 128 \cdot \pi^5 \cdot a^6 / 3\lambda^4 [(n^2-1)/(n^2+2)]^2 \quad \text{formula (6)}$$

where "a" is the particle radius, λ the wavelength of the incident light, and "n" the relative refractive index of the particles.

According to Mie theory, the scattering cross section Φ is expressed by the following formula (7).

<Formula 1>

$$\phi = (\lambda^2 / 2\pi) \sum_{n=1}^{\infty} (2n+1) \cdot [|a_n|^2 + |b_n|^2] \quad \text{formula (7)}$$

where λ is a wavelength of the incident light;

$$a_n = \frac{\phi n(\alpha) \cdot \phi' n(\beta) - N \cdot \phi n(\beta) \cdot \phi' n(\alpha)}{\zeta n(\alpha) \cdot \phi' n(\beta) - N \cdot \phi n(\beta) \cdot \zeta' n(\alpha)}$$

$$b_n = \frac{N \cdot \phi n(\alpha) \cdot \phi' n(\beta) - \phi n(\beta) \cdot \phi' n(\alpha)}{N \cdot \zeta n(\alpha) \cdot \phi' n(\beta) - \phi n(\beta) \cdot \zeta' n(\alpha)}$$

$$\phi n(kr) = (\pi kr/2) \cdot J_{n+1/2}(kr)$$

$J_{n+1/2}(kr)$: Bessel function of the first kind
k: number of waves ($2\pi/\lambda$)
r: distance component in polar coordinates
φ'n: derivative of φn
$\zeta n(kr) = \phi n(kr) + i \cdot \chi n(kr)$
$\chi n(kr) = -(\pi kr/2) \cdot N_{n+1/n}(kr)$
$N_{n+1/n}(kr)$: Neumann function or Bessel function of the second kind
ζ'n: derivative of ζn
$\alpha = 2\pi a/\lambda$
$\beta = N \cdot a$ At the limit of a/λ>>1 in the above formula (7), the scattering cross section Φ is expressed by the following formula (8).

$$\Phi = M\pi a^2 \text{ (in convergence: } M \approx 2) \quad \text{formula (8)}$$

From the formula (7), it is known that M vibrates in a range of 1<M<6.

Figure 3A:
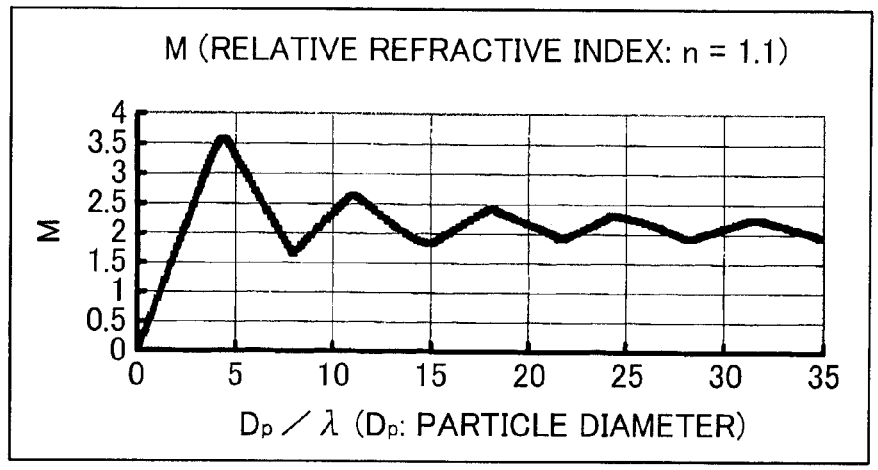
FIG. 3 shows graphs illustrating how a scattering cross section vibrates according to Mie theory.
Figure 3B:
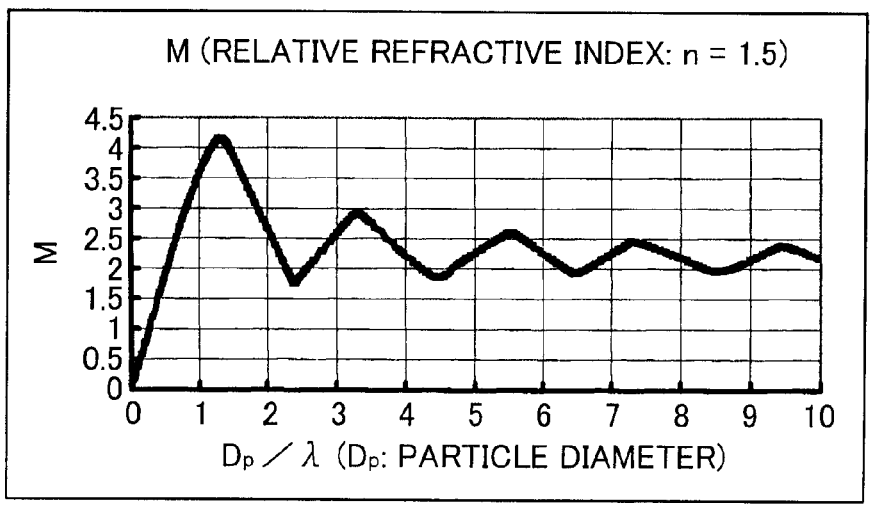
Figure 3C:
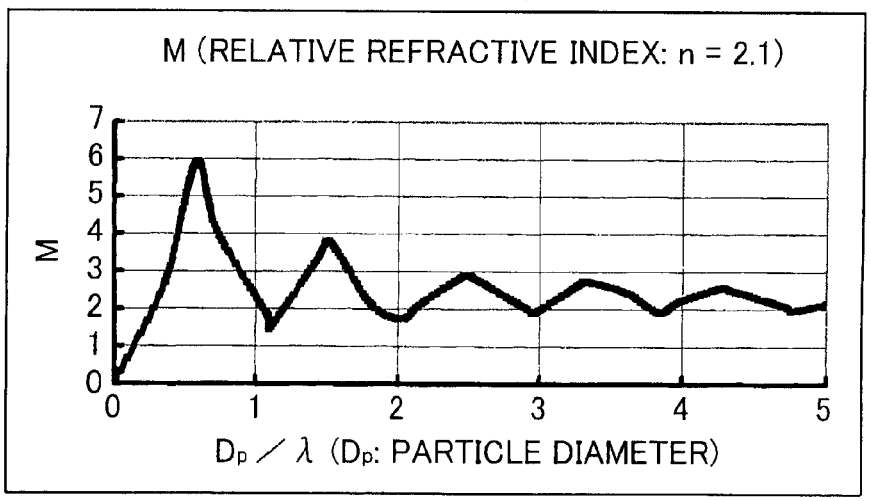

FIGS. 3A, 3B and 3C show how M vibrates when the relative refractive index n is 1.1, 1.5, and 2.1, respectively. From these drawings, it can be seen that the scattering cross section Φ in the Mie scattering region vibrates and converges as the particle diameter $D_p$ increases. Also in this region of vibration, a value by which to multiply a converging geometrical scattering cross section $\pi a^2$ in the Mie scattering region can be obtained in a wide range of about 1 to 2 according to the particle diameter from FIGS. 3A, 3B, and 3C.

Figure 4:
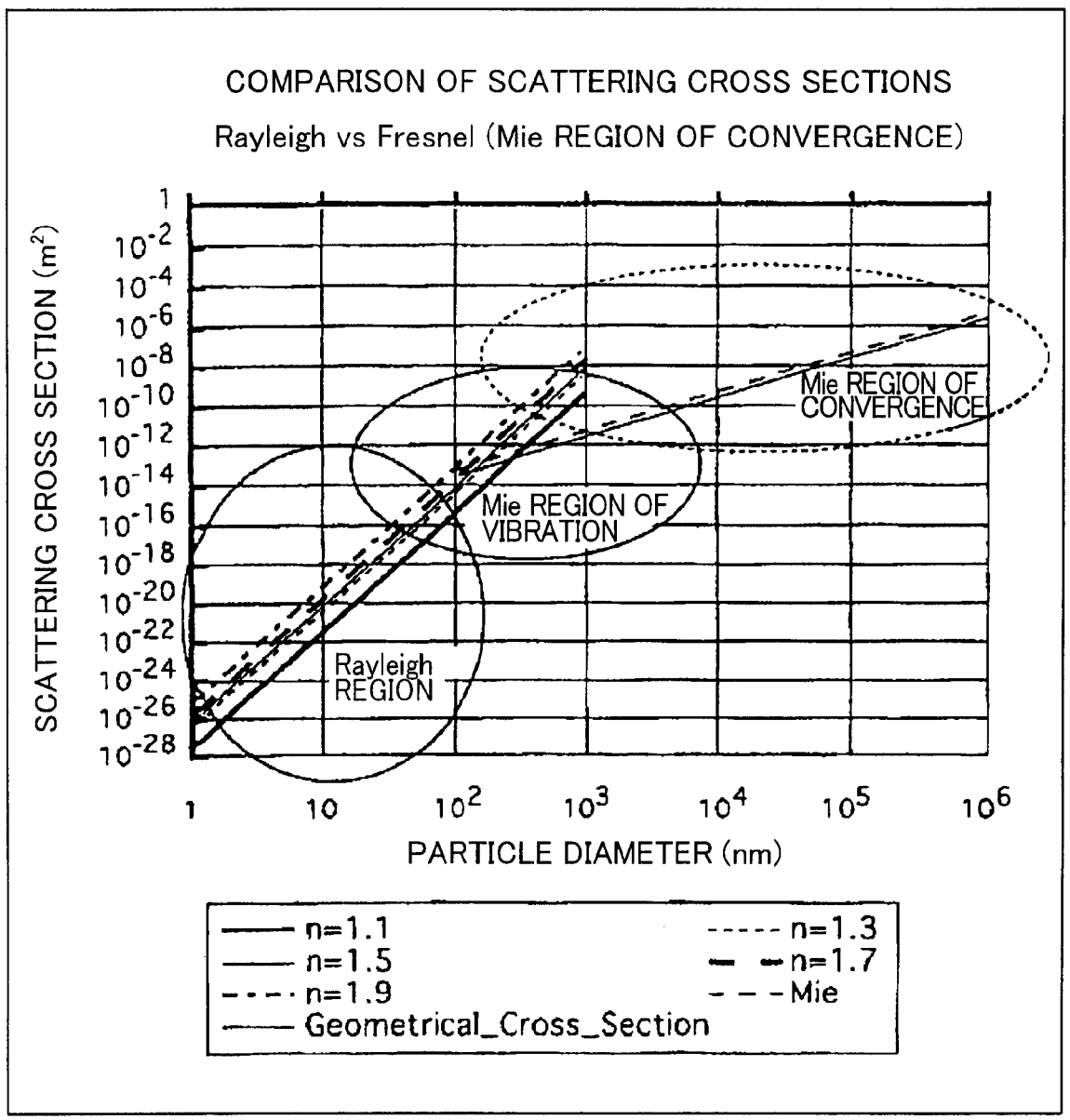
FIG. 4 illustrates results of computer simulations showing the relation between particle diameter and scattering cross section for some different relative refractive indices.
Figure 5:
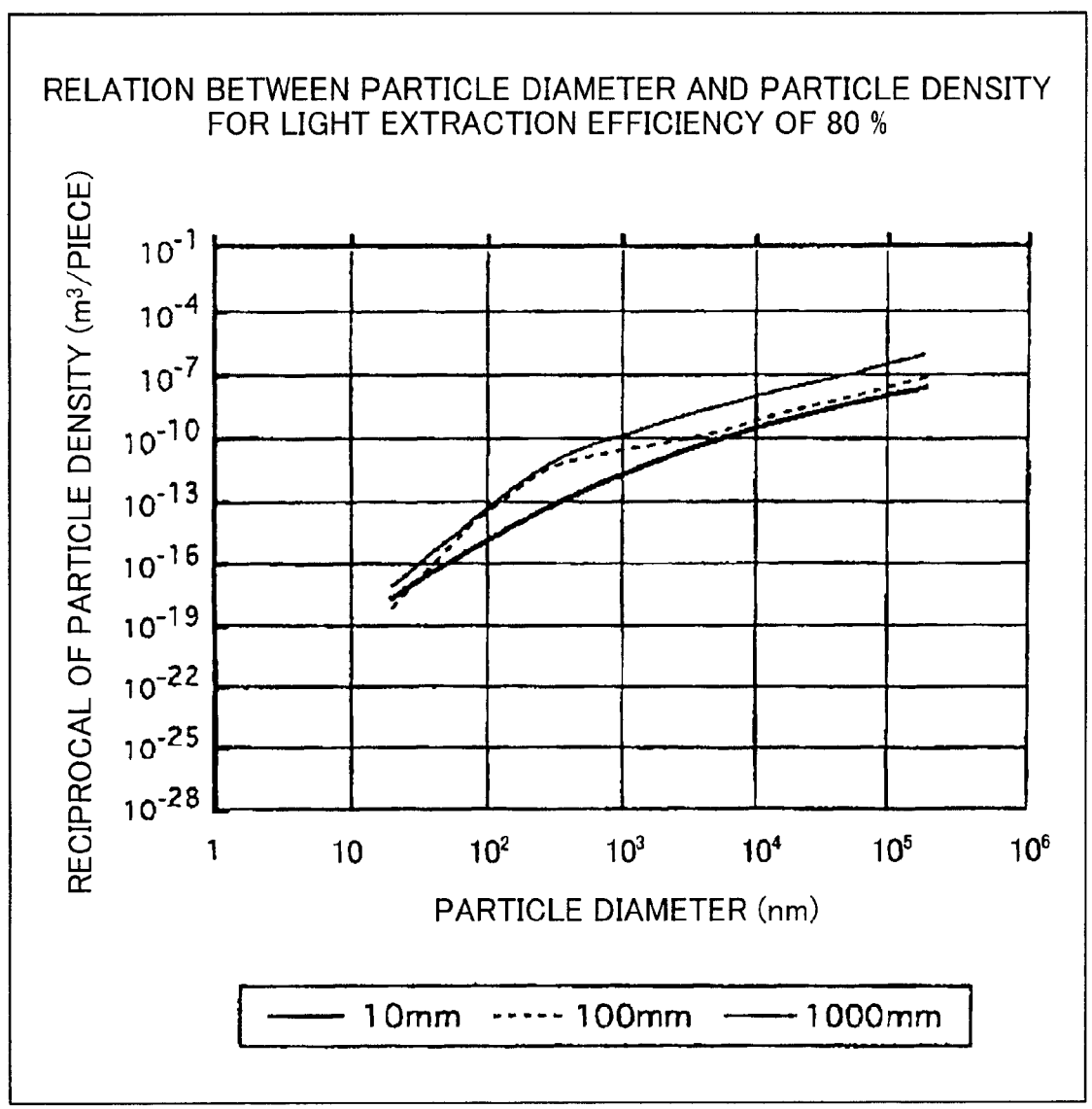
FIG. 5 illustrates results of computer simulations showing the relation between particle diameter and reciprocal of a particle density in a multi-particle system.

FIG. 4 shows results showing relations between particle diameter $D_p$ and scattering cross section Φ obtained for some different relative refractive indices "n" based on the formulae (6) and (8). FIG. 5 shows results of a computer simulation showing relations between particle diameter $D_p$ in a multi-particle system and reciprocal of the particle density multiplied by a certain value according to Mie scattering theory.

These computer simulations are based upon an assumption that light having a limited divergence angle is allowed to enter cubic optical media of various dimensions each measuring 10 mm to 1,000 mm square and containing particles therein. Accordingly, the dimensions of the incident light and the cube change similarly. The particle density $D_p$ was changed in a wide range from Rayleigh scattering region to Fresnel diffraction region. These computer simulations were also based upon assumptions that light is emitted from a position opposite the incident side in a same direction as that of the incident light, and that the light extraction efficiency at a light emitting end of the cube is about 80%.

FIGS. 4 and 5 show that there is a close relation between the scattering cross section and the number of particles in an optical medium having limited dimensions.

In the light guide unit 32, the end surface 33a through which light is admitted, the side wall surfaces through which light is emitted, and/or the underside surface 33b that reflects light, preferably have a surface roughness Ra of smaller than 380 nm, thus, Ra<380 nm.

When the surface roughness Ra of the end surface 33a through which light is admitted is set to smaller than 380 nm, diffuse reflection on the surfaces of the light guide unit can be ignored or, in other words, diffuse reflection on the surfaces of the light guide unit can be prevented and, thus, light admission efficiency can be enhanced.

Further, when the surface roughness Ra of the side wall surfaces through which light is emitted is set to smaller than 380 nm, transmission by diffuse reflection through the surfaces of the light guide unit can be ignored or, in other words, diffuse reflection and transmission on the surfaces of the light guide unit can be prevented and, therefore, light is allowed to travel further deep into the light guide unit by total reflection.

Further, when the surface roughness Ra of the underside surfaces 33b that reflect light is set to smaller than 380 nm, diffuse reflection can be ignored or, in other words, diffuse reflection on those surfaces that reflect light can be prevented and, therefore, all the reflected components of light are allowed to travel further deep into the light guide unit.

Figure 9:
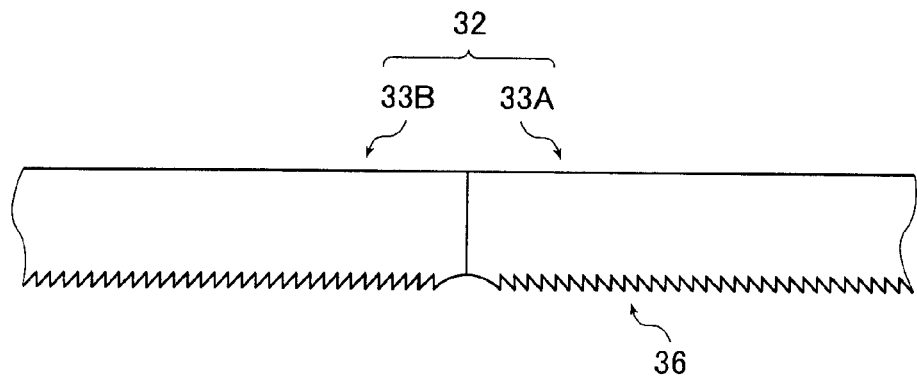
FIG. 9 is a cross-sectional view illustrating part of the underside of a light guide unit as enlarged showing how prisms are formed on the underside of the light guide unit.

The light guide unit 32 preferably has a prism array formed on the underside surface 33b. FIG. 9 partially illustrates how prisms 36 are arranged in rows.

The prisms 36 are formed such that they lie in rows perpendicular to the lengthwise direction of the light guide unit 32. The array of prisms 36 formed on the underside surfaces 33b of the light guide unit 32 causes collimated luminous fluxes admitted through the end surfaces of the light guide unit 32 to sequentially rise substantially vertically with respect to the lengthwise direction of the light guide unit. Thus, the light emitted through the lateral surfaces of the light guide unit 32 has a light amount distribution rendered uniform throughout the whole length of the light guide unit.

Each of the prisms 36 may have any shape desired and preferably has a vertex angle of 45°. A prism with a vertex angle of 45° causes collimated luminous fluxes admitted through the end surfaces of the light guide unit 32 to strike the inclined surfaces of the prisms and are totally reflected, whereon the luminous fluxes rise substantially vertically. Thus, the light emitted through the lateral surfaces of the light guide unit 32 has a light amount distribution with a further enhanced uniformity throughout the whole length of the light guide unit.

Now, the light guide plate 18 will be described. As illustrated in FIG. 1B, the light guide plate 18 comprises the rectangular light emitting plane 18a, a pair of thick portions 18b extending parallel to one side of the light guide plate 18, thin end portions 18c formed parallel to the one side on both sides of the thick portions 18b, inclined rear portions 18e growing thinner from the thick portions 18b in a direction perpendicular to the one side toward the thin end portions 18c to form inclined surfaces 18d, and the parallel groove 18f which accommodates the light guide unit 32 and is formed in the thick portions 18b parallel to the one side. In brief, the light guide plate 18 is a plate-shaped member having a surface with a rectangular external shape and formed of a transparent resin. The light emitting plane 18a of the light guide unit 18 is flat; the light guide plate 18 has on the other side a surface inclined with respect to the light emitting plane 18a such that the plate thickness decreases toward either side thereof.

The parallel groove 18f of the light guide plate 18 is so formed as to have a triangular sectional shape in order to accommodate the light guide unit 32 that has a shape of a triangular prism. In the present invention, the sectional shape of the parallel groove refers to the shape represented in a plane in which the parallel groove is cut perpendicular to its lengthwise direction, and formed by segments corresponding to the wall surfaces of the light guide plate defining the parallel groove and the straight line connecting both ends of these segments. Hereinafter, the cross section in which the parallel groove is cut in a plane perpendicular to its lengthwise direction will be referred to simply as the cross section of the parallel groove.

Accordingly, the light guide plate 18 has a pair of inclined rear surfaces 18d symmetrical with respect to a plane containing the central axis of the parallel groove 18f and perpendicular to the light emitting plane 18a; the inclined rear surfaces 18d are each inclined with respect to the light emitting plane 18a such that their thickness decreases toward the thin end portions 18c.

Out of the light emitted from the light guide unit placed in the parallel groove 18 in the light guide plate 18 configured as illustrated in FIG. 1B, the light admitted through the wall surfaces of the parallel groove 18f into the light guide plate 18 is reflected by the rear surfaces 18d of the light guide plate 18 and then emitted through the light emitting plane 18a.

At this time, some light may leak through the inclined rear surfaces 18d of the light guide plate 18 but then is reflected by the reflective sheets 18 formed on the side of the light guide plate 18 closer to the inclined rear surfaces 18d, enters the light guide plate 18 again, and then exits from the light emitting plane 18a.

In the light guide plate 18, the parallel groove 18a through which light is admitted, the light emitting plane 18a, and/or the inclined rear surfaces 18d that reflect light, preferably have a surface roughness of smaller than 380 nm, thus, Ra<380 nm.

When the surface roughness Ra of the parallel groove 18f through which light is admitted is set to smaller than 380 nm, diffuse reflection components can be ignored or, in other words, diffuse reflection of light can be prevented and, therefore, light admission efficiency can be enhanced.

Further, when the surface roughness Ra of the light emitting plane 18a is set to smaller than 380 nm, diffuse reflection components on the surfaces of the light guide plate can be ignored or, in other words, diffuse reflection on the surfaces of the light guide plate can be prevented and, therefore, all the reflected components are allowed to travel further deep into the light guide plate.

Further, when the surface roughness Ra of the inclined rear surfaces that reflect light is set to smaller than 380 nm, diffuse reflection components on the surfaces of the light guide plate can be ignored or, in other words, diffuse reflection on the surfaces of the light guide plate can be prevented and, therefore, all the reflected components are allowed to travel further deep into the light guide plate.

In the present invention, the light guide plate 18 may be produced using, for example, a method of forming a heated resin feed by extrusion or injection molding, or casting polymerization method of forming a monomer, oligomer or the like in a mold by polymerization. The light guide plate 18 include transparent resins as exemplified by acrylic resins such as polycarbonate, PMMA (polymethyl methacrylate), PET (polyethylene terephthalate), PP (polypropylene), PC (polycarbonate), PMMA (polymethyl methacrylate), benzyl methacrylate, MS resins, other acrylic resins, and COP (cycloolefin polymer).

The diffuser sheet 14 is used to diffuse and render uniform the light emitted through the light emitting plate 18a of the light guide plate 18.

The diffuser sheet 14 is formed by imparting a light scattering property to a flat sheet material made of an optically transparent resin as exemplified by PET (polyethylene terephthalate), PP (polypropylene), PC (polycarbonate), PMMA (polymethyl methacrylate), benzyl methacrylate, MS resins, and other acrylic resins and COP (cycloolefin polymer). The method of forming the diffusion sheet 14 is not limited specifically. For example, a surface of the flat sheet material may be roughened to impart the light scattering property by machining to provide an asperity on the surface or by grinding (a surface subjected to such roughening is hereinafter referred to as "sand-rubbed surface"). The diffusion sheet may be alternatively formed by coating its surface with a material that diffuse light as exemplified by silica; pigments such as titanium oxide and zinc oxide; a resin; and beads of glass, zirconia, etc., together with a binder, or by kneading the above pigments or beads having a light scattering property into the above resin.

In the present invention, it is also preferable to use a film material with a thickness of 500 μm or less using the above material and imparted with light scattering property to form the diffusion sheet 14.

Preferably, the diffusion sheet 14 is disposed a given distance apart from the light emitting plane 18a of the light guide plate 18. The distance may be altered as appropriate according to the light amount distribution of light emitted from the light emitting plane 18a of the light guide plate 18. With the diffusion sheet 14 spaced apart a given distance from the light emitting plane 18a of the light guide plate 18, the light emitted from the light emitting plane 18a of the light guide plate 18 is further mixed (mixture) between the light emitting plane 18a and the diffusion sheet 14. This further enhances the uniformity of illuminance of light passing through the diffusion sheet 14 to illuminate the liquid crystal display panel 4. The diffusion sheet 14 may be spaced a given distance from the light guide plate 18a of the light guide plate 18 by, for example, providing spacers between the diffusion sheet 14 and the light guide plate 18.

When, in particular, it is allowable to slightly increase the thickness of the planar lighting device 2, the peak value of illuminance in the area of the light emitting plane 18a of the light guide plate 18 corresponding to the parallel groove 18f need not be reduced thoroughly by forming the sectional shape of the parallel groove 18f of the light guide plate 18 into a certain shape; uniformity of the illuminance distribution of the illumination light emitted from the diffusion sheet 14 may be achieved by reducing the peak value only partially and providing a gap between the diffusion sheet 14 and the light emitting plane 18a of the light guide plate 18. Also in cases where there is a limit to the improvement that can be made in the sectional shape of the parallel groove 18f of the light guide plate 18 (i.e., tapering of the peak end portion of the parallel groove) and hence the peak value of illuminance in the area of the light emitting plane 18a of the light guide plate 18 corresponding to the parallel groove 18f cannot be fully or sufficiently reduced, a gap may be provided between the diffusion sheet 14 and the light emitting plane 18a of the light guide plate 18 to render uniform the illuminance distribution of the illumination light emitted from the diffusion sheet 14.

The prism sheets 16 and 17 are transparent sheets formed by arranging a plurality of prisms in parallel and are capable of enhancing the light harvesting property of light emitted from the light emitting plane 18a of the light guide plate 18 to improve the brightness. One of the prism sheets 16 and 17 is disposed such that its prism array extends parallel to the parallel groove 18f of the light guide plate 18 whereas the other is disposed such that its prism array extends perpendicular to the parallel groove 18f of the light guide plate 18. Briefly, the prism sheets 16 and 17 are disposed such that their respective prism arrays extend in directions normal to each other.

The prism sheet 16 is provided such that the vertexes of its prisms face the light emitting plane 18a of the light guide plate 18. The prism sheets 16 and 17 may be arranged in such an order that the prism sheet 16 having prisms that extend in a direction parallel to the parallel groove of the light guide plate is provided immediately above the light guide plate and that the prism sheet having prisms that extend in a direction normal to the parallel groove 18f of the light guide plate 18 is provided on top of the prism sheet 16. The order of arrangement of the two prism sheets may be reversed.

While, in the illustrated case, the prism sheets 16 and 17 are used, if the illuminance on the light emitting plane 18a as achieved by the parallel groove 18f of the light guide plate 18 is at a further enhanced level, the prism sheet 16 or 17 or both may be dispensed with. Using a smaller number of expensive prism sheets or dispensing with all these prism sheets contributes to reducing the costs for the device.

The reflective sheets 22 are used to reflect light leaking from the rear surface (the underside in the drawings) of the light guide plate 18 so that it will be redirected back into the light guide plate 18 again, thereby enhancing the light use efficiency. The reflective sheets 22 are formed in such a manner as to cover the underside (inclined surfaces) of the light guide plate 18.

The reflective sheets 22 may be formed of any material that is capable of reflecting the light leaking from the rear surface (the underside in the drawings) of the light guide plate 18. It may be formed, for example, of a resin sheet produced by kneading PET, PP (polypropylene), etc. with a filler and then drawing the resultant mixture to form voids therein to increase the reflectance; a sheet with a specular surface formed by, for example, depositing aluminum vapor on the surface of a transparent resin sheet or a white resin sheet of the type described above; a metal foil such as an aluminum foil or a resin sheet carrying a metal foil; or a metal thin plate having sufficient reflective property on the surface.

The reflector 20 is provided behind the light guide unit 32 so as to block the parallel groove 18f of the light guide plate 18. The reflector 20 reflects light from the underside of the light guide unit 32 so that the light can be admitted through the sidewall surfaces of the parallel groove 18f of the light guide plate 18. The reflector 20 may be formed of the same material as the above-described reflective sheets, namely, a resin material, a metal foil or a metal plate provided with sufficient reflective property on the surface.

As described above, the light guide unit of the inventive rod-type lighting device is accommodated in the parallel groove of the light guide plate of the planar lighting device.

In the case of a conventional planar lighting device using cold cathode tubes, the cold cathode tubes, typically cylindrical, needed to be accommodated accurately in the parallel grooves in order to admit light radiated by the cold cathode tubes into the light guide plate efficiently and with the least loss possible. Thus, a thin light guide plate was difficult to design.

With the inventive planar lighting device, however, since the light guide unit of the rod-type lighting device is machined to substantially the same external shape as that of the parallel groove, the entire planar lighting device can be made thinner without regard to the external shape of the light source used.

Further, sufficient light can be emitted through the light emitting plane without depending on a complicated structure by kneading or dispersing small particles that satisfy given required relations into the light guide unit of the inventive rod-type lighting device. Thus, efficiency of light emission through the lateral walls can be further enhanced.

Accordingly, the rod-type light source can be simplified in structure and, hence, manufactured at reduced costs.

The first embodiment of the present invention described above in detail is not limited to the mode as described but allows modifications in shape as follows.

<Examples of Modified Shapes>

In the first embodiment, the light guide unit of the rod-type lighting device is triangular in cross section perpendicular to the lengthwise direction. However, the light guide unit of the inventive rod-type lighting device may have a shape representing a circle, a partially cut-off ellipse, or part of a parabola in cross section perpendicular to the lengthwise direction.

Figure 10:
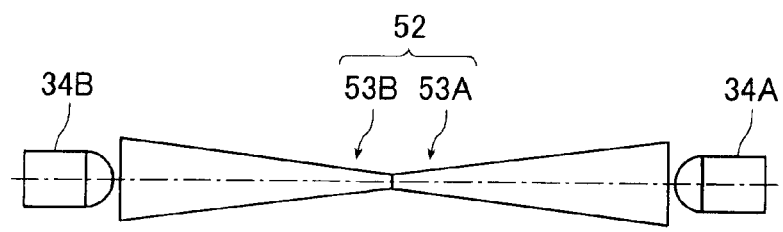
FIG. 10 illustrates an example of a light guide unit having a circular cross section perpendicular to its lengthwise direction.

Referring to FIGS. 10 to 12, examples of light guide units having modified shapes in cross section perpendicular to the lengthwise direction will be described. FIG. 10 illustrates an example of a light guide unit having a circular cross section perpendicular to its lengthwise direction; FIG. 11 illustrates an example of a light guide unit having a shape representing a partially cut-off ellipse in cross section perpendicular to its lengthwise direction; and FIG. 12 illustrates an example of a light guide unit having a shape representing part of a parabola in cross section perpendicular to its lengthwise direction.

FIG. 10 illustrate an example of a light guide unit of which the cross section perpendicular to its lengthwise direction is circular and grows thinner from the ends toward the center.

A light guide unit 52 illustrated in FIG. 10 is formed by connecting a pair of transparent units 53A and 53B having a shape of a frustum such that their ends having a smaller cross section are in close contact with each other. The light guide unit 52 thus configured is used, for example, in a light guide plate with a parallel groove of which the cross section perpendicular to the lengthwise direction has a semicircular shape.

Referring to the light guide unit illustrated in FIG. 10, point light sources as exemplified by LEDs are converted into a rod-type light source using the rod-type light guide unit, and the rod-type light source thus formed is embedded in the recess of the plate-type light guide unit, thus converting rod-type illumination into planar illumination, which may be used as a liquid crystal backlight unit.

Figure 11A:
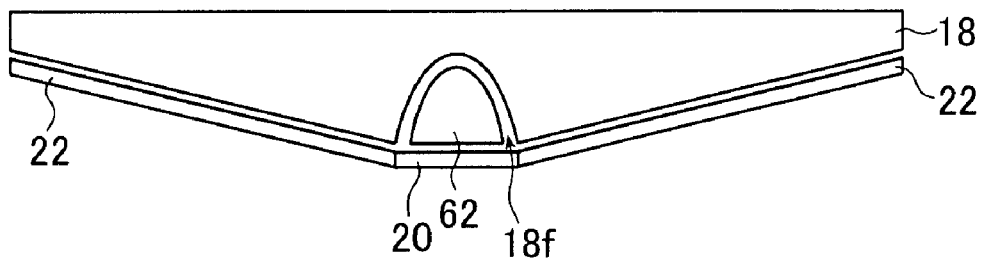
FIG. 11 illustrates an example of a light guide unit having a cross section perpendicular to its lengthwise direction that represents a partially cut-off ellipse.
Figure 11B:
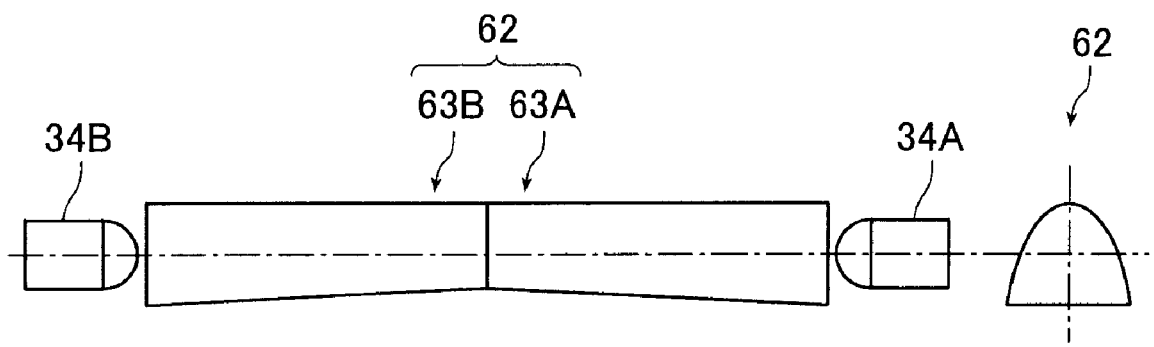
Figure 11C:
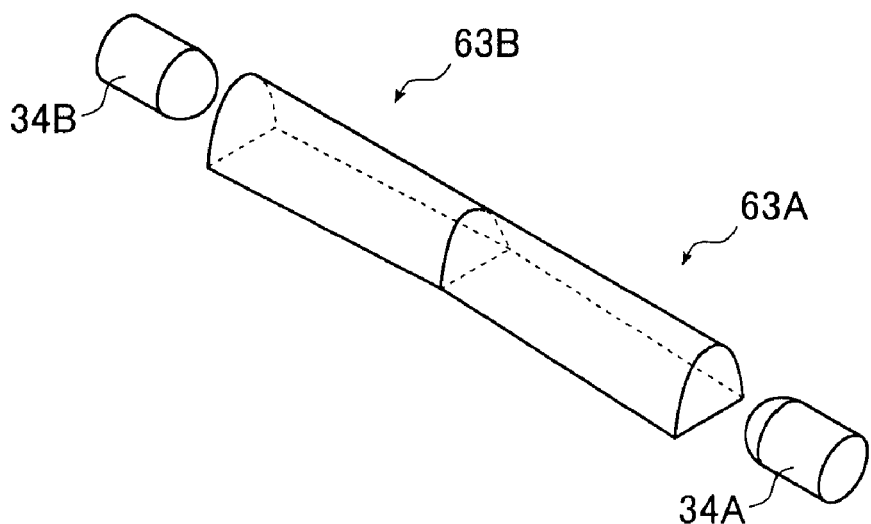

FIG. 11 illustrates an example of a light guide unit of a rod-type lighting device having a yet another configuration. FIG. 11A is a schematic cross sectional view illustrating how a light guide unit 62 is accommodated in the light guide plate 18 of which the parallel groove 18f has a sectional shape comparable to a partially cut-off ellipse; FIG. 11B is a schematic cross-sectional view of the light guide unit 62; and FIG. 11C is a schematic perspective view of the light guide unit 62.

As illustrated in FIGS. 11B and 11C, the light guide unit 62 has a shape comparable to a partially cut-off ellipse in cross section perpendicular to the lengthwise direction.

The light guide unit 62 consists of two transparent units 63A and 63B. The transparent units 63A and 63B each have a shape obtained by cutting an elliptic cylinder along a plane forming a given angle with its central axis and perpendicular to the major axis of the ellipse. The light guide unit 62 is configured by connecting the ends of the transparent units 63A and 63B having a smaller cross section. In applications, the light guide unit 62 thus configured is accommodated in the parallel groove 18f of the light guide plate 18 having a sectional shape representing part of an ellipse, as illustrated in FIG. 11A.

Beneath the inclined surfaces of the light guide plate 18 are disposed the reflective plates 22, whereas the reflector 20 is so disposed as to block the parallel groove 18f with the light guide unit 62 accommodated in the parallel groove 18f as illustrated in FIG. 11A. The light guide unit illustrated in FIG. 11A may have prisms formed on the underside surface thereof.

While the light guide units illustrated in FIGS. 10 and 11 are configured by connecting two transparent units, they may have a one-piece configuration.

Figure 12A:
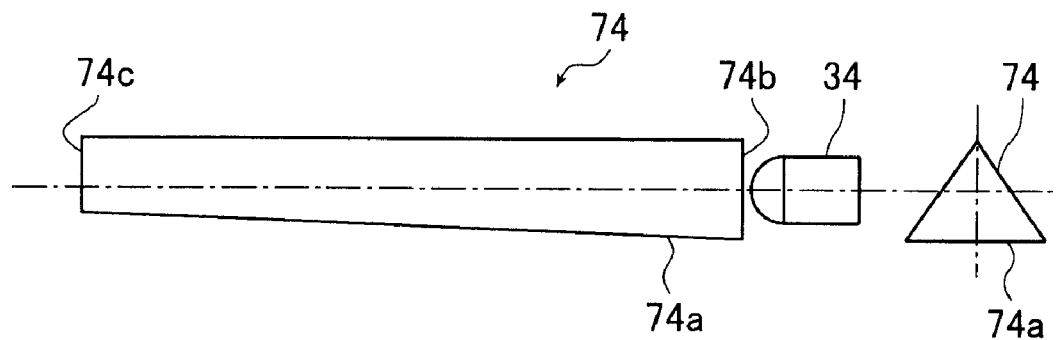
FIGS. 12A to 12C illustrate other examples of light guide units having different shapes in cross section perpendicular to their lengthwise direction.
Figure 12B:
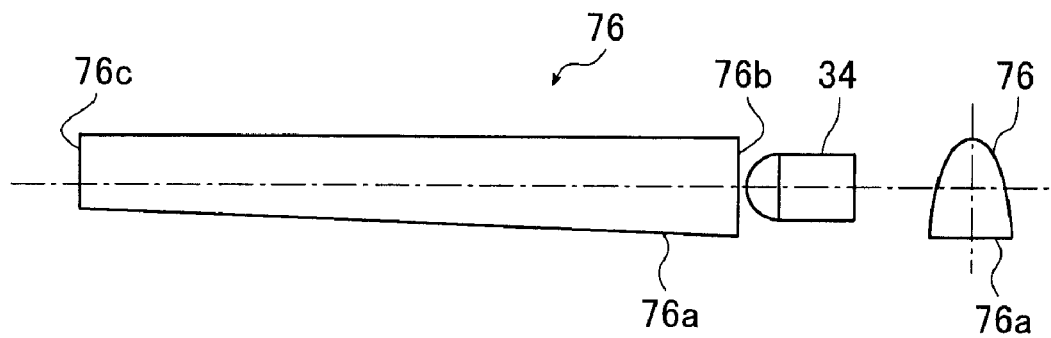
Figure 12C:
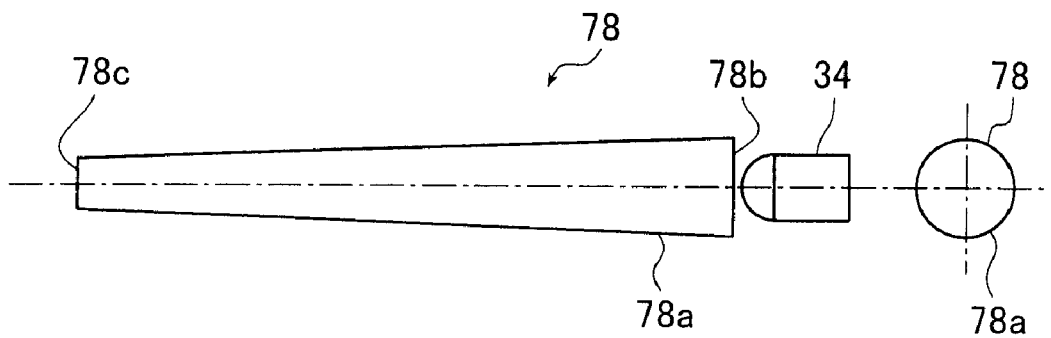

FIG. 12 illustrates an example of configuration of the rod-type lighting device where light from an LED light source is admitted through one end surface of the light guide unit formed by a single transparent unit. In each of FIGS. 12A, 12B, and 12C, a schematic side elevation of the light guide unit is given on the left-hand side and a schematic cross-sectional view perpendicular to the lengthwise direction of the light guide unit is given on the right.

A light guide unit 74 of the rod-type lighting device illustrated in FIG. 12A has a triangular shape in cross section perpendicular to the lengthwise direction and is configured such that the sectional area decreases progressively from one end surface (called a large diameter end surface) 74b through which light from the LED 34 is admitted toward the other end surface (called a small diameter end surface) 74c. In the illustrated example, the underside surface 74a of the light guide unit 74 is inclined upward from the large diameter end surface 74b of the light guide unit 74 in a direction toward the small diameter end surface 74c. The light guide unit 74 has a prism array formed on its underside surface 74a.

In the light guide unit 74 thus configured, light from the LED 34 admitted through the large diameter end surface 74b of the light guide unit 74 is reflected by the prism array provided on the underside surface 74a and then emitted through the lateral surfaces of the light guide unit to the outside.

A light guide unit 76 of the rod-type lighting device illustrated in FIG. 12B has a shape comparable to a partially cut-off ellipse in cross section perpendicular to the lengthwise direction and is configured such that the sectional area decreases progressively from a large diameter end surface 76b through which LED light is admitted toward a small diameter end surface 76c. The transparent unit 76 thus configured may be obtained for example by cutting a transparent elliptic cylinder along a plane forming a given angle with its central axis and perpendicular to the major axis of the ellipse. The light guide unit 76 thus configured may also have a prism array formed on the underside surface 76a thereof.

A light guide unit 78 of the rod-type lighting device illustrated in FIG. 12C has a circular cross section perpendicular to the lengthwise direction and has a shape growing progressively thinner from a large diameter end surface 78b through which LED light is admitted toward the other end or a small diameter end surface 78c. In brief, the illustrated light guide unit of the rod-type lighting device has a shape of an elongated frustum (conical shape).

Thus, LED light admitted through the large diameter end surface 78b can also be emitted through the lateral surfaces of the light guide unit 78 by using the light guide unit 78 thus configured.

Since LED light is only admitted through the large diameter end surfaces 74b, 76b, and 78b in the light guide units 74, 76, and 78 illustrated in FIGS. 12A, 12B, and 12C, respectively, part of light from the LED passing through the inside of the light guide units 74, 76, and 78 reaches the small diameter end surfaces 74c, 76c, and 78c on the opposite sides.

To ensure that such part of light from the LED is reflected on the small diameter end surfaces 74c, 76c, and 78c and redirected back into the inside of the light guide unit, the small diameter end surfaces 74c, 76c, and 78c may be machined to a specular surface, or a reflective plate may be provided to cover the small diameter end surfaces 74c, 76c, and 78c.

Described above are examples of light guide unit of the rod-type lighting device where light from the LED light source is admitted through one end surface. The inventive light guide unit, however, is not limited to such configuration described above but may have any configuration as desired, provided that light admitted through an end surface or surfaces of the light guide unit can be emitted through the lateral surfaces of the light guide unit.

Figure 13:
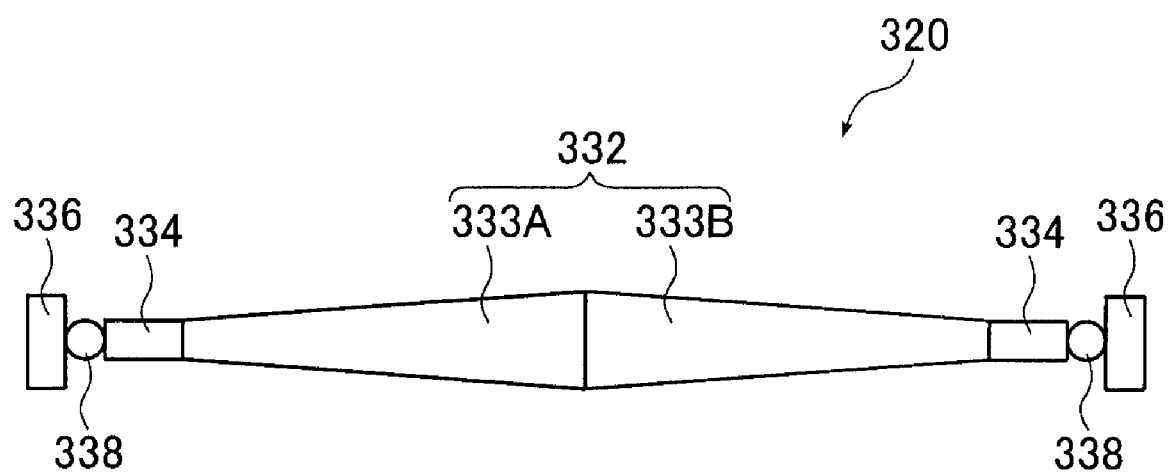
FIG. 13 is a schematic view illustrating the configuration of a rod-type lighting device according to the present invention.

Now, different embodiments of the rod-type lighting device than are described above will be explained. FIG. 13 illustrates a schematic configuration of a different rod-type lighting device. A rod-type lighting device 320 illustrated in FIG. 13 comprises a light guide unit 332, light mixers 334, LED elements 336 serving as light sources, and coupling lenses 338.

Referring to FIG. 13, the light guide unit 332 has such a shape that the outer diameter increases progressively toward the center thereof and is largest in the center in the axial direction. The light guide unit 332 has a substantially circular sectional shape. The light guide unit 332 is configured using a pair of transparent units 333A and 333B of which the outer diameter increases from one end surface toward the other end surface such that the end surfaces of a pair of these optical parts having a larger outer diameter are placed in close contact allowing no space therebetween. Materials that may be used to form the light guide unit 332 are substantially the same as those for the rod-type lighting device 320 described above and, hence, will not be described in detail.

While the light guide unit 332 under discussion is formed such that it has a substantially circular shape in cross section perpendicular to the axial direction, the present invention is not limited to such configuration; the light guide unit 332 may have various sectional shapes such as a triangle and a substantial ellipse, as in the case of the rod-type lighting device described earlier.

In applications, the light guide unit 332 of the rod-type lighting device 320 may be accommodated in the parallel groove of the light guide plate of the planar lighting device as in the previously described case. More specifically, the rod-type lighting device can be used as a light source in the planar lighting device by forming the parallel groove of the light guide plate of the planar lighting device to substantially the same shape as the external shape of the light guide unit of the rod-type lighting device, and accommodating the light guide unit of the rod-type lighting device in the parallel groove.

In FIG. 13, the light mixers 334A and 334B are transparent cylindrical optical members having light scattering particles mixed therein and are provided in close contact with both end surfaces of the light guide unit 332. The light mixers 334A and 334B function as mixing zones for mixing light admitted through the coupling lenses from the LED elements 336. Basically, the same material may be used to form the light mixers 334 as used for the light guide unit 332.

Figure 14A:
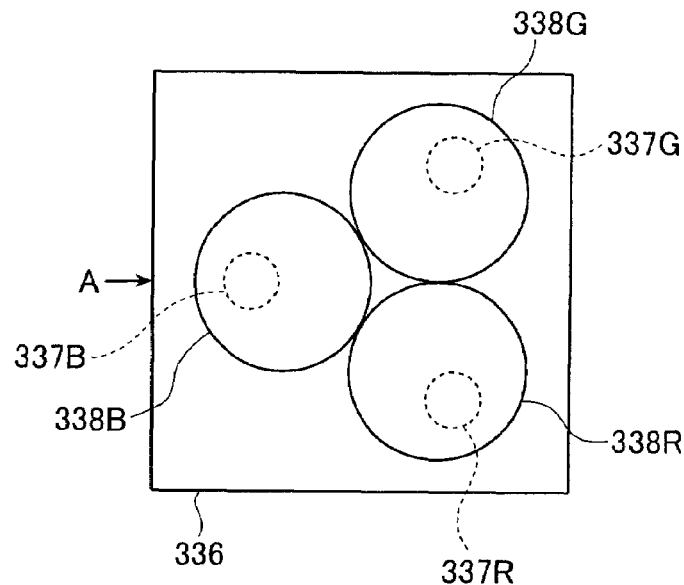
FIG. 14A is a schematic front view of LED elements and coupling lenses as seen from the front.
Figure 14B:
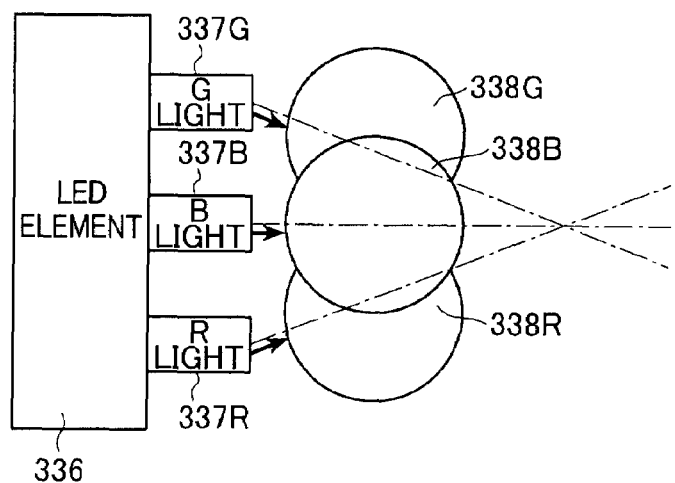
FIG. 14B is a schematic side elevation of the LED elements and coupling lenses as seen from a direction A indicated in FIG. 14A.

In FIG. 13, the LED elements 336 are configured using an R-LED 337R emitting red light (R), a B-LED 337B emitting blue light (B), and a G-LED 337G emitting green light (G). FIGS. 14A and 14B schematically illustrate the positions in which the LED elements 336 and the coupling lenses 338 are disposed. FIG. 14A is a schematic front view of the LED elements 336 and the coupling lenses 338 as seen from the front; FIG. 14B is a schematic side elevation of the LED elements 336 and the coupling lenses 338 as seen from the direction A in FIG. 14A. In the illustrated example, the coupling lenses 338 are formed of ball lenses; the ball lenses are disposed on the light emitting side of their respective LEDs. Specifically, ball lenses 338R, 338B, and 338G are disposed each for the R-LED 337R, the B-LED 337B, and the G-LED 337G, respectively, on the light emitting side of the LED elements 336. The directions of the optical axes of the R-LED 337R, the B-LED 337B, and the B-LED 337G are adjusted such that light emitted from the R-LED 337R, the B-LED 337B, and the G-LED 337G through the ball lenses 338R, 338B, and 338G, respectively, cross each other at a given position. Thus, the parallel light beams with their respective colors each passing through the ball lenses 338R, 338B, and 338G, become white light before entering the light mixers 334. While, in the example under discussion, the coupling lenses 338 are formed using ball lenses, the present invention is not limited thereto and may be configured using any optical parts desired that are capable of converting the light beams emitted from the LED elements 336 with their respective colors into parallel light beams. Lenticular lenses, cylindrical lenses, or aspherical lenses may for example be used.

In the rod-type lighting device illustrated in FIG. 13, light admitted from the LED elements 336 disposed on both end surfaces of the light guide unit 332 is radiated through the lateral surfaces of the light guide unit 332 as it is scattered by scatterers inside the light guide unit 332. Further, part of the light, after passing through a central part of the light guide unit 336, is reflected on the lateral surfaces of the light guide unit 332, and then emitted through the lateral surfaces. Thus functions the rod-type lighting device as a rod-type light source.

In the first embodiment, the parallel groove 18f of the light guide plate 18 is triangular in cross section perpendicular to the lengthwise direction. However, the light guide unit of the inventive rod-type lighting device may have a shape of a circle, a partially cut-off ellipse, or part of a parabola in cross section perpendicular to the lengthwise direction.

Examples of modified shapes of the light guide unit as seen in cross section perpendicular to the lengthwise direction will now be described referring to FIGS. 15 through 19.

Figure 15:
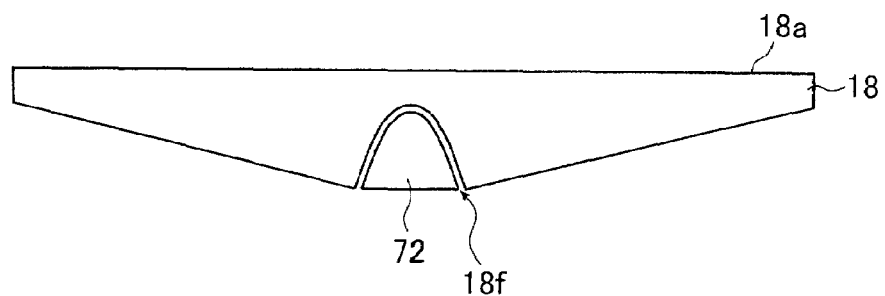
FIG. 15 is a schematic cross-sectional view illustrating a light guide plate of which the parallel groove has a cross section formed by a segment of a hyperbola.
Figure 16:
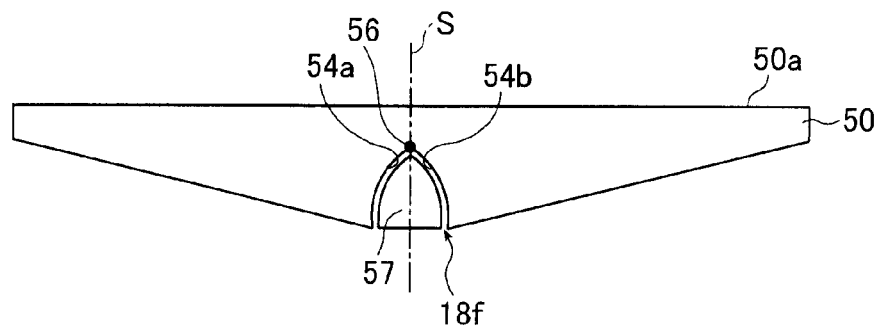
FIG. 16 is a schematic cross-sectional view illustrating a light guide plate of which the parallel groove has a cross section formed by segments of two arcs.
Figure 17:
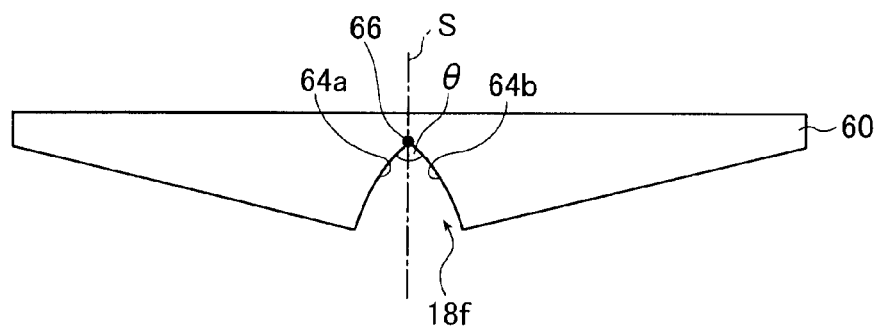
FIG. 17 is a schematic cross-sectional view illustrating a light guide plate of which the parallel groove has a cross section formed by segments of two parabolas.
Figure 18:
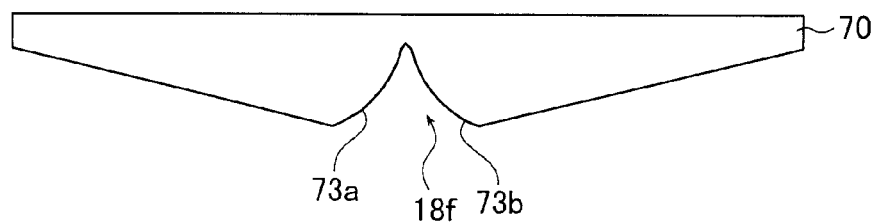
FIG. 18 is a schematic cross-sectional view illustrating a light guide plate of which the parallel groove has a cross section formed by segments of two convex curves.
Figure 19:
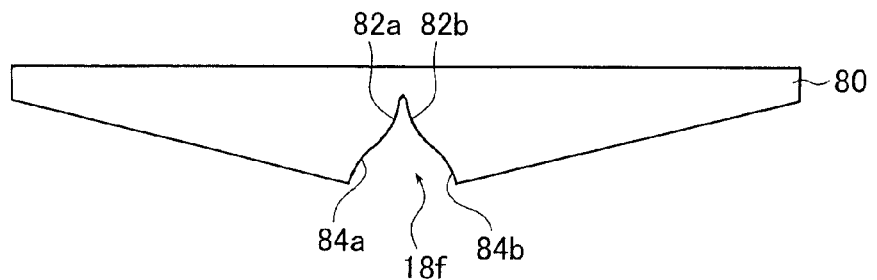
FIG. 19 is a schematic cross-sectional view illustrating a light guide plate of which the parallel groove has a cross section formed by combined segments of convex and concave curves.

FIG. 15 shows a schematic cross-sectional view of a light guide plate with a parallel groove having a sectional shape formed by a segment of a hyperbola; FIG. 16 shows a schematic cross-sectional view of a light guide plate with a parallel groove having a sectional shape formed by segments of two arcs; and FIG. 17 shows a schematic cross-sectional view of a light guide plate with a parallel groove having a sectional shape formed by segments of two parabolas. FIG. 18 shows a schematic cross-sectional view of a light guide plate with a parallel groove having a sectional shape formed by two different curves; FIG. 19 shows a schematic cross-sectional view of a light guide plate with a parallel groove having a sectional shape formed by combined convex and concave curves.

Referring to FIG. 15, the parallel groove 18f may also be formed such that the part of the light guide plate 18 corresponding to the wall surfaces defining the parallel groove 18f have a linear shape representing part of a hyperbola or part of an ellipse in cross section perpendicular to its lengthwise direction. Alternatively, the part corresponding to the wall surfaces of the light guide plate defining the parallel groove may have a linear shape representing a catenary.

In such configuration, the light guide unit 72 to be accommodated in the parallel groove 18f may also be machined to substantially the same shape as the sectional shape of the parallel groove 18f. Specifically, the side walls of the light guide unit 72 are then formed such that the part corresponding to the lateral surfaces of the light guide unit 72 have a linear shape representing part of a hyperbola in cross section of the light guide unit 72.

In the present invention, the parallel groove may also be formed such that the part corresponding to the deepest portion of the parallel groove is pointed in cross section of the parallel groove. To be more specific, the part corresponding to the deepest portion of the parallel groove may have a linear shape defined by segments of two curves or straight lines having an intersection at which they cross each other at an acute angle in cross section of the parallel groove, the segments of the two curves or straight lines being symmetrical with respect to the center line passing through the center of the parallel groove and perpendicular to the light emitting plane of the light guide plate. In the present invention, uniform light can be emitted through the light emitting plane of the light guide plate irrespective of whichever sectional shape described above the parallel groove of the light guide plate may have.

FIG. 16 illustrates an example where the part of the light guide plate corresponding to the wall surfaces defining the parallel groove has a linear shape in cross section of the parallel groove formed by segments of two curves having an intersection at which they cross each other at an acute angle and being symmetrical with respect to the center line passing through the center of the parallel groove 18f and perpendicular to the light emitting plane of the light guide plate.

FIG. 16 illustrates a light guide plate 50, where two curves 54a and 54b are arcs symmetrical with respect to a center line S passing through the center of the parallel groove and perpendicular to a light emitting plane 50a of the light guide plate 50. In this case, the arc 54a corresponding to one of the side walls defining the parallel groove 18f has its center located in a different position from that of the arc 54b corresponding to the other side wall as illustrated in FIG. 16. Thus, a portion 56 at which both side walls each in the form of an arc cross has a pointed shape as illustrated in FIG. 16. In this case, the side walls of a light guide unit 57 to be accommodated in the parallel groove 18f may be machined to a shape matching the shape of the parallel groove 18f as illustrated in the same drawing.

FIG. 17 illustrates another example where the part of the light guide plate corresponding to the wall surfaces defining the parallel groove has a linear shape in cross section of the parallel groove formed by segments of two curves having an intersection at which they cross each other at an acute angle and being symmetrical with respect to the center line passing through the center of the parallel groove and perpendicular to the light emitting plane of the light guide plate. A light guide plate 60 illustrated in FIG. 17 has two curves 64a and 64b forming parabolas symmetrical with respect to a center line S passing through the center of the parallel groove and perpendicular to the light emitting plane of the light guide plate. In FIG. 17, the parabola 64a forming one of the side walls defining one of the side walls of the parallel groove 18f has its focal point located in a different position from that of the parabola 64b forming the other side wall 22b.

In cases where the part of the light guide plate 18 corresponding to the wall surfaces defining the parallel groove 18f has a linear shape in cross section of the parallel groove formed by two curves 64a and 64b crossing each other at an intersection 66 as illustrated in FIG. 17, an angle θ formed by a tangent to the curve 64a corresponding to one of the side walls of the parallel groove 18f at the intersection (pointed end) 66 and a tangent to the curve 64b corresponding to the other side wall at the intersection 64 is preferably not greater than 90°, more preferably not greater than 60°.

FIG. 18 illustrates an example of a light guide plate 70 where the part of the light guide plate 18 corresponding to the wall surfaces defining the parallel groove 18f has a linear shape in cross section of the parallel groove formed by two curves 73a and 73b curving outward toward the center of the parallel groove 18f.

FIG. 19 illustrates an example of a light guide plate 80 where the part of the light guide plate corresponding to the wall surfaces defining the parallel groove 18f has a linear shape in cross section of the parallel groove formed by curves 82a and 82b curving outward toward the center of the parallel groove 18f combined with curves 84a and 84b curving inward. The light guide plates 70 and 80 each having a parallel groove with a sectional shape as illustrated in FIGS. 18 and 19 are also capable of emitting light having a sufficient illuminance through the light emitting plane wile limiting the generation of bright lines.

Thus, the deepest portion of the parallel groove may have a linear shape in cross section of the parallel groove representing curves curving outward or inward with respect to the center of the parallel groove, straight lines, or a combination thereof.

The curves are not limited to the illustrated arcs but may be a segment or segments of an ellipse, a parabola, or a hyperbola curving outward or inward with respect to the center of the parallel groove.

Further, in the present invention, the curves forming the parallel groove may be a segment or segments of, for example, a circle, an ellipse, a parabola, or a hyperbola curving outward or inward with respect to the center of the parallel groove, preferably curves that can be approximated by a 10th-order function, provided that the part corresponding to the deepest portion of the parallel groove tapers in cross section of the parallel groove in a manner to be described.

In cases where the parallel groove of the light guide plate is modified to any of the shapes illustrated in these drawings, the light guide unit to be accommodated in the parallel groove, though not shown, may be machined to a shape that matches the shape of the parallel groove.

Figure 20:
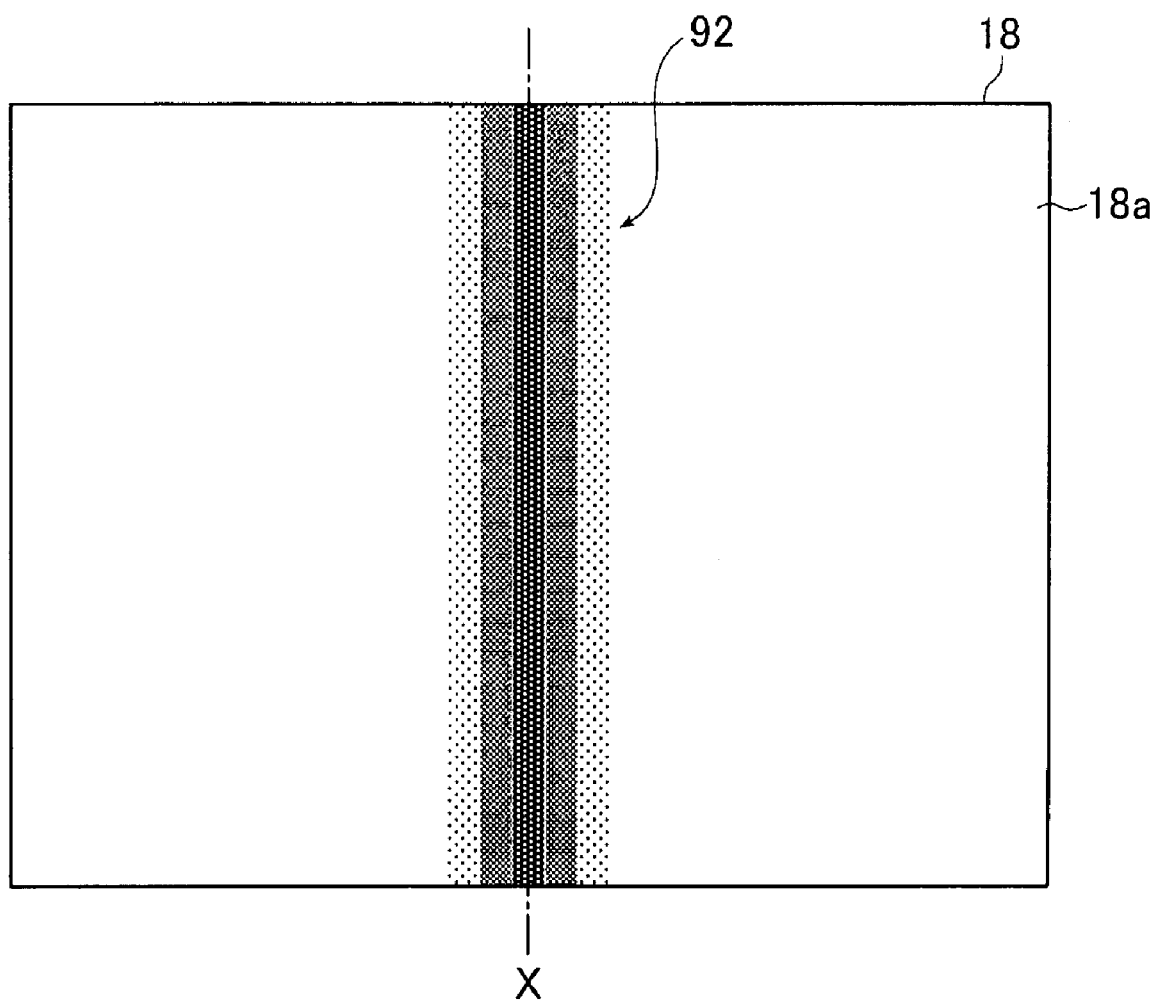
FIG. 20 illustrates a halftone dot pattern formed on the light emission side of a light guide plate.

As illustrated in FIG. 20, the inventive light guide plate may be provided on the light emitting plane 18a thereof with a halftone dot pattern 92 by means of printing, for example, such that the halftone dot density is highest at a certain center line X, lowering progressively from the center line X toward both sides (in a direction perpendicular to the center line). Such halftone dot pattern 92, when formed on the light emitting plane 18a of the light guide plate 18 such that the center line X of the halftone dot pattern 92 coincides with the center line of the parallel groove of the light guide plate 18, can limit the generation of bright lines or occurrence of unevenness on the light emitting plane 18a of the light guide plate 18.

Instead of printing the halftone dot pattern 92 on the light guide plate 18, a thin sheet bearing a halftone dot pattern formed thereon may be placed on the light emitting plane. The halftone dots may have any shape desired such as a rectangle, a circle, and an ellipse; the halftone dot density may be determined as appropriate according to the intensity and distribution of the bright lines.

Further, instead of forming the halftone dot pattern by means of printing, the area where the halftone dot pattern would otherwise be formed may be roughened to provide a sand-rubbed surface. Such sand-rubbed surface may be formed in the deepest portion or on the side walls of the parallel groove of the light guide plate.

In the light guide plate where the wall surfaces forming the parallel groove 18f has a triangular (V-shaped) sectional shape as in the light guide plate 18 illustrated in FIG. 1, or the light guide plate where the deepest portion of the parallel groove has a V-shaped sectional shape, the area just above the light source 12, i.e., the central part of the rectangular light emitting plane 18a, has a low relative illuminance according to the knowledge of the inventor of the present invention. In such cases where the parallel groove has a triangular sectional shape, it is preferable that the peak (deepest portion) of the parallel groove is leveled to provide a given flat width, or formed into a curve having a relatively small radius of curvature in order to achieve uniform illuminance on the light emitting plane. According to the present invention, a mere design whereby the deepest portion of the parallel groove of the light guide plate is given a sectional shape as described above makes it possible to optimize and render uniform the illuminance on the light emitting plane of the light guide plate.

When the deepest portion of the parallel groove is formed to a shape as described above, the light guide unit to be accommodated in the parallel groove also is preferably machined to an identical or a similar shape described above.

According to the present invention, the portion where the rear surfaces cross each other at a symmetrical plane S, i.e., the peak end portion of the parallel groove, may of course have a sectional shape representing not only a chamfered flat figure or a figure rounded into a circle, but also an ellipse, a parabola, or a hyperbola. In addition, the portion where the rear surfaces cross each other is preferably sand-rubbed, which reduces the peak value of illuminance or brightness on the light emitting plane.

In the inventive light guide plate, the peak end portion of the parallel groove 18f of the light guide plate 18 is tapered such that the peak value of illuminance in a first portion of the light emitting plane 18a of the light guide plate 18 is not greater than three times, preferably not greater than twice the average value of illuminance in second portions of the light emitting plane 18a of the light guide plate 18 in the illuminance distribution on the light emitting plane of the light guide plate.

The peak value of the illuminance in the first portion of the light emitting plane 18a of the light guide plate 18 is reduced to not greater than three times the average value of the illuminance in the second portions of the light emitting plane 18a of the light guide plate 18 because the illuminance distribution of the illumination light emitted through the light emitting plane 18a of the light guide plate 18 will then have a further enhanced uniformity as compared with uniformity that has been conventionally possible; accordingly, the illumination light emitted through the light emitting plane 18a of the light guide plate 18 need not be diffused (e.g., mixed) thoroughly; thus, inexpensive diffusion sheets 14 having only a moderate diffusion efficiency may also be used, and the number of sheets used may be reduced; in addition, expensive prism sheets 16 and 17 may be dispensed with, inexpensive prism sheets 16 and 17 having only a moderate diffusion efficiency may be used, or the number of sheets used may be reduced.

While, in the first embodiment, the prism sheets 16 and 17 are used to enhance the light harvesting property of light emitted through the light emitting plane 18a of the light guide plate 18 for improved brightness, it is preferable to interpose additional prism sheets 19 between the reflective sheets 22 and the inclined surfaces 18d as illustrated in FIG. 21.

Figure 21A:
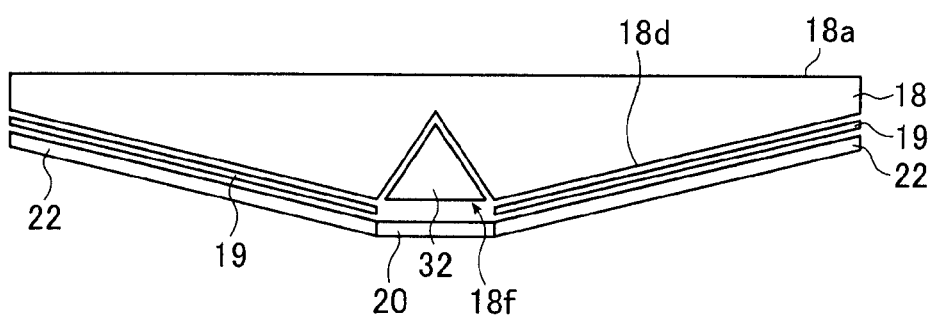
FIG. 21A is a cross-sectional view illustrating how prism sheets are disposed between reflective sheets and inclined rear surfaces of a light guide plate used in the inventive planar lighting device.
Figure 21B:
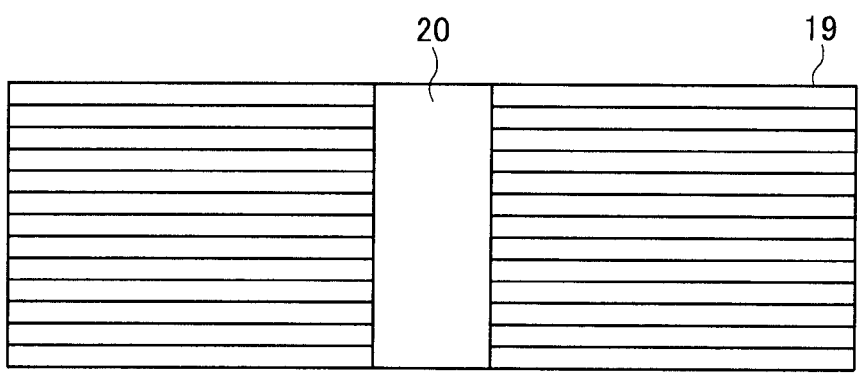
FIG. 21B is a schematic top plan view of the prism sheets, as seen from the light guide plate, disposed between the reflective sheets and the inclined rear surfaces of the light guide plate.
Figure 21C:
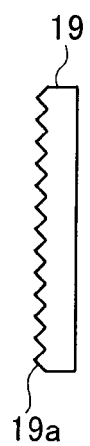
FIG. 21C is a schematic lateral cross-sectional view of the prism sheets.

FIG. 21A is a schematic cross-sectional view illustrating how the prism sheets 19 are provided between the reflective sheets 22 and the inclined surfaces 18d of the light guide plate 18; FIG. 21B is a schematic top plan view of the prism sheets 19 interposed between the reflective sheets 22 and the inclined surfaces 18d of the light guide plate 18 as seen from the light guide plate; and FIG. 21C is a schematic cross-sectional view of the prism sheets 19.

The prism sheets 19 interposed between the reflective sheets 22 and the inclined surfaces 18d of the light guide plate 18 are preferably provided such that prisms 19a extend in a direction perpendicular to the parallel groove 18f of the light guide plate 18 and that the vertexes of the prisms 19a face the inclined surfaces 18d of the light guide plate 18.

Instead of the prism sheets, one may use optical elements having similar effects to the prism sheets; for example, a sheet on which optical elements having lens effects such as lenticular lenses, concave lenses, convex lenses, or optical elements in pyramidal shape are regularly arranged may be provided.

In the first embodiment, the light sources of the rod-type lighting device 12 are the LEDs 34A and 34B. However, the light sources of the inventive rod-type lighting device 12 may for example be configured using high-brightness LEDs and are preferably configured using RGB-LEDs or white LEDs. Apart from these, incandescent lamps and miniature bulbs may also be used.

When RGB-LEDs are used for LEDs 34A and 34B, the RGB-LEDs are preferably pulse-lighted sequentially. Pulse-lighting enables reduction in power consumption. When pulse-lighting each of the R-, G-, and B-LEDs sequentially, the LEDs are preferably lighted by AC (alternate current) at a cycle of several milliseconds or less. When the LEDs are lighted at such a cycle, light from each of the R-, G-, and B-LEDs looks to be integrated to the human eye because of its response characteristics and thus it appears as if the LEDs were lighted by direct current. Furthermore, lighting the LEDs in such a manner eliminates the need for RGB filters in use for a backlight for a liquid crystal display panel and, thus, the brightness can be increased about two-fold over the cases where the filters are used.

In the first embodiment, the rod-type lighting device has a single light guide plate 18. However, one may configure the rod-type lighting device as a light guide member having a large light emitting plane by connecting two or more light guide plates 18 such that their end surfaces are placed in close contact with each other.

Figure 22:
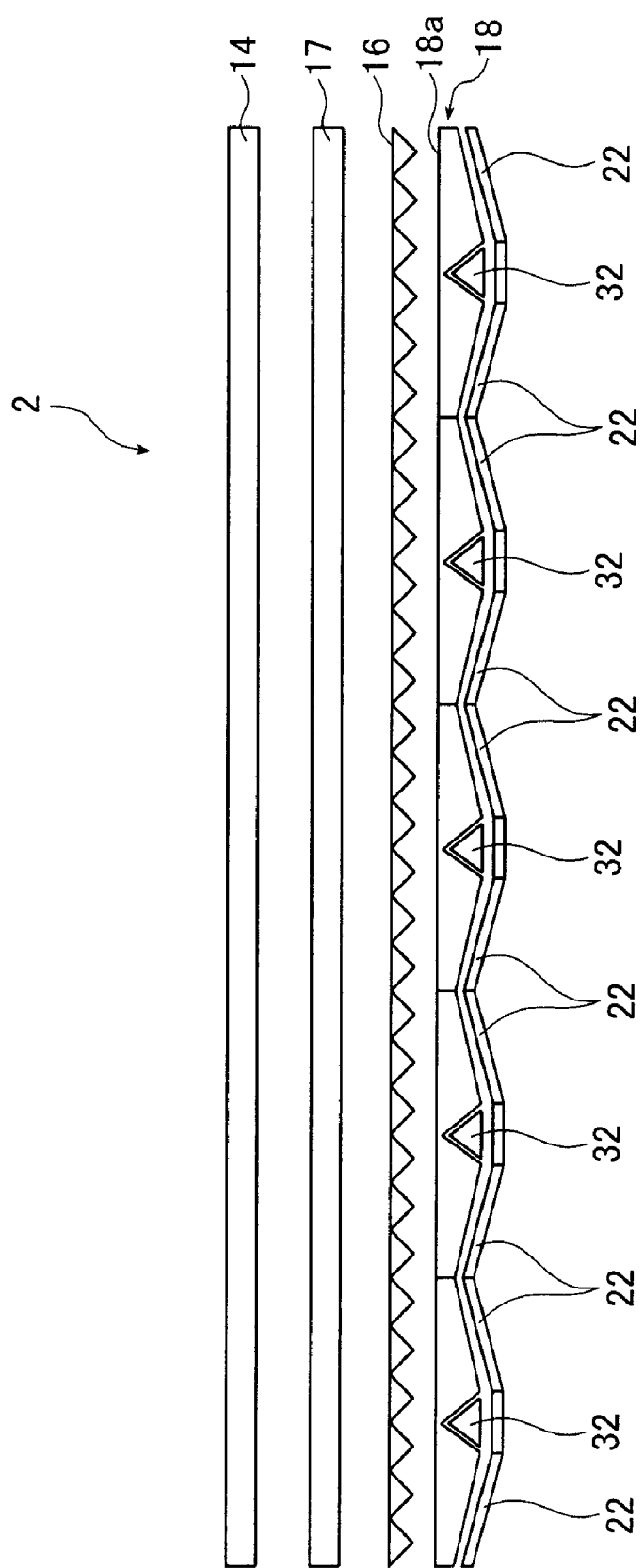
FIG. 22 illustrates an example of a planar lighting device using light guide plates arranged in juxtaposition.
Figure 23:
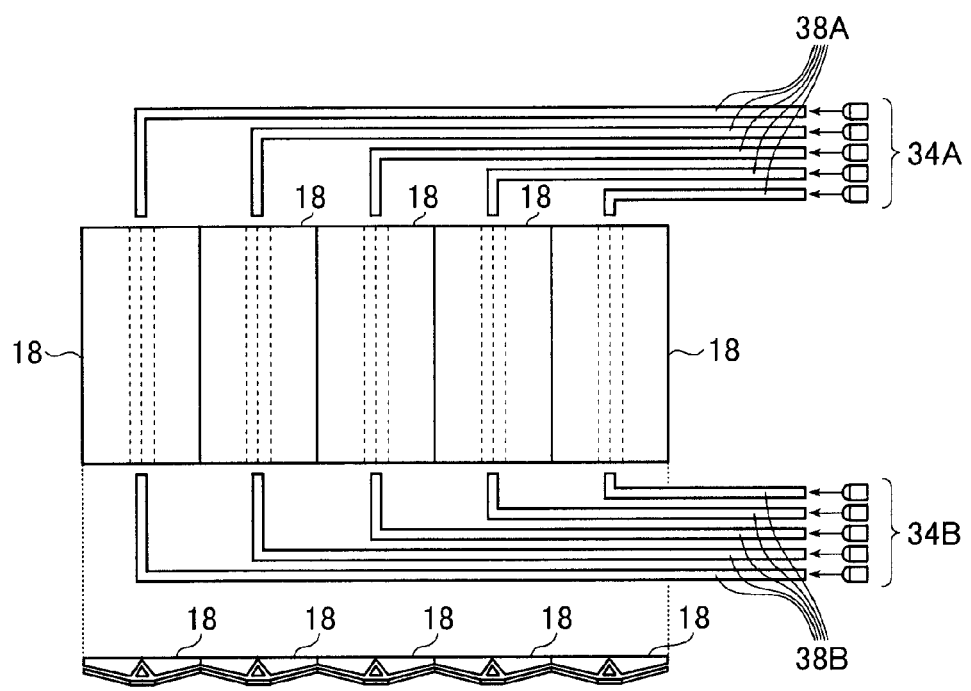
FIG. 23 schematically illustrates how light from LEDs is led through light guides to light guide units.

Referring to FIGS. 22 to 24, examples of the planar lighting device configured by juxtaposing light guide plates 18 will be described. FIG. 22 illustrates an example of planar lighting device using juxtaposed light guide plates; FIG. 23 schematically illustrates how light from LEDs is led through light guides to the light guide units; and FIG. 24 illustrates an example of configuration where reflective plates are disposed on the lateral sides of light guide plates.

In a configuration where light guide plates 18 are juxtaposed such that all their light emitting planes 18a provide a single, identical plane as illustrated in FIG. 22, part of light emitted from the light guide unit 32 provided in the parallel groove of one of the light guide plates 18 is reflected on the inside of the inclined surfaces of that light guide plate 18, then reaches the end surfaces of the same light guide plate 18, and enters the adjacent light guide plates, of which the end surfaces communicate with the end surfaces of that light guide plate, through the end surfaces of the adjacent light guide plates.

Such configuration whereby light guide plates are juxtaposed such that their light emitting planes provide a single, identical plane enables use of light emitted from the light guide units provided in the adjacent light guide plates and therefore enhances light emission efficiency.

When light guide units are connected, moreover, the generation of bright lines at locations in the light emitting plane corresponding to the end surfaces of the connected light guide plates, i.e., joints of adjacent light guide plates, can be further limited by a configuration such that the inclination of the inclined surfaces of the light guide unit with respect to the light emitting plate is zero (0) at the joints of those adjacent light guide plates.

Juxtaposing light guide plates in this manner makes it possible to provide a planar lighting device having a large light irradiating plane whereby the luminous fluxes emitted through the light emitting plane has a uniform light amount distribution and the generation of bright lines are limited.

Such a planar lighting device having a large light irradiating plane can be applied for example to a liquid crystal display device having a large display screen, in particular, a wall-mounted type liquid crystal display device such as a wall-mounted television.

When light guide plates 18 are juxtaposed, apart from a configuration as illustrated in FIG. 1 where the LEDs 34A and 34B are disposed adjacent both end surfaces 33a of the light guide unit 32, the LEDs 34A and 34B may be placed each in one location as illustrated in FIG. 23 such that light emitted from the LEDs 34A and 34B is individually led through light guides 38A and 38B to the end surfaces of the light guide units.

FIG. 23 schematically illustrates how light from the LEDs is led through guide lines to the juxtaposed light guide plates.

When light guide plates are arranged to configure a planar lighting device with an enlarged light emitting plane, light guides 38, additional light guide members, may be disposed between the end portions of the light guide units provided in the parallel grooves of the respective light guide plates and the light emitting portions of the LEDs provided for their respective light guide units such that light from the LEDs is admitted through the light guides to the end portions of the light guide units.

The light guides 38 may be configured by combining optical fibers and rectangular light guide paths.

In a configuration where the LED 34 is disposed near an end surface of the light guide unit 32 as illustrated in FIG. 1, heat generated by the LED 34 may possibly deform or melt the light guide unit 32. Use of the light guides 38 as illustrated in FIG. 23, however, can prevent the heat that might otherwise be generated by the LED 34 from deforming and melting the light guide units.

The rectangular light guide paths, as may the transparent units described above, may be formed using a transparent resin material.

Figure 24A:
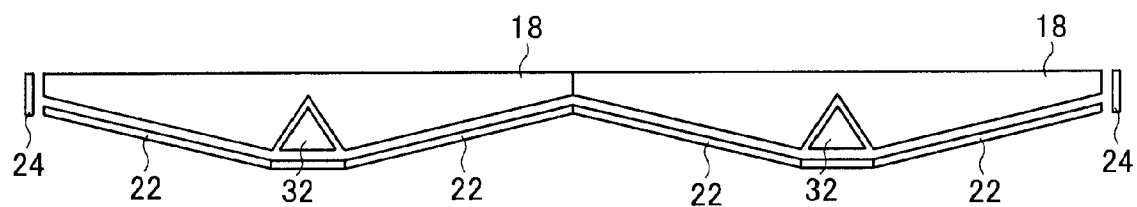
FIG. 24A illustrates an example of configuration provided with reflective plates on lateral sides of light guide plates arranged in juxtaposition.

In a configuration where light guide plates 18 are juxtaposed, the reflective plates 24 may be disposed adjacent the lateral surfaces of the light guide units 18 located on the outermost sides as illustrated in FIG. 24A. The reflective plates thus disposed on the lateral surfaces prevent light from leaking from the lateral surfaces of the light guide plates 24, thereby further enhancing the light use efficiency.

Figure 24B:
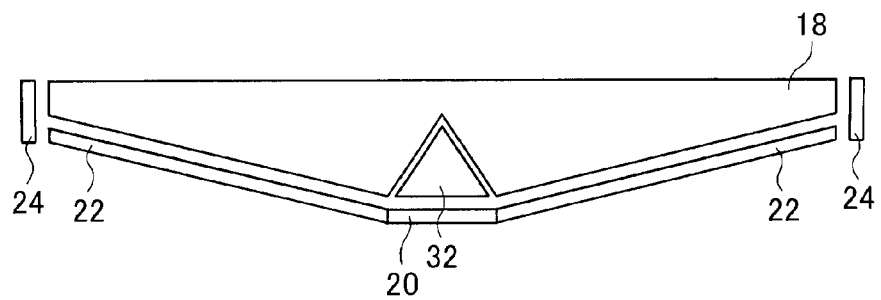
FIG. 24B illustrates an example of configuration provided with reflective plates on lateral sides of one light guide plate.

Also in a configuration where the rod-type lighting device is configured using a single light guide plate 18 as illustrated in FIG. 1, the reflective plates 24 may be disposed adjacent the lateral surfaces of the light guide plate as illustrated in FIG. 24B by taking into consideration the area of the lateral surfaces of the light guide plate, for example.

The reflective plates 24 may be formed using the same material as used for the reflective sheets and the reflector described earlier. While the inventive rod-type lighting device and planar lighting device are used to illuminate a liquid crystal display device in the above embodiment, they may also be used as a lighting device for ceiling illuminations and wall surface illuminations.

Second Embodiment

Figure 25:
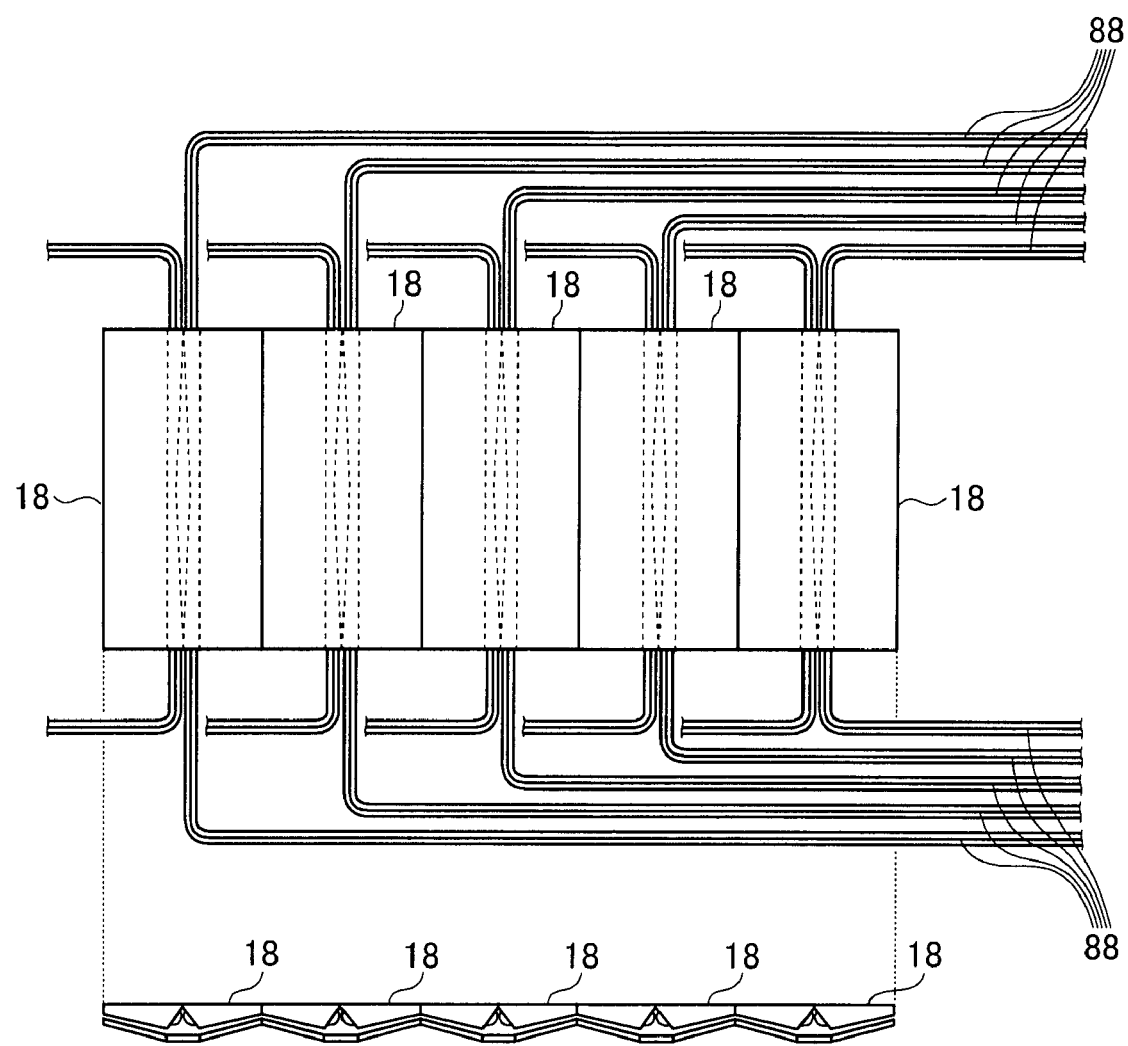
FIG. 25 schematically illustrates how light from LEDs is led through optical fibers to light guide plates arranged in juxtaposition.

In the second embodiment, the LEDs 34A and 34B are placed each in one location (not shown) and light emitted from the LEDs 34A and 34B is led to the end surfaces of the light guide units 32 through optical fibers as illustrated in FIG. 25.

A planar lighting device of a type that admits light via optical fibers and through both end surfaces of the rod-type light guide units will be described referring to FIGS. 25 to 30, whereas a planar lighting device of a type that admits light via optical fibers and through one of the end surfaces of the rod-type light guide units will be described referring to FIGS. 31 to 34.

Figure 26A:
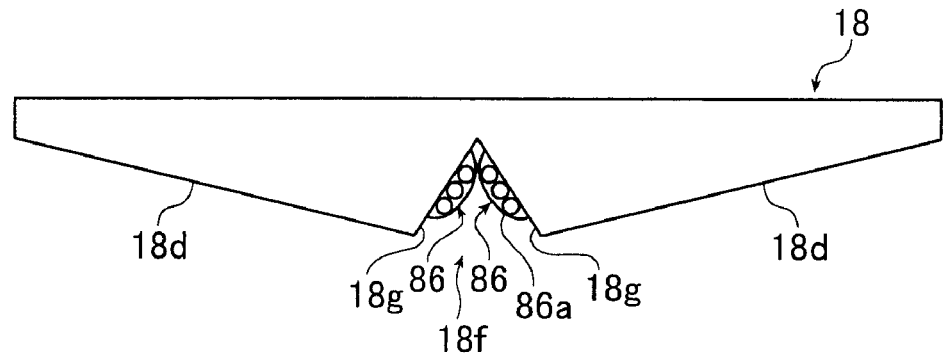
FIG. 26A is a schematic cross-sectional view of a light guide plate of a planar lighting device, wherein light guide units are provided on the wall surfaces defining the parallel groove of the light guide plate.
Figure 26B:
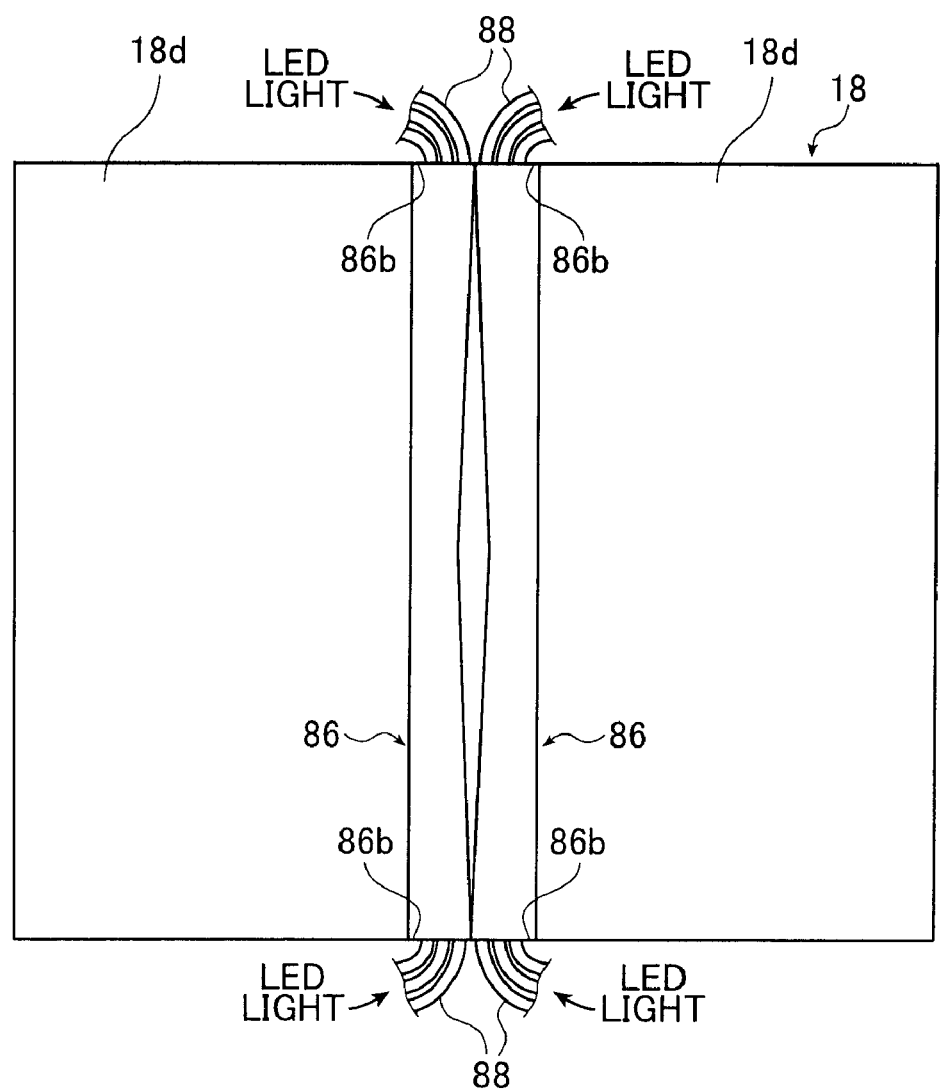
FIG. 26B is a schematic bottom view illustrating the light guide plate as seen from its rear side.

FIG. 25 schematically illustrates how light from the LEDs is led via optical fibers to the juxtaposed light guide plates. FIG. 26A is a schematic cross-sectional view of the light guide plate 18 forming a planar lighting device having light guide units disposed on the wall surfaces defining the parallel groove of the light guide plate; FIG. 26B is a schematic bottom view of that light guide plate 18 as seen from its rear side.

As illustrated in FIG. 26A, light guide units 86 formed of a transparent material are provided in contact with their respective wall surfaces (slanted surfaces) defining the parallel groove 18f of the light guide plate 18. The light guide units 86 are each formed by mixing small, light-scattering particles into a transparent resin material as is the light guide unit 32 illustrated in FIG. 1. Let $\Phi$ be the scattering cross section of the small particles, $L_G$ the length of the light guide unit 32 in the direction in which light propagates, $N_p$ the particle density, and $K_C$ a compensation coefficient, then there is between the light guide unit 32 and the small particles a relation that $\Phi \cdot L_G \cdot N_p \cdot K_C$ is not smaller than 1.1 and not greater than 8.2, and that the compensation coefficient $K_C$ is not smaller than 0.005 and not greater than 0.1.

The light guide units 86 are each formed to have a curved surface 86a. As illustrated in FIG. 26A, each of the light guide units 86 is formed such that only its thickness progressively decreases toward the center while its width remains the same. On the end surfaces 86b of the light guide plate 86 are provided 6 optical fibers 88 as illustrated in FIG. 26B. The optical fibers 88 are connected to LEDs, which are not shown.

Since the light guide units 86 grow progressively thinner in the lengthwise direction, the curved surfaces 86a of the light guide units 86 are inclined with respect to the optical axis of the light admitted through the end surfaces 86b of the light guide units 86.

Thus, the light entering the light guide units 86 in a straight line through the end surface 86b is reflected by the curved surfaces on the inside of the light guide units 86 and travels toward the slanted surfaces 18g of the parallel groove 18f of the light guide plate 18. Then, the light enters the light guide plate 18, is reflected by the inclined rear surfaces 18d, and is emitted through the light emitting plane 18a.

The planar lighting device thus configured is formed of light guide units that serve as linear light sources to upwardly direct admitted light beam sequentially, combined with light guide units that spread light beam emitted from the former light guide units into a plane, whereby the uniformity of emitted light can be further enhanced.

Furthermore, since each light guide unit has small particles satisfying a given relation kneaded or dispersed therein, sufficient light can be emitted through the light emitting plane without depending on a complicated structure, and thus the light emission efficiency can be further enhanced. Accordingly, the rod-type light source can be simplified in structure and, hence, manufactured at low costs.

Now, the inventive planar lighting device in which a light guide unit (second light guide unit) 94 is integrally incorporated in the parallel groove 18f of the light guide plate (first light guide plate) 18 will be described.

Figure 27A:
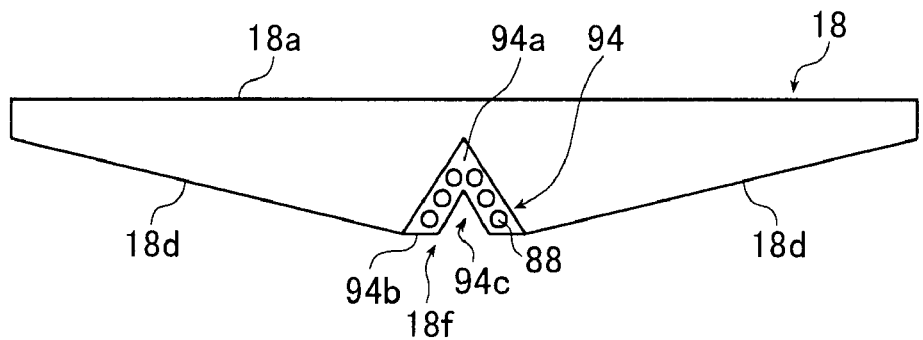
FIG. 27A is a schematic cross-sectional view of a light guide plate of a type of planar lighting device that admits light only through both end surfaces of a rod-type light guide unit.
Figure 27B:
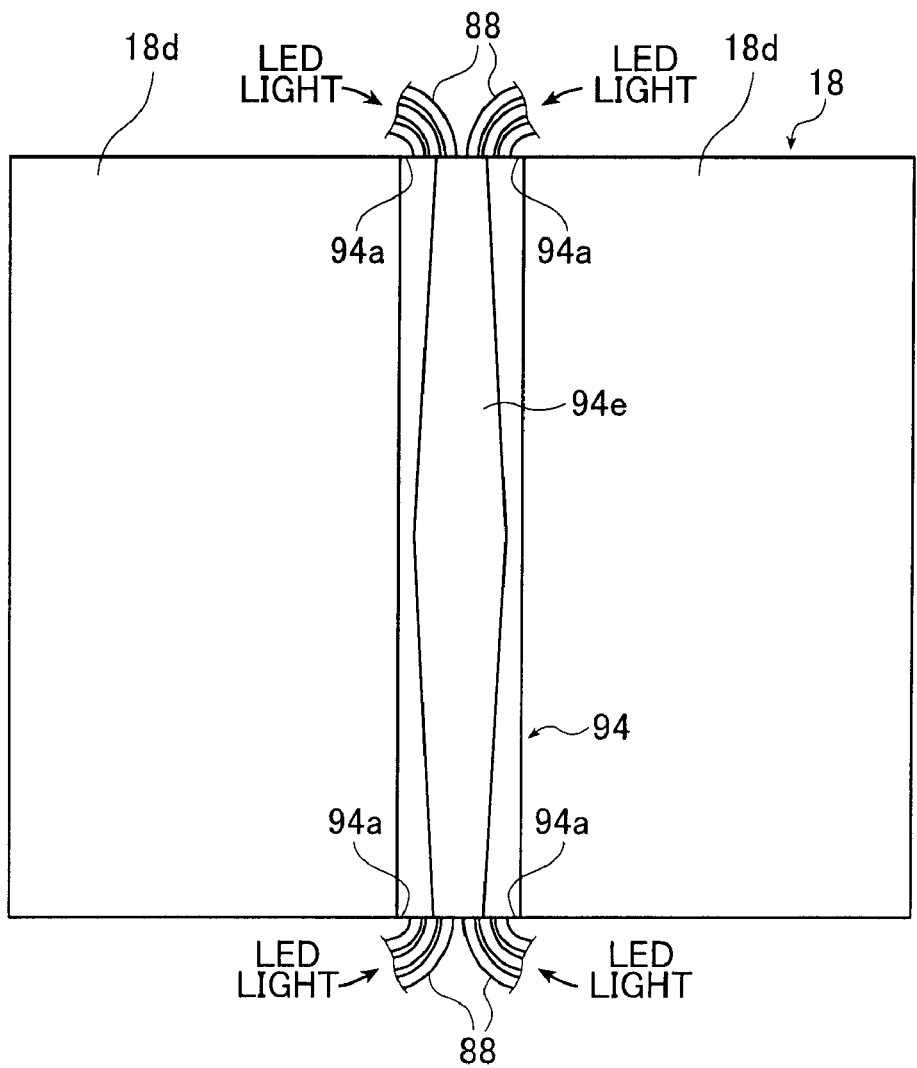
FIG. 27B is a schematic bottom view illustrating the light guide plate as seen from its rear side.
Figure 28:
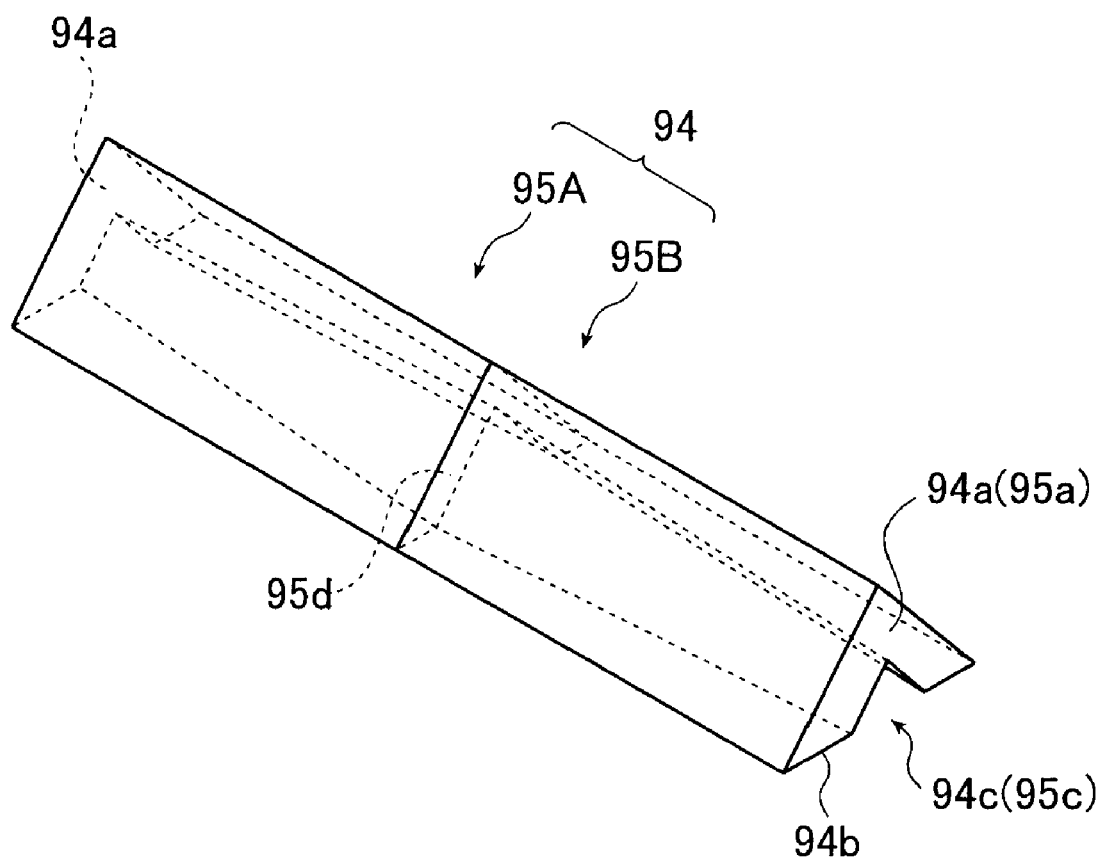
FIG. 28 is a schematic perspective view of the light guide plate illustrated in FIG. 27.

FIG. 27A is a schematic cross-sectional view of a light guide plate in which the light guide unit is accommodated in a parallel groove having a triangular shape in cross section perpendicular to the lengthwise direction; FIG. 27B is a schematic bottom view of that light guide plate 18 as seen from its rear side. FIG. 28 is a schematic perspective view of such light guide unit 94. The planar lighting device illustrated in FIG. 27 admits light transmitted via the optical fibers 88 and through both end surfaces 94a of the light guide unit 94.

As illustrated in FIGS. 27A and 28, the light guide unit 94 has a groove 94c having a V-shape in cross section perpendicular to the lengthwise direction (referred to below as V-shaped groove). The V-shaped groove 94c formed in the underside surface 94b of the light guide unit 94 is so formed that its depth progressively increases toward the center, and its width in a direction perpendicular to the lengthwise direction progressively increases toward the center. Such light guide unit 94 may be formed by connecting two transparent units 95A and 95B, each having a V-shaped groove 95c that grows wider and deeper from one end surface 95a toward the other end surface 95c in a lengthwise direction, such that end surfaces 95d having a wider groove width of the transparent units 95A and 95B are placed in close contact with each other. Further, prisms are formed on wall surfaces 94e defining the V-shaped groove 94c of the light guide unit 94.

As illustrated in FIG. 27B, the light guide unit 94 is provided with 6 optical fibers 88 each on both end surfaces 94a. Optical fibers 88 are each connected to LEDs, which are not shown. The end surfaces 94a can be irradiated by light emitted by the LEDs. Since the wall surfaces defining the V-shaped groove 94c of the light guide unit 94 are inclined with respect to the optical axis of the incident light, the light led via the optical fibers and admitted into the light guide unit 94 through the end surfaces 94a of the light guide unit 94 reaches the wall surfaces of the V-shaped groove 94c of the light guide unit 94 and is reflected by the prisms formed on the wall surfaces. The light reflected by the prisms of the light guide unit 94 enters the light guide unit 18 through its parallel groove 18f, is then reflected by the inclined rear surfaces 18d of the light guide plate 18, and emitted through the light emitting plane 18a of the light guide plate 18.

Now, another example of configuration of the light guide plate used in the inventive planar lighting device will be described.

Figure 29A:
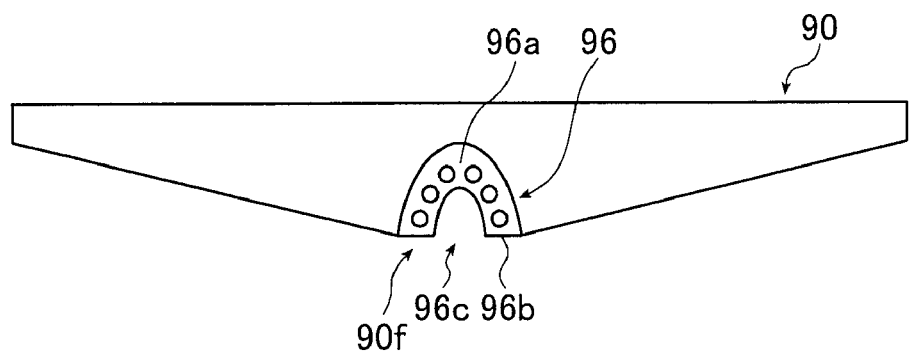
FIG. 29A is a schematic cross-sectional view of a light guide plate of a type of planar lighting device that admits light only through both end surfaces of a rod-type light guide unit.
Figure 29B:
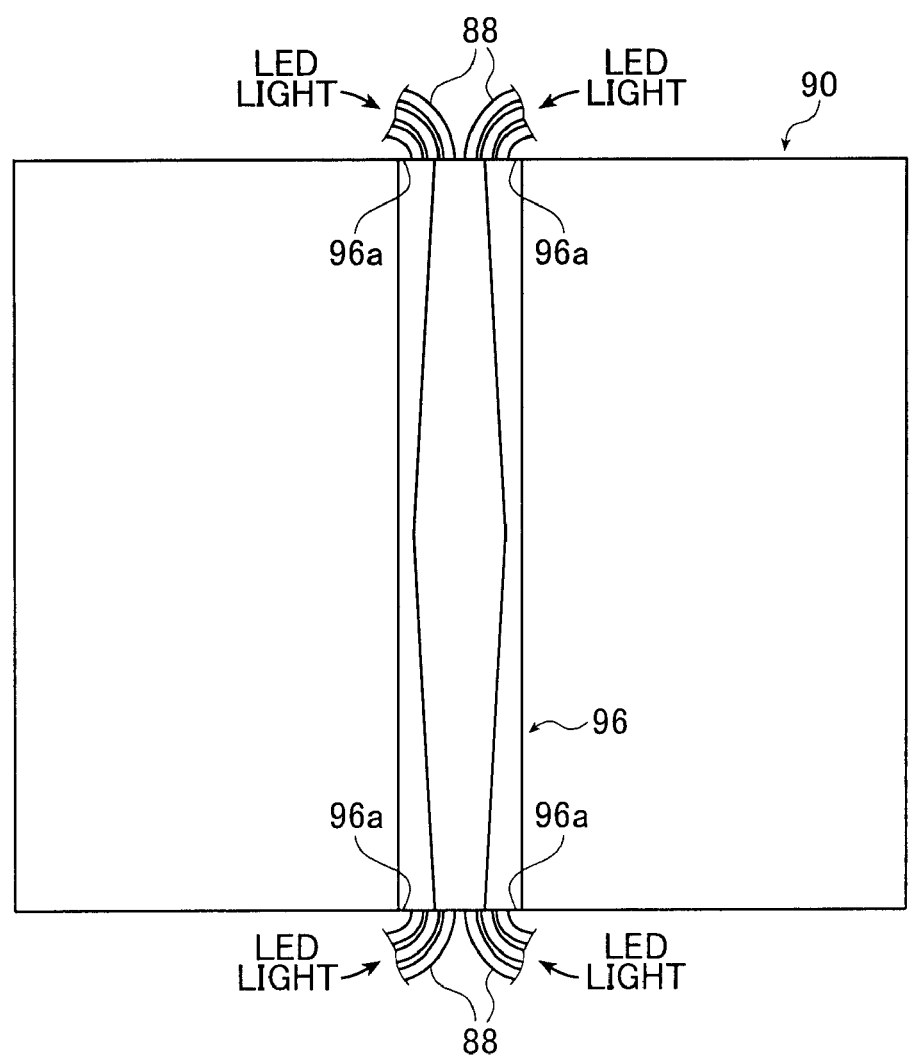
FIG. 29B is a schematic bottom view illustrating the light guide plate as seen from its rear side.
Figure 30:
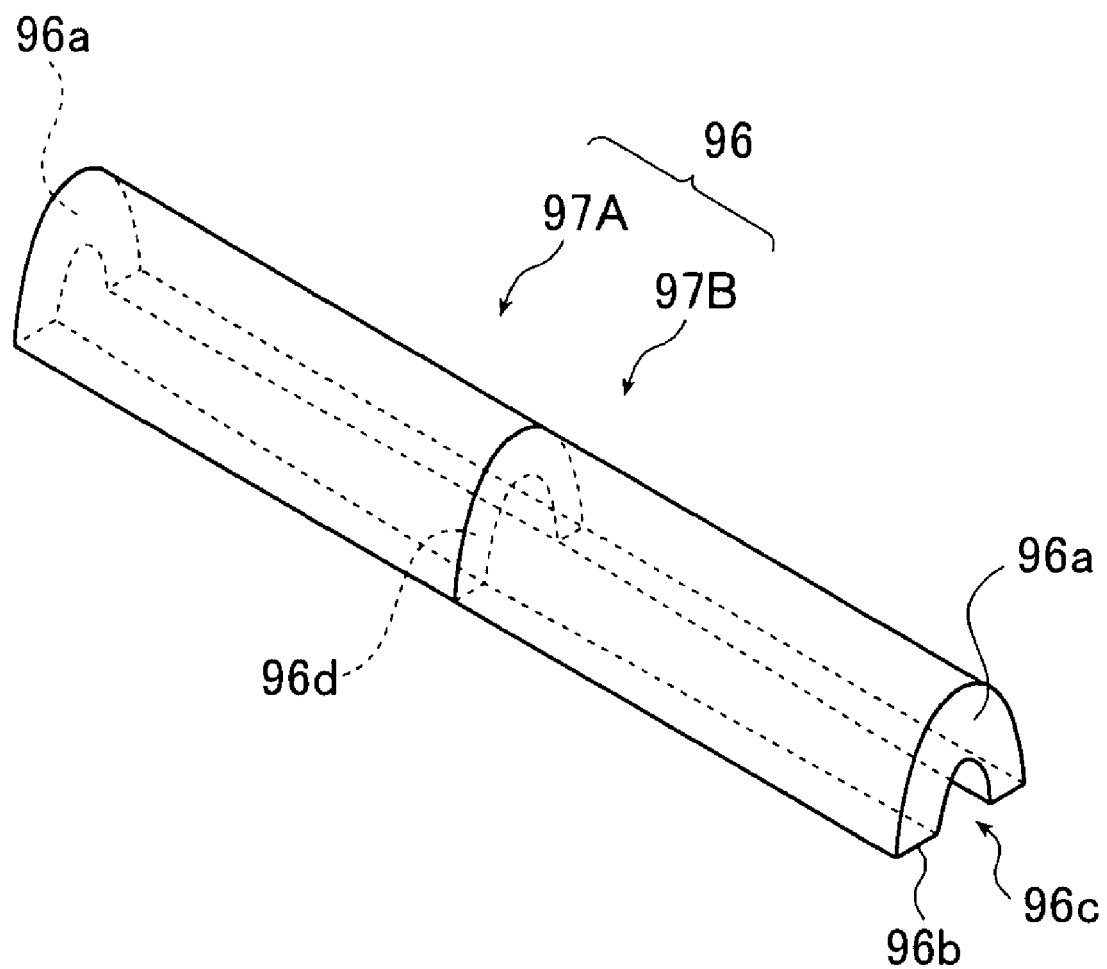
FIG. 30 is a schematic perspective view of the light guide plate illustrated in FIG. 29.

FIGS. 29A and 29B illustrate an example of configuration of such light guide plate. FIG. 29A is a schematic cross-sectional view of a light guide plate in which the light guide unit is accommodated in a parallel groove 90f having a shape in cross section perpendicular to the lengthwise direction comparable to a partially cut-off ellipse; FIG. 29B is a schematic bottom view of that light guide plate as seen from its rear side. FIG. 30 is a schematic perspective view of a light guide unit 96 accommodated in such light guide plate 90.

As illustrated in FIG. 29A, the light guide plate 90 used for a planar lighting device has the parallel groove 90f having a shape in cross section perpendicular to the lengthwise direction comparable to a partially cut-off ellipse. The light guide 96 has substantially the same external shape as the parallel groove 90f such that the light guide unit 96 may be accommodated integrally in the parallel groove 90f of the light guide plate 90.

In the underside surface 96b of the light guide unit 96 is formed a U-shaped groove 96c having a shape in cross section perpendicular to the lengthwise direction comparable to a partially cut-off ellipse. The U-shaped groove 96c grows progressively deeper in the lengthwise direction and wider; two transparent units 97A and 97B having the groove thus shaped are connected such that the end surfaces having a wider groove width are placed in close contact with each other. The light guide unit 96 is disposed inside the parallel groove 90f of the light guide plate 90 such that its curved surface is in close contact with the wall surfaces of the parallel groove 90f of the light guide plate 90.

The light guide unit 96 is provided with 6 optical fibers 88 each on both end surfaces 96a. The optical fibers 88 are capable of introducing light emitted from LEDs, not shown, into the light guide unit 96 through the end surfaces 96a of the light guide unit 96.

Since the wall surfaces defining the U-shaped groove 96c of the light guide unit 96 thus configured are inclined with respect to the optical axis of the incident light, the admitted light is reflected by the wall surfaces of the U-shaped groove 96c and enters the light guide plate 90 through the parallel groove 90f of the light guide plate 90. The light is then reflected by the inclined rear surfaces of the light guide plate 90 and emitted through the light emitting plane.

Now, a planar lighting device of a type that admits light only through one of the end surfaces of the rod-type light guide unit will be described.

Figure 31A:
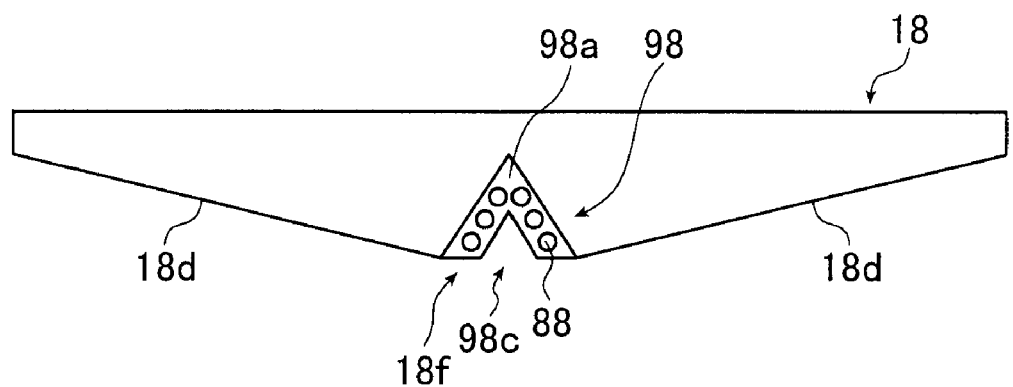
FIG. 31A is a schematic cross-sectional view of a light guide plate of a type of planar lighting device that admits light only through one end surface of a rod-type light guide unit.
Figure 31B:
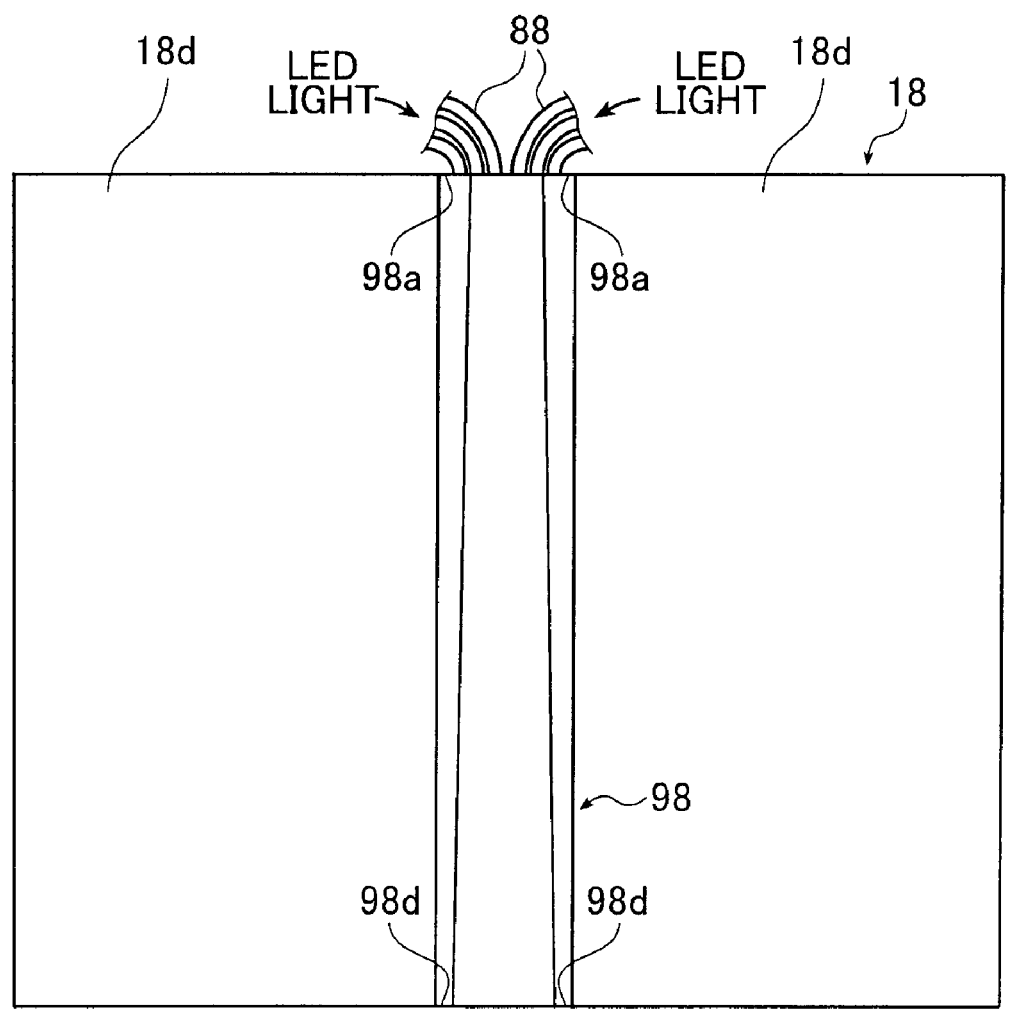
FIG. 31B is a schematic bottom view illustrating the light guide plate as seen from its rear side.
Figure 32:
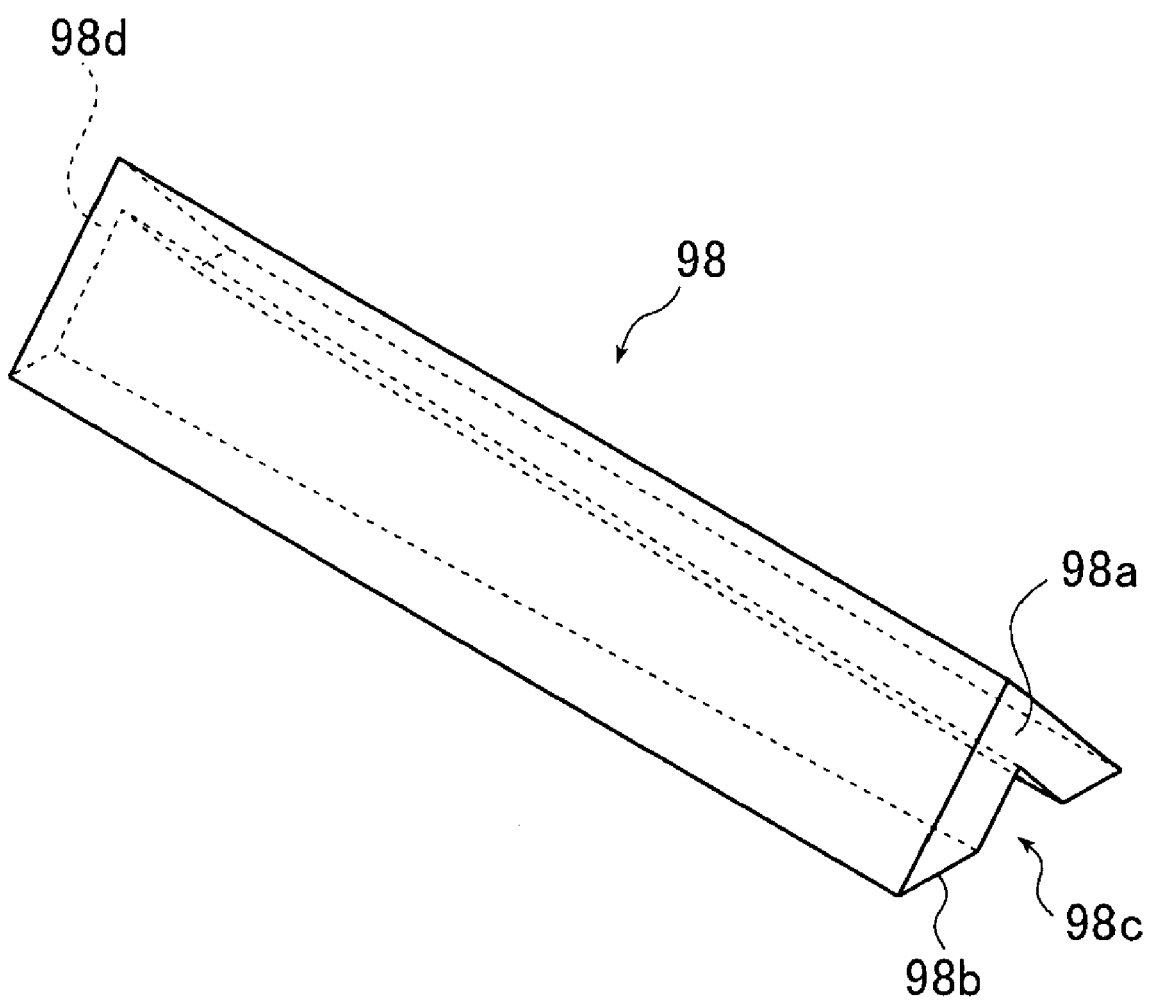
FIG. 32 is a schematic perspective view of the light guide plate illustrated in FIG. 31.

FIGS. 31A and 31B are each a schematic cross-sectional view of a light guide plate accommodating a light guide unit in its parallel groove having a triangular shape in cross section perpendicular to the lengthwise direction and a schematic bottom view of that light guide plate as seen from its rear side. FIG. 32 is a schematic perspective view of a light guide unit 98 accommodated in such parallel groove of the light guide plate 18 and admitting light through only one of the end surfaces 98a.

As illustrated in FIG. 31B, the light guide unit 98 that admits light through only one of the end surfaces 98a has in its underside surface 98b a V-shaped groove 98c that grows progressively wider and deeper from the end surface 98a through which light is admitted toward the other end surface 98d.

As with the light guide units described earlier, a prism array may be formed on the wall surfaces defining the V-shaped groove of the light guide unit 98. The optical fibers 88 are provided on the side of the light guide unit 98 closer to the end surface 98a having a smaller sectional area of the V-shaped groove of the light guide unit 98.

With the light guide unit 98 thus configured, light transmitted via the optical fibers provided adjacent the end surface 98a of the light guide unit 98 is reflected by the prism array on the wall surfaces of the V-shaped groove 98c of the light guide unit 98, admitted into the light guide plate 18 through its parallel groove 18f, reflected by the inclined rear surfaces 18d of the light guide unit 18, and emitted through the light emitting plane 18a.

Now, another example of configuration of the light guide plate used in the inventive planar lighting device will be described.

Figure 33A:
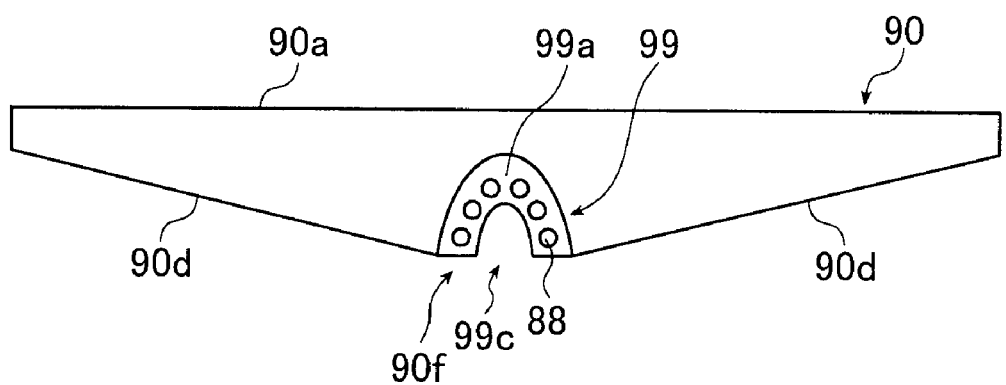
FIG. 33A is a schematic cross-sectional view of a light guide plate of a type of planar lighting device that admits light only through one end surface of a rod-type light guide unit.
Figure 33B:
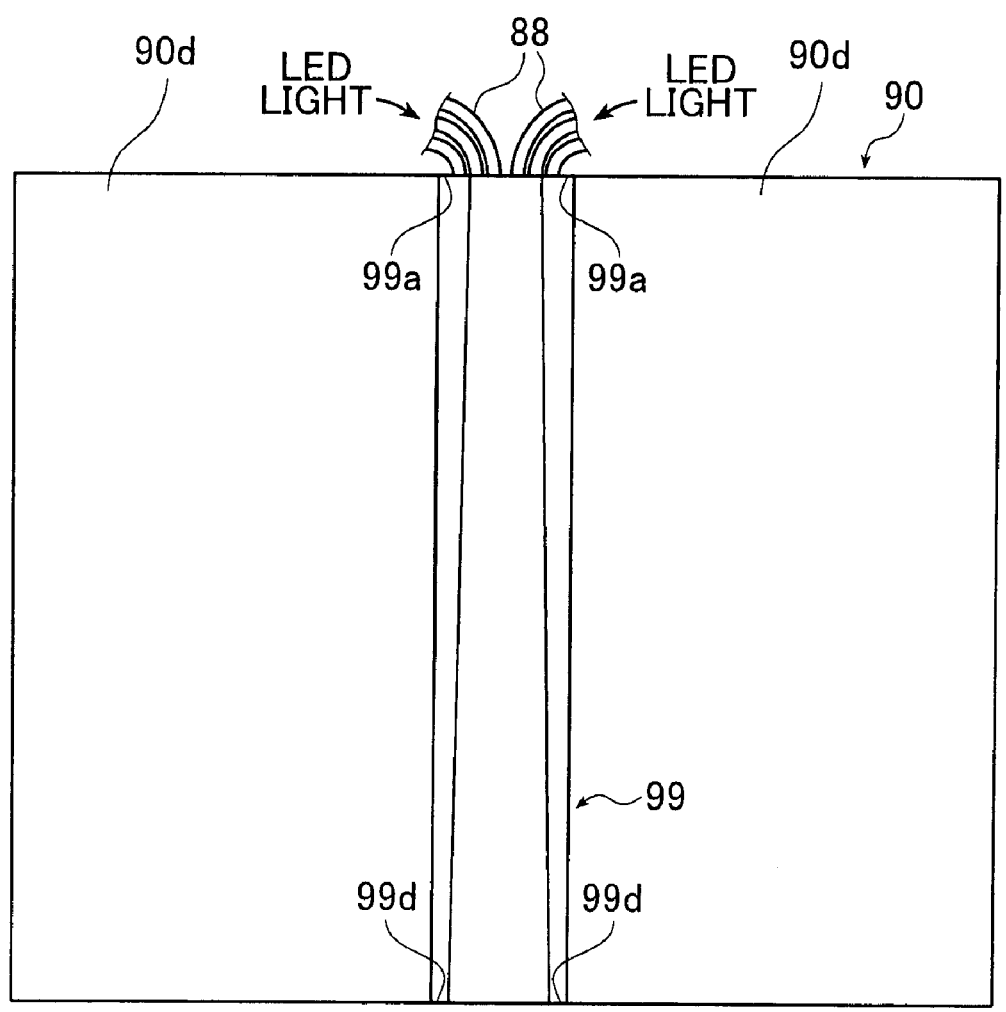
FIG. 33B is schematic a bottom view illustrating the light guide plate as seen from its rear side.
Figure 34:
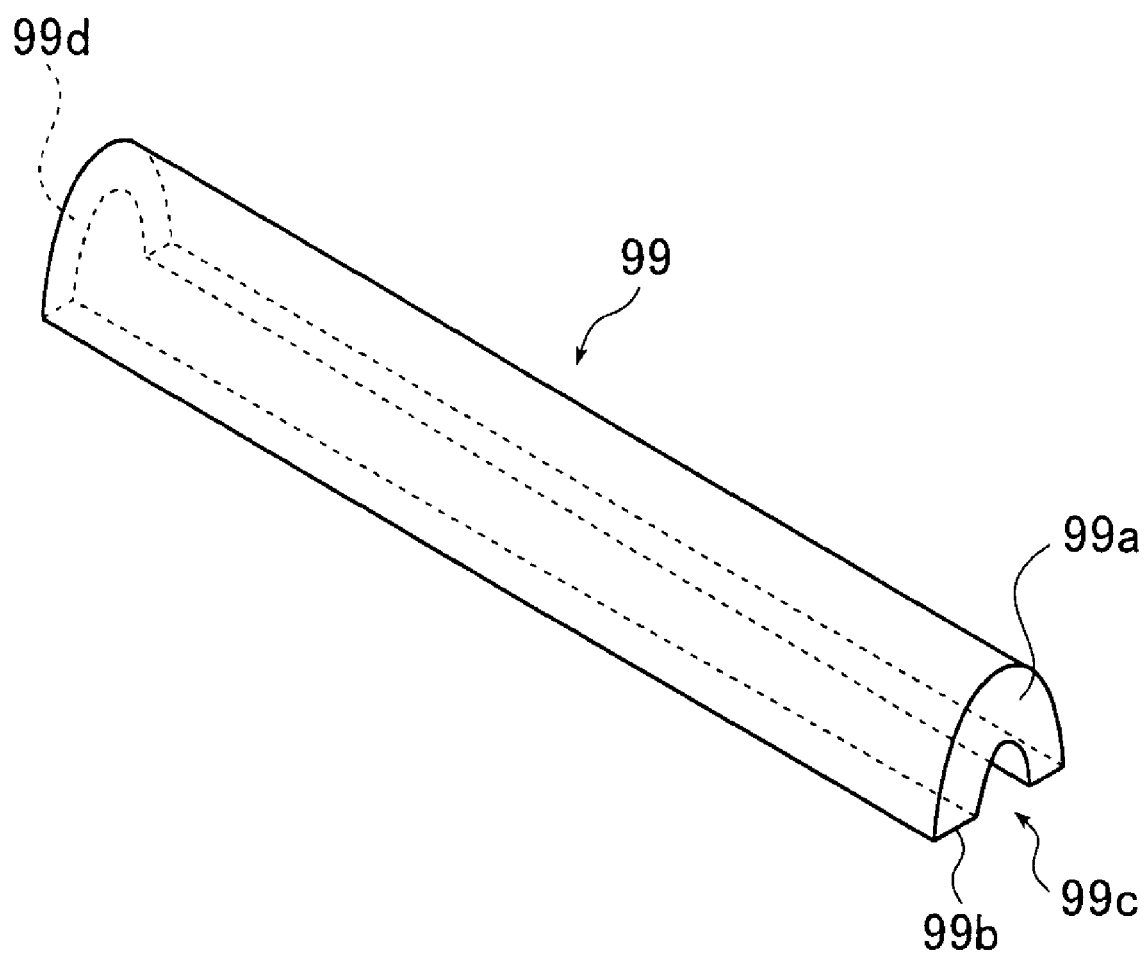
FIG. 34 is a schematic perspective view of the light guide plate illustrated in FIG. 33.

FIGS. 33A and 33B are each a schematic cross-sectional view of a light guide plate 90 in which the light guide unit is accommodated in a parallel groove 90f having a shape in cross section perpendicular to the lengthwise direction comparable to a partially cut-off ellipse and a schematic bottom view of that light guide plate 90 as seen from its rear side. FIG. 34 is a schematic perspective view of a light guide unit 99 accommodated in such parallel groove 90f of the light guide plate 90 and admitting light through only one of its end surfaces.

As illustrated in FIG. 33B, the light guide unit 90 that admits light through only one of the end surfaces 99a has in its underside surface 99b a U-shaped groove 99c that grows progressively wider and deeper from the end surface 99a through which light is admitted toward the other end surface 99d. In the illustrated example, the U-shaped groove 99c of the light guide plate 90 has a shape in cross section perpendicular to the lengthwise direction comparable to a partially cut-off ellipse.

The light guide unit 99 may be provided with a prism array formed on the wall surfaces defining the U-shaped groove 99c of the light guide unit 99. With the light guide unit 99 thus configured, light transmitted via the optical fibers provided adjacent the end surface 99a of the light guide unit 99 is reflected by the prism array on the wall surfaces of the V-shaped groove 99c of the light guide unit 99, admitted into the light guide plate 90, reflected by inclined rear surfaces 90d of the light guide unit 90, and emitted through a light emitting plane 90a.

Third Embodiment

Now, a third embodiment of the present invention will be described referring to FIGS. 35 to 39. The third embodiment of the planar lighting device is configured by connecting light guide plates each having a wedge-like sectional shape such that end surfaces of the light guide plates are in close contact with each other. The planar lighting device having such a configuration will be referred to as a tandem-type planar lighting device below.

Figure 35:
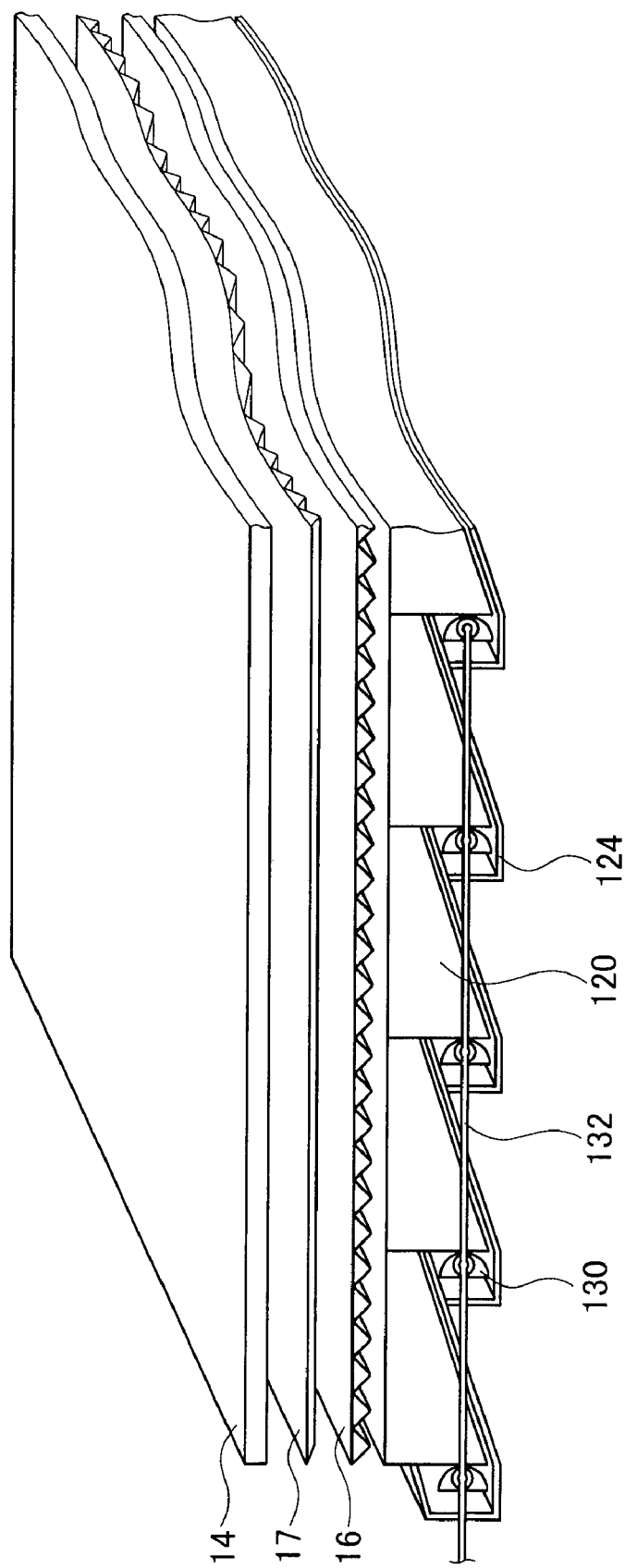
FIG. 35 is a schematic perspective view of a liquid crystal display device using light guide plates arranged in juxtaposition in a tandem-type planar lighting device.

FIG. 35 is a schematic perspective view of a liquid crystal display device in which juxtaposed light guide plates are used in a tandem-type planar lighting device.

Figure 36A:
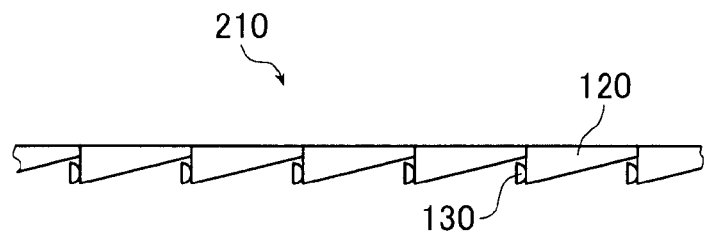
FIG. 36A is a schematic cross-sectional view of light guide plates of a tandem-type planar lighting device, wherein light is admitted from both ends of light guide units.
Figure 36B:
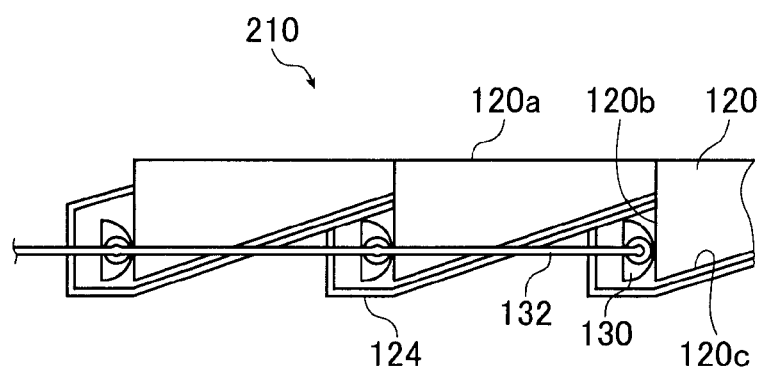
FIG. 36B is a partial, enlarged cross-sectional view thereof.
Figure 36C:
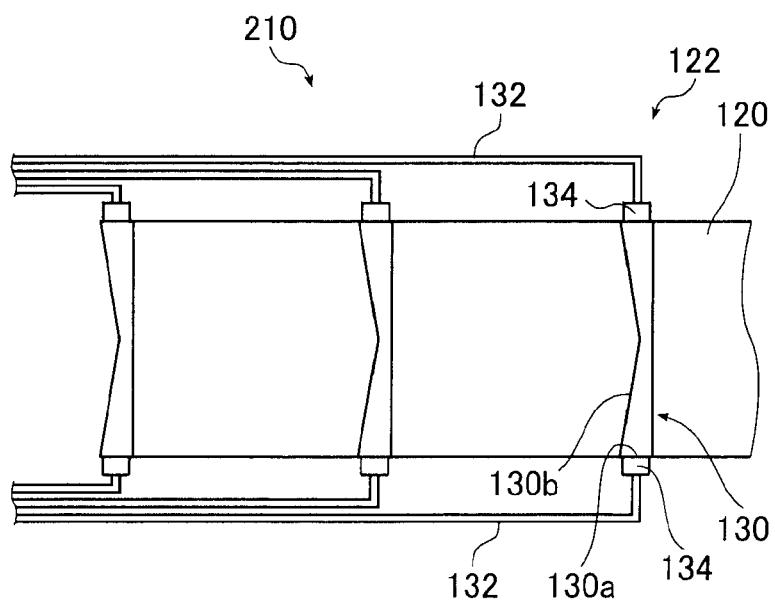
FIG. 36C is a schematic bottom view of the light guide plates as seen from its rear side with the reflective films removed.

FIG. 36 illustrates an example of a tandem-type planar lighting device that admits light through both end surfaces of light guide units. FIGS. 36A, 36B and 36C are, respectively, a schematic cross-sectional view of light guide plates of a tandem-type planar lighting device comprising the inventive rod-type lighting devices, a partial, enlarged cross-sectional view thereof, and a schematic bottom view of the light guide plates as seen from its rear side with the reflective films removed.

A tandem-type planar lighting device 210 comprises light guide plates 120 each having a wedge-shaped cross section, rod-type lighting devices 122, and reflective films 124, as illustrated in FIG. 36B. Each rod-type lighting device 122 comprises a rod-type light guide unit 130, optical fibers 132, and collimators 134 as illustrated in FIGS. 36B and 36C.

The light guide unit 130 of the rod-type lighting device 122 is formed by mixing small, light-scattering particles into a transparent resin material. Let $\Phi$ be the scattering cross section of the small particles, $L_G$ the length of the light guide unit 32 in the direction in which light propagates, $N_p$ the particle density, and $K_C$ a compensation coefficient, then there is between the light guide unit 32 and the small particles a relation that $\Phi \cdot L_G \cdot N_p \cdot K_C$ is not smaller than 1.1 and not greater than 8.2, and that the compensation coefficient $K_C$ is not smaller than 0.005 and not greater than 0.1.

The light guide unit 130 of the rod type lighting device 122 is so disposed as to oppose a side wall surface 120b on the thicker side of the light guide plate 120. As illustrated in FIG. 36B, the light guide unit 130 has a curved surface on the side facing the side wall surface 120b on the thicker side of the light guide plate 120, and light can be emitted from the curved surface side.

As illustrated in FIG. 36C, a side 130b of the light guide unit 130 opposite from the curved surface side is inclined from the end surfaces toward the center in the direction toward the curved surface side. The reflective film 124 is provided to cover an inclined rear surface 120c of the light guide plate 120 and the light guide unit 130 of the rod-type lighting device 122.

One end of each optical fiber 132 is connected to a light source, not shown; the other end is disposed adjacent an end surface 130a of the light guide unit 130 forming part of the rod-type lighting device 122. The collimator 134 is provided between the end surface 130a of the light guide unit 130 and the optical fiber 132.

In the tandem-type planar lighting device illustrated in FIGS. 36A, 36B, and 36C, most of the light transmitted via the optical fiber 132 and admitted through both end surfaces 130a of the light guide unit 130 travels in a straight line and reaches the inclined surface 130b of the light guide unit 130. The light is then reflected by the inclined surface 130b and directed toward the curved surface. Then, leaving the curved surface, the light strikes the side wall surface 120b on the thicker side of the light guide plate 120. The light admitted through the side wall surface 120b of the light guide plate 120 is reflected by the inclined rear surface 120c and emitted through the light emitting plane 120a.

Since the small particles satisfying a given relation are kneaded or dispersed in the light guide plate 130 of the rod-type lighting device 122, sufficient light can be emitted from the light emitting plane and thus the light emission efficiency can be further enhanced.

It is preferable that in the light guide unit 130, as with the light guide unit 18 described earlier, the side wall surface 120b through which light is admitted, the light emitting plane 120a, and/or the inclined surfaces 120b that reflect light all have a surface roughness Ra of smaller than 380 nm, thus, Ra<380 nm.

While, in the above description, the rod-type lighting device used in the planar lighting device has a light guide plate where the side facing the side wall surface 120b on the thicker side as illustrated in FIG. 36 is formed into a curved surface, light guide plates having other configurations may be used according to the present invention.

Figure 37A:
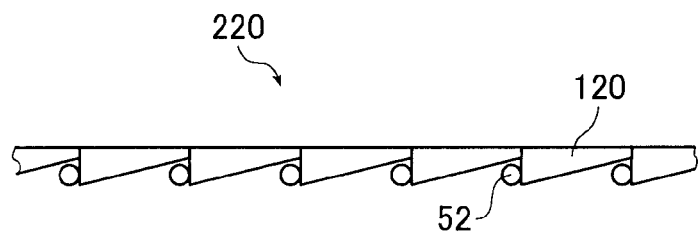
FIG. 37A is a schematic cross-sectional view of light guide plates of a tandem-type planar lighting device, wherein light is admitted from both ends of light guide units.
Figure 37B:
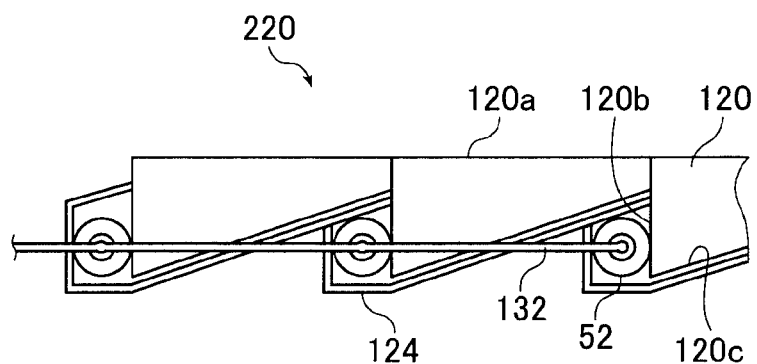
FIG. 37B is a partial, enlarged cross-sectional view thereof.
Figure 37C:
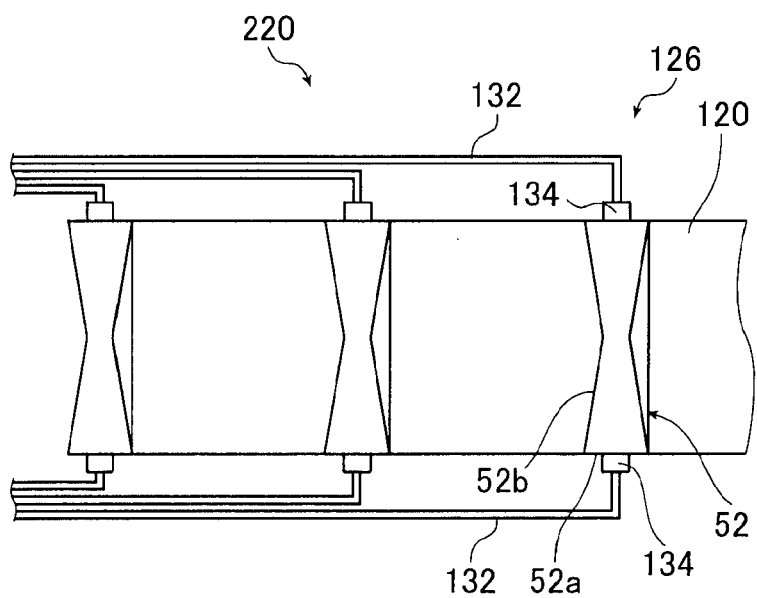
FIG. 37C is a schematic bottom view of the light guide plates as seen from its rear side with the reflective films removed.

FIG. 37 illustrates an example of a tandem-type planar lighting device that admits light through both end surfaces of the light guide units. FIG. 37A is a schematic perspective view of light guide plates of a tandem-type planar lighting device comprising light guide units (second light guide units) 52 having a shape illustrated in FIG. 10; FIG. 37B is a partial, enlarged view thereof; and FIG. 37C is a schematic bottom view of the light guide plates illustrated in FIG. 37B as seen from its rear side with the reflective films removed.

In the illustrated example, each rod-type lighting device 126 uses a light guide unit 52 illustrated in FIG. 10, which has a circular shape in cross section perpendicular to the lengthwise direction and grows progressively thinner from the end surfaces toward the center. Light admitted through the end surfaces 52a and emitted through a lateral surface 5b enters the light guide plate 120 through the side wall surface 120b on the thicker side thereof, is reflected by the inclined rear surface 120c, and emitted through the light emitting plane 120a. Thus, the planar lighting device 220 may also be configured using the rod-type lighting devices 126 having such light guide unit 52.

Thus configured is the planar lighting device using the rod-type lighting devices of a type that admits light through both end surfaces of each light guide unit. Now, an example of configuration of a tandem-type planar lighting device using rod-type lighting devices of a type that admits light through one of the ends of each light guide unit will be described.

Figure 38A:
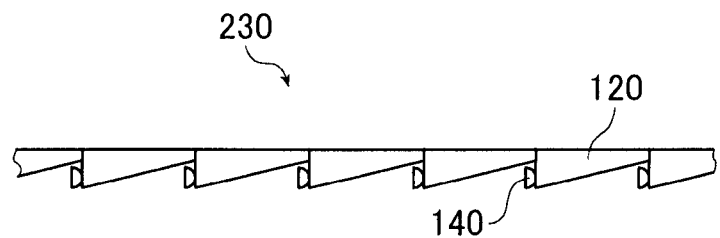
FIG. 38A is a schematic cross-sectional view of light guide plates of a tandem-type planar lighting device, wherein light is admitted from one end of light guide units.
Figure 38B:
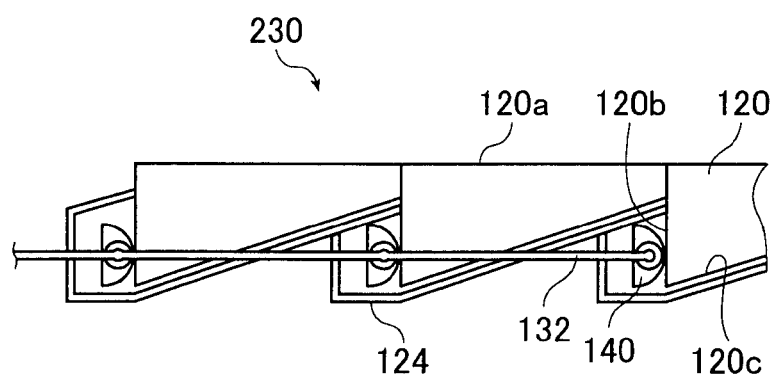
FIG. 38B is a partial, enlarged cross-sectional view thereof.
Figure 38C:
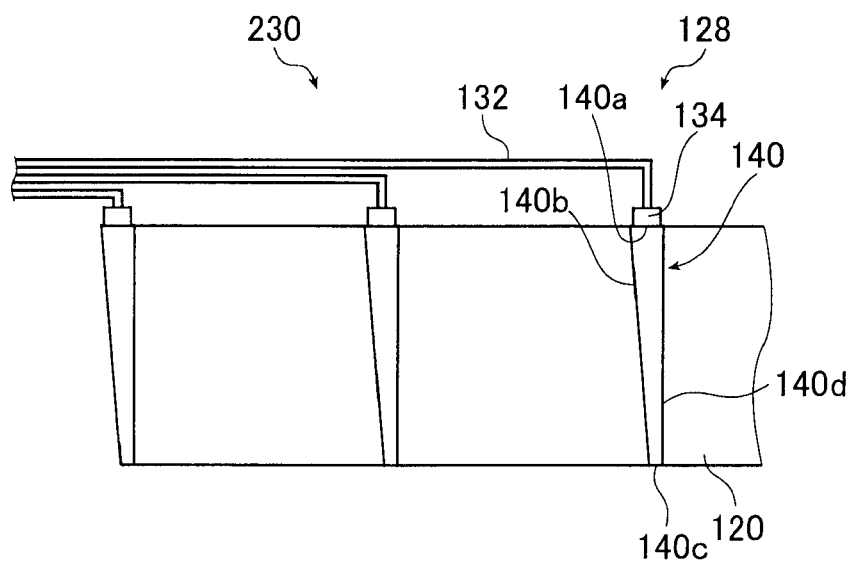
FIG. 38C is a schematic bottom view of the light guide plates as seen from its rear side with the reflective films removed.

FIG. 38 illustrates an example of a tandem-type planar lighting device of a type that admits light through one of the ends of each light guide unit. FIG. 38A is a schematic cross-sectional view of the light guide plates 120 arranged in tandem to form a planar lighting device 230; FIG. 38B is a partial, enlarged view thereof; and FIG. 38C is a schematic bottom view of the light guide plates illustrated in FIG. 38B as seen from its rear side.

As illustrated in FIG. 38C, the rod-type lighting device 128 of a type admitting light through one of the end surfaces comprises a light guide unit 140, an optical fiber 132, and a collimator 134. The light guide unit 140 forming part of the rod-type lighting device 128 and admitting light through one of the end surfaces 140a has a shape tapering from the end surface 140a through which light is admitted toward the other end surface 140c.

In the illustrated example, the light guide unit 140 has a substantially semicircular shape in cross section perpendicular to the lengthwise direction and the side facing the side wall surface on the thicker side of the light guide plate is formed into a curved surface, whereas the opposite side is formed into a flat surface 140b. The flat surface 140b of the light guide unit 140 is inclined with respect to the side wall surface on the thicker side of the light guide plate. The reflective film 124 is provided to cover the inclined rear surface 120c of the light guide plate 120 and the light guide unit 140 of the rod-type lighting device 128.

Light transmitted via the optical fiber 132 and the collimator 134 strikes the flat surface 140a of the light guide unit 140, is then reflected by the flat surface 140b of the light guide unit 140, and emitted through lateral surface 140d. The light emitted through the lateral surface 140d of the light guide units 140 enters the light guide plate 120 through the side wall surface 120b on the thicker side of the light guide plate 120, is reflected by the inclined rear surface 120c, and emitted through the light emitting plane 120a.

With the planar lighting device 230 thus configured, since light is admitted through only one of the ends of each light guide unit of the planar lighting device, the planar lighting device can be simplified in structure, making it possible to achieve reduction in size and manufacturing costs.

Figure 39A:
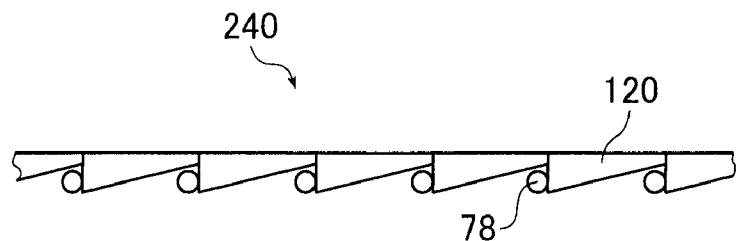
FIG. 39A is a schematic cross-sectional view of light guide plates of a tandem-type planar lighting device, wherein light is admitted from one end of light guide units.
Figure 39B:
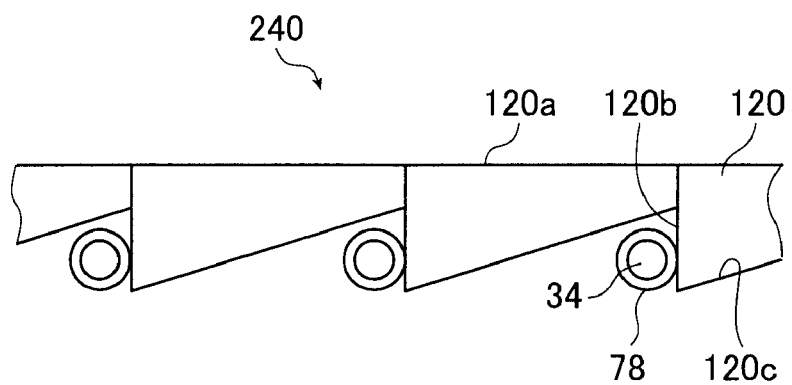
FIG. 39B is a partial, enlarged cross-sectional view thereof.
Figure 39C:
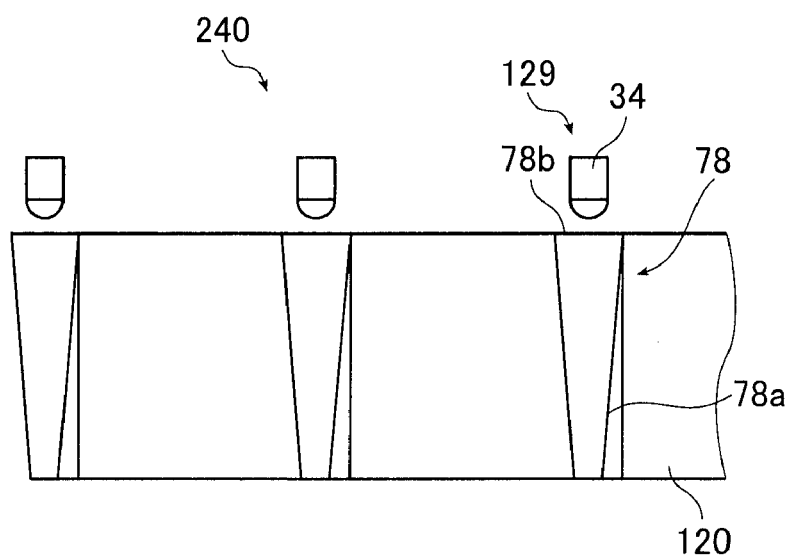
FIG. 39C is a schematic bottom view of the light guide plates as seen from its rear side with the reflective films removed.

FIG. 39 illustrates an example of a tandem-type planar lighting device of a type that admits light through one of the ends of each light guide unit. FIG. 39A is a schematic cross-sectional view of light guide plates arranged in tandem to form a planar lighting device 240; FIG. 39B is a partial, enlarged view thereof; and FIG. 39C is a schematic bottom view of the light guide plates illustrated in FIG. 39B as seen from its rear side.

The illustrated example comprises the conical light guide units 78 as illustrated in FIG. 12C and the LED 34 provided adjacent an end surface 78b of each light guide unit 78 having a larger diameter (referred to as large-diameter end surface). A rod-type lighting device 129 using such conical light guide unit 78 is capable of emitting light through a lateral surface 78a of the light guide unit 78, as described earlier.

Light from the light source 34 strikes the large-diameter end surface 78b of the light guide unit 78, is emitted through the lateral surface 78a of the light guide unit 78, enters the light guide plate 120 through the side wall surface 120b on the thicker side of the light guide plate 120, is then reflected by the inclined rear surface 120c, and emitted through the light emitting plane 120a.

With the planar lighting device 240 thus configured, since light is admitted through only one of the ends of each light guide unit of the planar lighting device, the planar lighting device can be simplified in structure, making it possible to achieve reduction in size and manufacturing costs.

While the light guide member and the planar lighting device using the same, and the rod-type lighting device according to the invention are described in detail above, the present invention is not limited to the embodiments given in the above description, and various improvements and modifications may be made without departing from the spirit of the present invention.

The light guide member and the planar lighting device using the same, and the rod-type lighting device according to the present invention may be used as a light guide member, a planar lighting device, and a light source (rod-type lighting device) for various lighting devices including planar lighting devices for indoor and outdoor illuminations or planar lighting devices used as backlights for, for example, liquid crystal display panels, advertising boards, advertising towers, and sign boards.

INDUSTRIAL APPLICABILITY

The inventive light guide member can be provided in thin designs and enables a simplified configuration of the rod-type light source. Accordingly, it may be used as a light guide member used in planar lighting devices (backlight units) that are used in, for example, liquid crystal displays, over-head projectors, and illuminated advertising sign boards.

The inventive planar lighting device may be used as a planar lighting device (backlight unit) used in, for example, liquid crystal displays, over-head projectors, and illuminated advertising sign boards.

The inventive rod-type lighting device may be used as a rod-type light source used in, for example, planar lighting devices (backlight units) that are used in turn in liquid crystal displays, over-head projectors, and illuminated advertising sign boards, for example, and as a light source device in place of linear light sources such as fluorescent lamps.

The invention claimed is:

1. A transparent light guide member comprising:
   a first light guide unit in a form of a transparent plate having a rectangular light emitting plane and a parallel groove formed on a rear surface located opposite from the rectangular light emitting plane and parallel to one side of the rectangular light emitting plane; and
   a second light guide unit, which is transparent, having a columnar external shape to be accommodated in the parallel groove and containing light-scattering particles;
   wherein $\Phi \cdot L_G \cdot N_p \cdot K_C$ is not smaller than 1.1 and not greater than 8.2, and $K_C$, a compensation coefficient, is not smaller than 0.005 and not greater than 0.1, where $\Phi$ is a scattering cross section of the particles, $L_G$ a length of the second light guide unit in a direction in which light propagates, $N_p$ a particle density, and $K_C$ the compensation coefficient.

2. A light guide member of claim 1, wherein the second light guide unit has substantially a same sectional shape as the parallel groove.

3. A light guide member of claim 1, wherein the second light guide unit is configured by placing a pair of light guide units each having a shape with a diameter that decreases from one end surface toward an opposite end surface such that end surfaces of the light guide units having a smaller diameter are in close contact with each other.

4. A light guide member of claim 1, wherein the rear surface of the first light guide unit is formed either by a single structure comprising a pair of inclined rear surfaces that are symmetrical with respect to a plane containing a central axis of the parallel groove and perpendicular to the rectangular light emitting plane and which are inclined with respect to the rectangular light emitting plane such that a thickness decreases from a portion near the central axis in a direction perpendicular to the one side toward end portions, or by a plurality of such structures connected at the thin portions.

5. A light guide member of claim 1, wherein an exposed surface of the second light guide unit not covered by the parallel groove is inclined with respect to the rectangular light emitting plane.

6. A light guide member of claim 5, wherein a prism array is formed on the exposed surface of the second light guide unit.

7. A light guide member of claim 1, wherein the second light guide unit has a shape in cross section perpendicular to a lengthwise direction of the second light guide unit representing a triangle, a circle, a partially cut-off ellipse, or part of a parabola.

8. A light guide member of claim 1, wherein the second light guide unit admits light through both lengthwise end surfaces and has a groove that grows wider and deeper from both of the end surfaces centerwardly.

9. A light guide member of claim 1, wherein the second light guide unit admits light through one lengthwise end surface and has a groove that grows wider and deeper from the end surface through which light is admitted toward an opposite end surface.

10. A light guide member of claim 8, wherein the groove of the second light guide unit is a V-shaped or a U-shaped groove.

11. A planar lighting device comprising:
    a light guide member of claim 1; and
    point light sources;
    wherein light from the point light sources is admitted through both end surfaces of the second light guide unit.

12. A planar lighting device of claim 11, wherein the point light sources are disposed adjacent both end surfaces of the second light guide unit.

13. A planar lighting device of claim 11, further comprising light guides for leading light from the point light sources to the end surfaces of the second light guide unit.

14. A planar lighting device of claim 11, wherein the point light sources are LEDs.

15. A planar lighting device of claim 14, wherein the LEDs are pseudo-white LEDs or RGB-LEDs.

16. A rod-type lighting device, comprising:
   a point light source; and
   a light guide unit having a columnar external shape with an outer diameter decreasing from both end surfaces thereof centerwardly and containing light-scattering particles;
   wherein $\Phi \cdot L_G \cdot N_p \cdot K_C$ is not smaller than 1.1 and not greater than 8.2, and $K_C$, a compensation coefficient, is not smaller than 0.005 and not greater than 0.1,
   where $\Phi$ is a scattering cross section of the particles, $L_G$ a length of the second light guide unit in a direction in which light propagates, $N_p$ a particle density, and $K_C$ the compensation coefficient.

17. A rod-type lighting device of claim 16, wherein the light guide unit is configured by placing a pair of light guide units each having a shape with a diameter decreasing from one end surface toward an opposite end surface such that end surfaces of the light guide units having a smaller diameter are in close contact with each other.

18. A rod-type lighting device comprising:
   a point light source; and
   a light guide unit having a columnar external shape with an outer diameter increasing from both end surfaces thereof centerwardly and containing light-scattering particles;
   wherein $\Phi \cdot L_G \cdot N_p \cdot K_C$ is not smaller than 1.1 and not greater than 8.2, and $K_C$, a compensation coefficient, is not smaller than 0.005 and not greater than 0.1
   where $\Phi$ is a scattering cross section of the particles, $L_G$ a length of the second light guide unit in a direction in which light propagates, $N_p$ a particle density, and $K_C$ the compensation coefficient.

19. A rod-type lighting device of claim 18, wherein the light guide unit is configured by placing a pair of light guide units each having a shape with a diameter increasing from one end surface toward an opposite end surface such that end surfaces of the light guide units having a larger diameter are in close contact with each other.

20. A rod-type lighting device of claim 16, which is used in a planar lighting device comprising a transparent light guide plate having a rectangular light emitting plane and a parallel groove parallel to one side of the rectangular light emitting plane in a central portion of a rear surface located opposite from the rectangular light emitting plane,
   wherein the light guide unit has substantially a same external shape as the parallel groove of the light guide plate and is accommodated in the parallel groove.

21. A rod-type lighting device of claim 20, wherein a prism array is formed on other lateral surfaces of the light guide unit than those facing side walls defining the parallel groove of the light guide plate.

22. A rod-type lighting device of claim 16, wherein the light guide unit has a shape in cross section perpendicular to an axis of the light guide unit representing a triangle, a circle, a partially cut-off ellipse, or part of a parabola.

23. A rod-type lighting device of claim 16, further comprising a light guide for leading light emitted by the point light source to an end surface of the light guide unit.

24. A rod-type lighting device of claim 16, wherein the point light source is an LED.

25. A rod-type lighting device of claim 24, wherein the LED is a pseudo-white LED or consists of RGB-LEDs.

26. A rod-type lighting device of claim 25, wherein the RGB-LEDs are pulse-lighted sequentially.

27. A planar lighting device, comprising:
   rod-type lighting devices of claim 16; and
   transparent light guide plates each having a rectangular light emitting plane and an inclined rear surface inclined with respect to the rectangular light emitting plane such that a thickness decreases from one side of the rectangular light emitting plane in a direction toward an opposite side opposite the one side;
   wherein the light guide plates are arranged such that the rectangular light emitting planes define an identical plane and that lateral surfaces each containing the one side are in contact with lateral surfaces each containing the opposite side; and
   wherein the light guide units of the rod-type lighting devices are each disposed in spaces each defined by the inclined rear surface and the lateral surface containing the one side.

* * * * *